United States Patent [19]

White

[11] Patent Number: 4,965,873
[45] Date of Patent: Oct. 23, 1990

[54] PILOT ENHANCED/AMPLITUDE EQUALIZED IMPULSE MAGNETIC

[76] Inventor: R. Kent White, 420 Kisconko Turn, Fort Washington, Md. 20744

[21] Appl. No.: 334,766

[22] Filed: Apr. 10, 1989

Related U.S. Application Data

[63] Continuation of Ser. No. 220,890, Jun. 16, 1988, abandoned, which is a continuation of Ser. No. 66,565, Jun. 26, 1987, abandoned.

[51] Int. Cl.$^5$ .......................... G11B 5/09; G11B 15/14
[52] U.S. Cl. ........................................ 360/41; 360/40; 360/65
[58] Field of Search .................... 360/46, 41, 65, 40

[56] References Cited

U.S. PATENT DOCUMENTS 4,562,491 12/1985 Kawabara et al. .................... 360/46

OTHER PUBLICATIONS

"Write Equalization in High-Linear-Density Magnetic Recording", by R. C. Schneider, IBM J. Res. Rev., vol. 29, #6, 11/85.

Primary Examiner—Vincent P. Canney
Attorney, Agent, or Firm—Boris Haskell

[57] ABSTRACT

Magnetic recording of a data contiuum is effected by means of sequential impulses of recording current. The impulses occur at substantially regular intervals providing samples of the data continuum. The impulses are of very short time duration, in that each impulse extends for only a fraction of the time interval that is required for a point on the record medium to traverse the effective recording field of the record head. The time spacing between impulses is approximately equal to said time interval, thereby providing a magnetic recording continuum corresponding to said data continumm. Certain of said impulses are indicative of data transitions, and other of said impulses are sustaining impulses occurring between data transition impulses. The sustaining impulses are of the same polarity sense as the respective immediately preceding transition impulse, but of lesser amplitude to obtain magnetic recording equalization over the recorded continuum between successive transition impulses. The sustaining impulses may be of a pilot signal frequency derived from the data clock signal, and are preferably made phase coherent with the transition impulses by anticipatory adaption, so as to be always constructively additive thereto.

32 Claims, 62 Drawing Sheets

NRZ DATA

RECORD CURRENT

OUTPUT FROM
1/2-BIT GAP LENGTH
REPRODUCE HEAD AND
1-BIT GAP LENGTH
RECORD HEAD

OUTPUT FROM
1/2-BIT GAP LENGTH
REPRODUCE HEAD AND
1/2-BIT GAP LENGTH
RECORD HEAD

REPRODUCE SIGNAL
INPUTS TO DETECTOR

DETECTED DATA

FIG. 16A
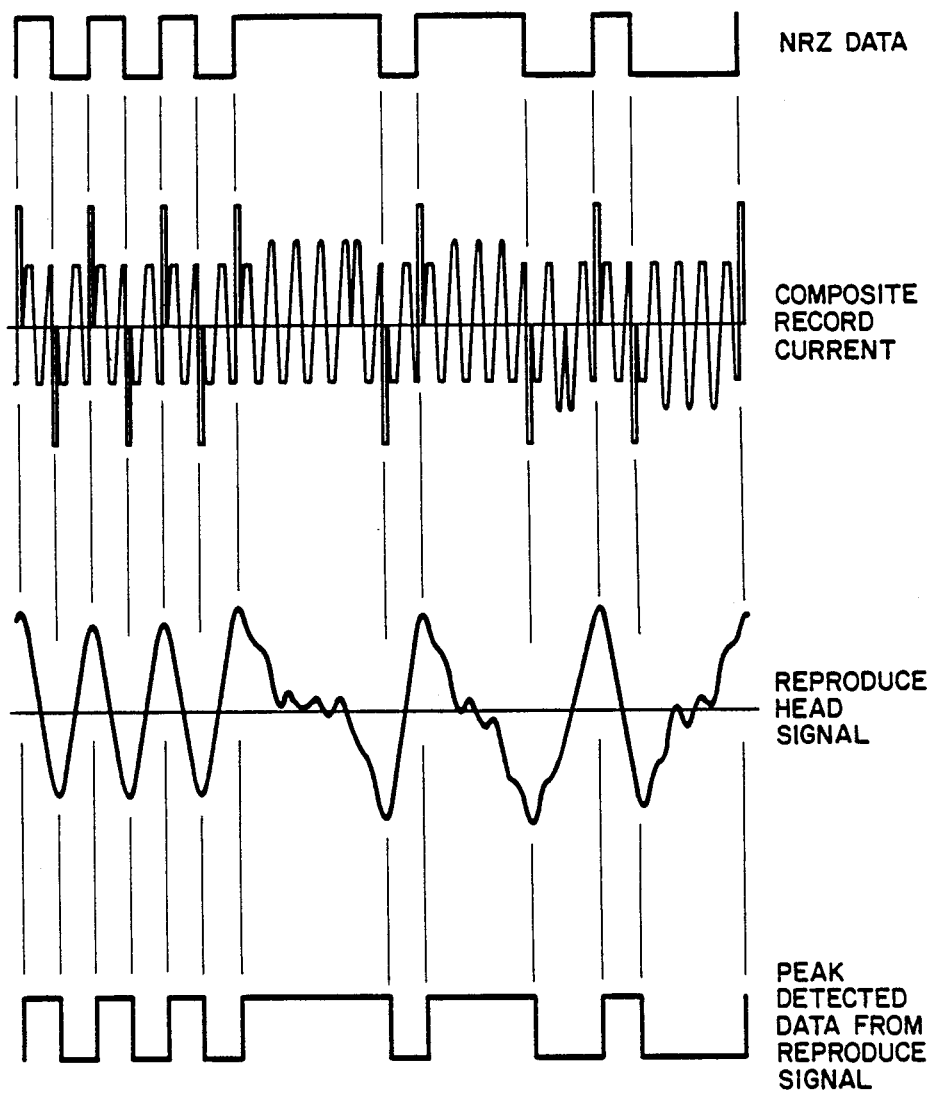
NRZ DATA
COMPOSITE RECORD CURRENT
REPRODUCE HEAD SIGNAL
PEAK DETECTED DATA FROM REPRODUCE SIGNAL
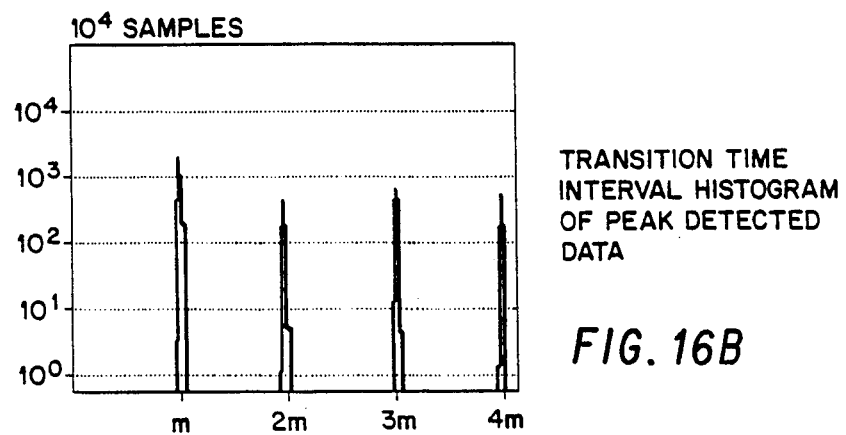
TRANSITION TIME INTERVAL HISTOGRAM OF PEAK DETECTED DATA
FIG. 16B REPRODUCE HEAD SIGNALS
(33,000 BITS PER INCH)
DATA TRANSITION
TIME INTERVAL HISTOGRAMS
$10^4$ SAMPLES
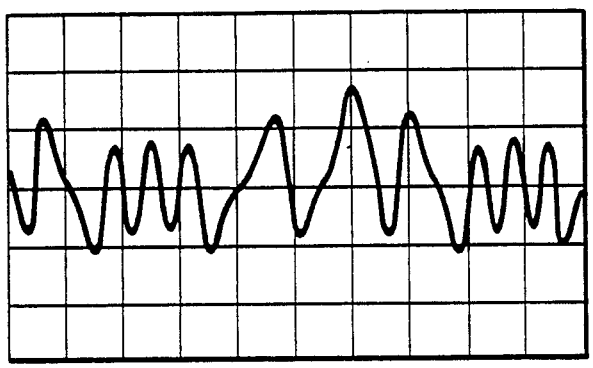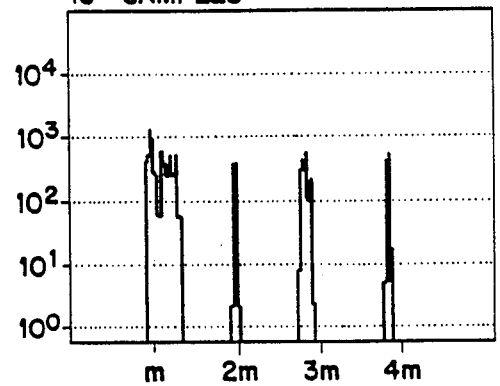
FIG. 20A   CONVENTIONAL SATURATION RECORDING
$10^4$ SAMPLES
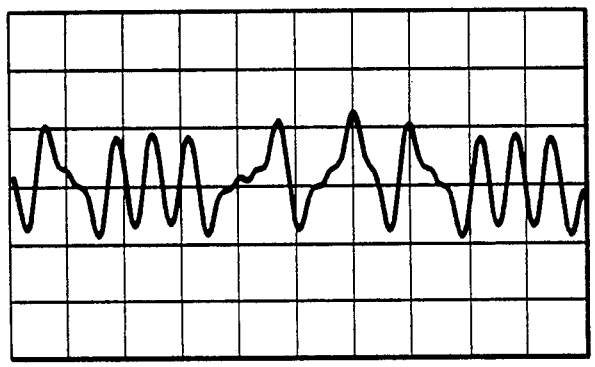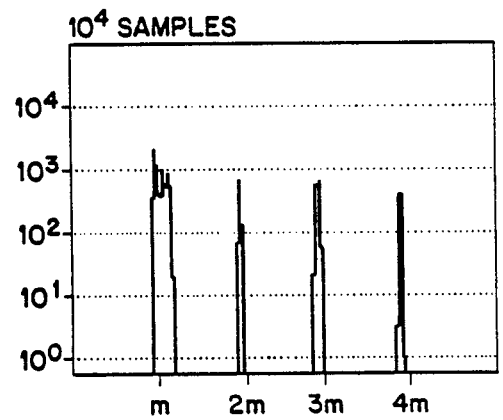
FIG. 20B   SEQUENTIAL IMPULSE RECORDING
$10^4$ SAMPLES
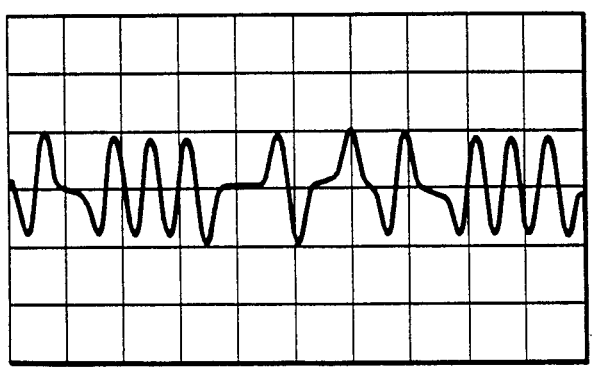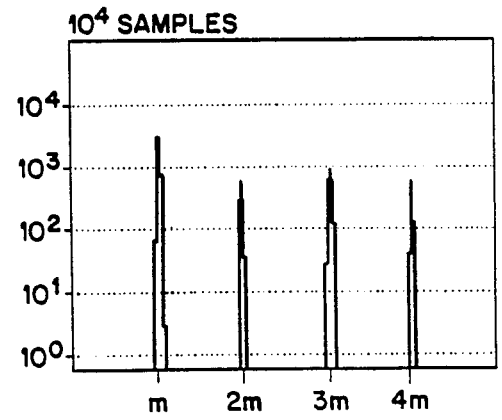
PILOT ENHANCED (AMPLITUDE EQUALIZED) IMPULSE RECORDING
FIG. 20C

REPRODUCE HEAD SIGNAL
(45,000 BITS PER INCH)

DATA TRANSITION
TIME INTERVAL
HISTOGRAM

DATA TRANSITION-TO-CLOCK
TIME INTERVAL
HISTOGAM
(WINDOW MARGIN ANALYSIS)

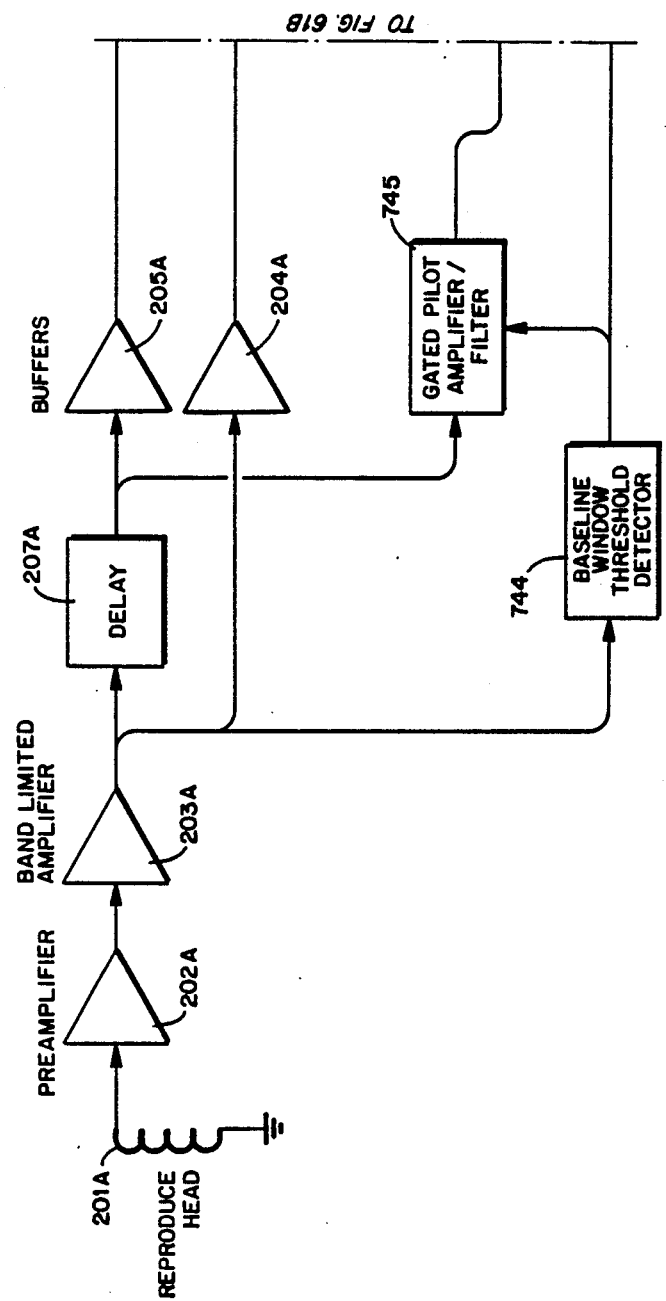

PILOT ENHANCED/AMPLITUDE EQUALIZED IMPULSE MAGNETIC

This application is a continuation of application Ser. No. 220,890, filed June 16, 1988, which is a continuation of application Ser. No. 066,565, filed June 26, 1987.

BACKGROUND AND SUMMARY OF THE INVENTION

The present invention relates to the field of magnetic recording, and more particularly pertains to improvements in impulse magnetic recording, providing write equalization of both phase and amplitude and combining pilot and binary data transition signals.

Impulse Magnetic recording is a process of recording signals on a magnetic medium, which is described in my copending application Ser. No. 898,217, filed Aug. 20, 1986, which is a continuation of my application Ser. No. 669,357, filed Nov. 8, 1984, now U.S. Pat. No. 4,625,245, which is a continuation-in-part of my application Ser. No. 560,103, filed Dec. 12, 1983, now abandoned. The entire contents of said patent and applications is accordingly incorporated herein by reference.

Briefly describing the process of impulse magnetic recording, it utilizes a magnetic recording medium and a magnetic record head, wherein one is moved relative to the other to define a path of traverse of the head along the medium, in any conventional form and configuration. In conventional magnetic recording, an electrical waveform is applied to the record head continuously during the entire time of the waveform. In the practice of impulse recording, however, only very short duration electrical impulses are applied to the record head. Each such impulse is representative of the instantaneous value of the electrical signal being recorded. By "very short duration", it is meant that the time duration of the impulse is only a small fraction of the time it takes for a point on the magnetic recording medium to effect a relative traverse across the effective recording gap of the record head. The effective recording gap, generally speaking, is not much greater than the physical record head gap, and in normal practice would not likely exceed twice the physical head gap. In practice, this small fraction can be in the range of 0.1, although it certainly can be smaller or larger in accordance with the teachings of the aforesaid applications. In addition to utilizing these very short recording impulses, in one form of impulse recording as may be applied in certain specific forms of impulse recording utilized in the description of the present invention, successive recording impulses are applied to the record head in a sequence of equal time intervals approximately equal to the time of relative traverse of a point on the recording medium across the effective recording gap of the record head. As explained in detail in said prior applications, each impulse, no matter how short in duration, if resolvable by the record head/magnetic medium interface, causes a recorded increment along the magnetic medium equal to the entire length of the effective recording field of the head, plus the length of traverse for the time duration of the impulse. If successive impulses are applied at the aforesaid time intervals, the successive recorded increments in the medium are essentially contiguous, providing a recorded continuum corresponding to the electrical waveform continuum being recorded. This recording process of successive recording impulses, whether the time intervals between impulses are equal, or not, is referred to as sequential impulse recording.

Magnetic impulse recording and the improvements therein that are the subject of the present invention, are generally applicable to various forms of magnetic recording, but are described herein and in the aforesaid application for purpose of illustration in relation to digital data recording, and specifically the NRZ form of representation of the data. It is understood, however, that the invention is not limited thereto, as will be apparent to those skilled in the art. Also, although the invention is described at times in terms most applicable to fixed, ring head, longitudinal recording on magnetic tape, it certainly is not limited to such embodiments.

One of the improvements in sequential impulse magnetic recording of the present invention, pertains to amplitude equalization of the recorded data, particularly in the recording of relatively long wavelengths. In one ideal mode of practice of sequential impulse recording of digital data, for maximum recorded density, a data bit cell would have a time duration approximately equal to the aforesaid time interval between recording impulses. When the data waveform contains a longer interval than a bit cell between data transitions, the recording of the long interval is obtained by successive impulses corresponding to the number of bit cells encompassed by that long interval. Some benefits which can be obtained from sequential impulse recording are limited by interaction field which preclude constant depth, surface recording for all wavelengths. The depth of recording in the magnetic medium will increase with each successive impulse recorded increment of a long interval between data transitions. Greater benefits can be derived from amplitude equalized, sequential impulse recording. In general, this amplitude equalized recording is obtained by appropriately reducing the amplitude of those recording impulses between data transitions (sustaining impulses). In doing so, of course, one loses the ability to overwrite previously recorded data, because the reduced amplitude signal would not accomplish saturation to overwrite the previous recording. In accordance with the present invention, not only is recorded amplitude equalization obtained, but also, overwrite is made possible by using an overwrite impulse in proper relation to a sustaining impulse, to obtain the desired amplitude equalized recording. It is also found advantageous to adjust the sustaining impulse clock phase (of any frequency) with respect to the data transition impulse clock to achieve improved phase equalization of the recording.

It is further found advantageous at times to utilize a separate clock of greater frequency than the bit cell clock, for generating the sustaining amplitude equalized impulses between transitions, in order to reduce the clock signal amplitude in the reproduced signal. Further, in accordance with the present invention, the sustaining impulse timing signal could be either a clock-rate or clock-rate related pilot signal, and for amplitude equalization purposes it would be necessary only to use burst pilot signals during the periods of long intervals between data signal transitions.

However, in accordance with the present invention, if one generates a pilot signal that is always phase coherent with all transitions of the data signal, and if one records that pilot signal with the data transition recording impulses as well as utilizing it to obtain amplitude equalized sustaining impulses for long interval data signals, one obtains further significant improvements in the record/reproduce process. It is found that by this means one obtains very significant reduction of timing errors for data transitions in the reproduced waveform, and in addition, a very important reduction in the width of pulses representative of data transitions in the reproduced waveform. Moreover, separate recovery of the recorded pilot signal affords an independent means of reconstructing the data clock in the absence of data transitions. As will be explained subsequently, a pilot frequency of 1.5 times the bit cell clock frequency is often well suited to the purposes of the present invention.

It is therefore one object of the present invention to provide for impulse magnetic recording of electrical waveforms.

Another object of the present invention is to provide for enhanced sequential impulse magnetic recording of digital data.

Another object of the present invention is to provide for enhanced sequential impulse magnetic recording of digital data to achieve record (write) equalization in phase and/or amplitude.

Still another object of the present invention is to provide for write equalized sequential impulse magnetic recording of digital data, with overwrite capability.

A further object of the present invention is to provide for pilot enhanced impulse magnetic recording of electrical waveforms.

Still another object of the present invention is to provide for pilot enhanced impulse magnetic recording of digital data electrical waveforms, wherein the pilot signal is always phase coherent with the data waveform transitions.

Still another object of the present invention is to provide for pilot enhanced, write equalized, sequential impulse magnetic recording of digital data electrical waveforms.

And still another object of the present invention is to provide for pilot aided clock recovery during reproduction of long intervals between recorded digital data transitions.

Other objects and various advantages of the present invention will become apparent to those skilled in the art, from the illustrative detailed description of the invention presented below.

BRIEF DESCRIPTION OF THE DRAWINGS

The following detailed description of the invention is presented in conjunction with the accompanying drawings, wherein like reference characters and legends refer to like or corresponding parts and representations, and wherein:

FIGS. 16A and 16B illustrate the write equalizing and pilot enhancing effects of pilot enhanced impulse recording, the composite record current waveform, the resultant reproduced signal, the peak detected data therefrom, and a transition time interval histogram for said peak detected data;

FIGS. 20A through 20C provide a comparison of reproduce head signals and data transition time interval histograms for continuous or saturation recording, sequential impulse recording, and pilot enhanced (amplitude equalized) impulse recording, all at a recorded density of 33,000 bits per inch;

FIGS. 61A and 61B illustrate functionally the reproduce system of the sixth embodiment.

DETAILED DESCRIPTION OF THE INVENTION

For background purposes, FIGS. 1 to 4 generally indicate the nature and advantages of sequential impulse magnetic recording, although these matters are more fully explained in my aforesaid applications.

Figure 1:
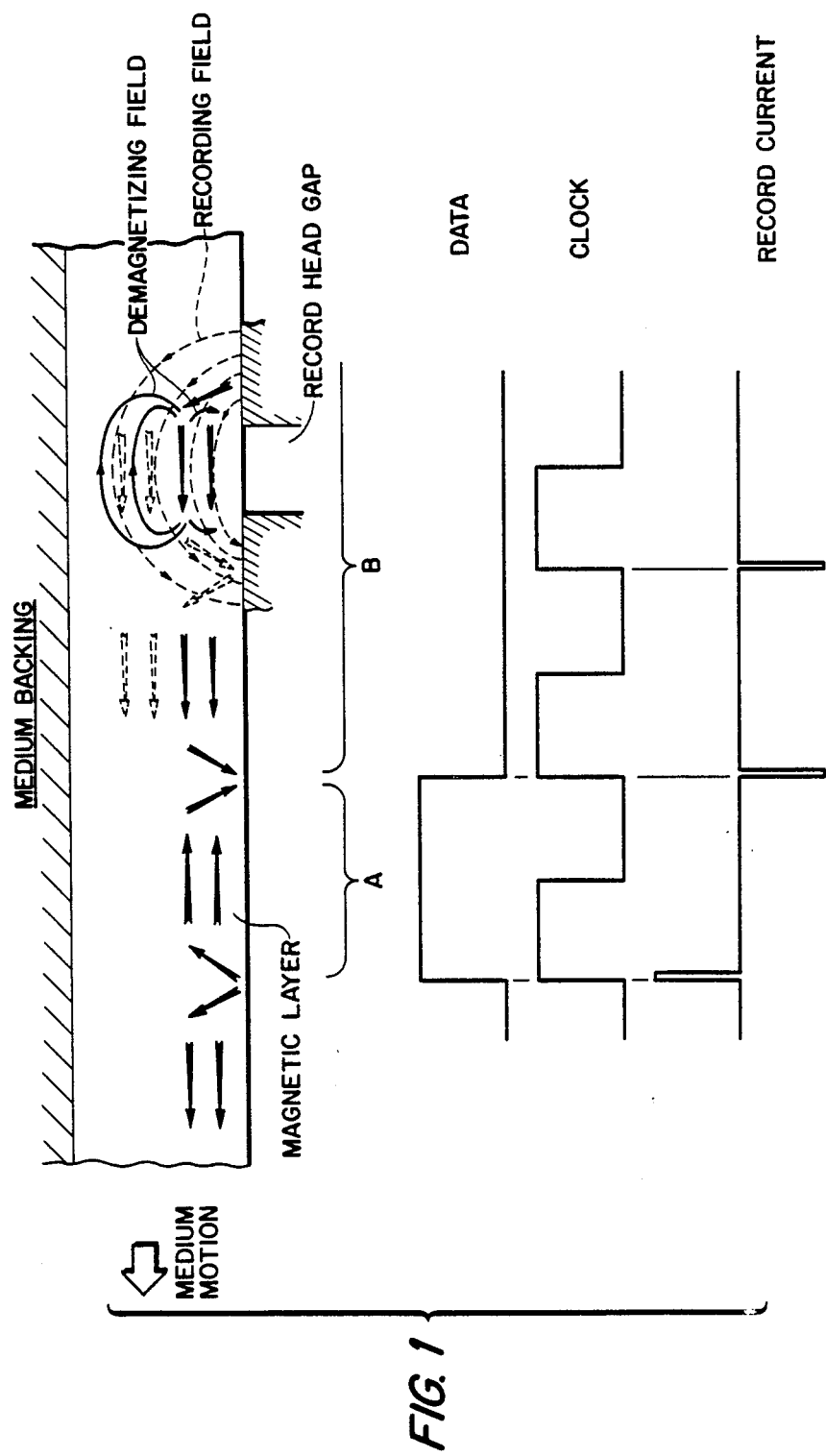
FIG. 1 is a waveform and vector magnetization model illustrative of sequential impulse magnetic recording.

FIG. 1 shows a timing diagram for an NRZ digital data signal with clock, its impulse record current, and a vector magnetization model of a recording produced by the impulses. The short magnetization interval, A, of the vector model would lie close to the recording surface for either an impulse recording or a conventional, continuous saturation recording, but the long interval magnetization, B, which lies close to the surface of an impulse recording, would lie substantially deeper for a conventional recording, as is shown by the phantom planar vectors of FIG. 1. In the case of impulse recording, the interruption in record current affords the opportunity for instantaneous demagnetization of deeper planar components which would remain stable if the recording field was continuously maintained.

Figure 2:
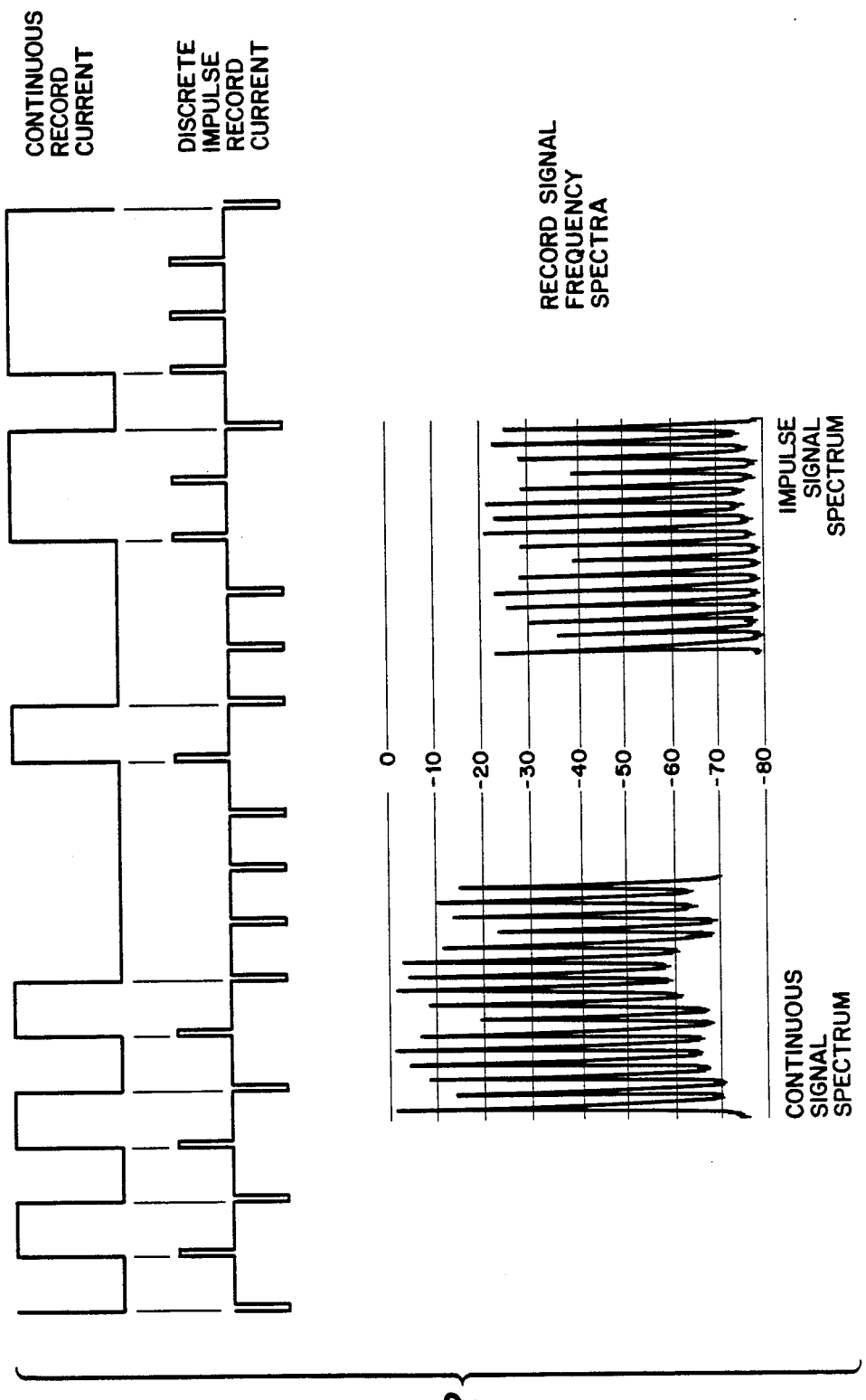
FIG. 2 is a comparative chart of the signal spectra obtained by continuous magnetic recording and impulse magnetic recording.

The significance of the sequential impulse recording technique, viewed in the frequency domain, is apparent from FIG. 2. FIG. 2 illustrates the frequency spectra for continuous and impulse recording signals used to record the same, repeating, NRZ digital data pattern. Only the spectral lines considered to lie within the reproduce channel pass-band are shown. The impulse signal spectrum shows all components to be at least 20 db less in amplitude than the corresponding components of the continuous signal spectrum. Since high amplitude, pass-band components are more likely to result in non-linear errors, the impulse method producing only low amplitude, pass-band components is the more linear one.

The high peak currents of the impulse method result in high output recordings for upper band-edge components, while lower frequency components are recorded at a satisfactory level through the record head and the medium acting as a spatial integrator. Moreover, the process of incrementally building long and short planar vector continua in recordings by means of applying short duration, discrete current impulses to a properly specified record head is both linear and phase coherent.

Figure 3:
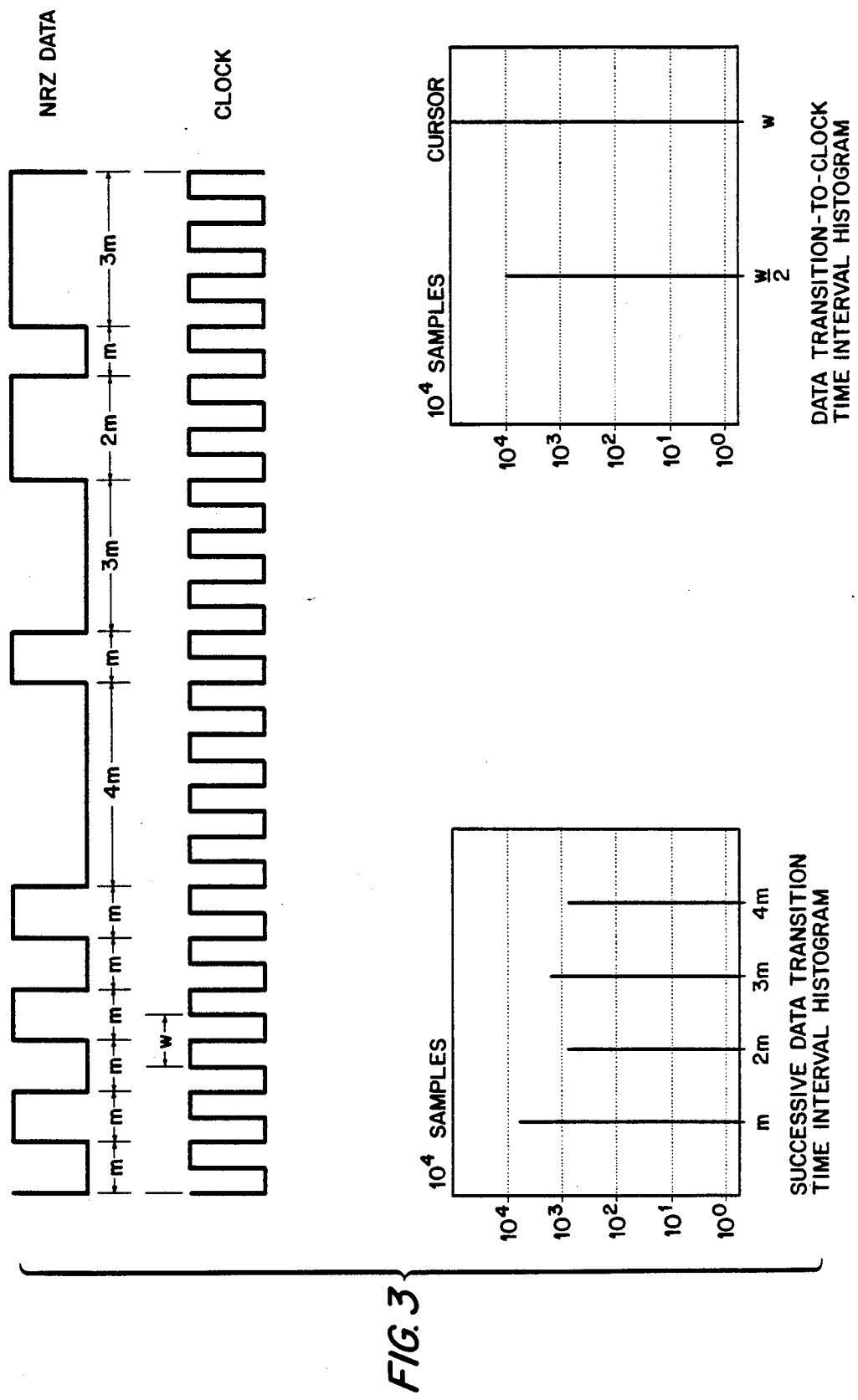
FIG. 3 illustrates the nature of a successive data transition time interval histogram and of a data transition-to-clock time interval histogram.

A powerful tool for evaluating performance of a digital signal system in the time domain is a time interval anlyzer (TIA). A TIA makes a specified number of time interval measurements, e.g. 10,000, either between successive transitions of a single input data sequence, or between the data transitions of a data input and the clock transitions of a seperate clock input. Time interval data is accumulated, then displayed as a time interval versus logarithm of frequency-of-occurrence histogram. FIG. 3 shows the same NRZ data sequence depicted in FIG. 2 with clock. The test word contains time intervals between transitions of m (minimum interval), 2 m, 3 m, and 4 m duration, all of which are dimensioned in the figure. Of course, the interval between clock edges (positive going) dimensioned, w, is the data detection window. In the special case of NRZ data, m corresponds to a bit cell and w=m. FIG. 3 also shows examples of a successive-data-transition histogram and a data-transition to clock histogram taken from an assumed ideal source having no timing errors (peak shift or jitter). The length of each vertical line depicts, on a logarith mic scale, the number of measurements of a time interval accumulated during a test. The horizontal position of each line depicts, on a linear scale, the particular time interval measured. For the perfectly timed data assumed in FIG. 3, no deviations from nominal correct time interval positions ar shown.

Figure 4B:
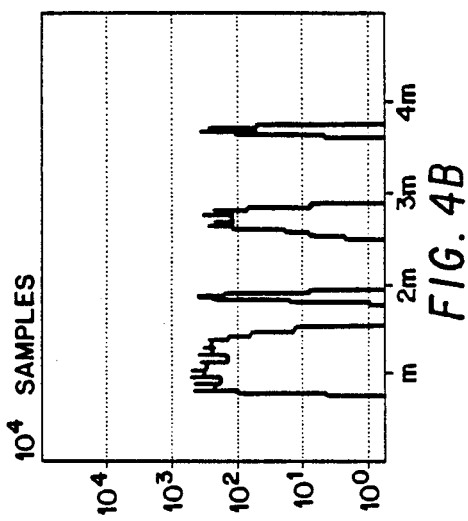
FIGS. 4A through 4D show comparative successive data transition time interval histograms for continuous magnetic recording and for sequential impulse magnetic recording.
Figure 4D:
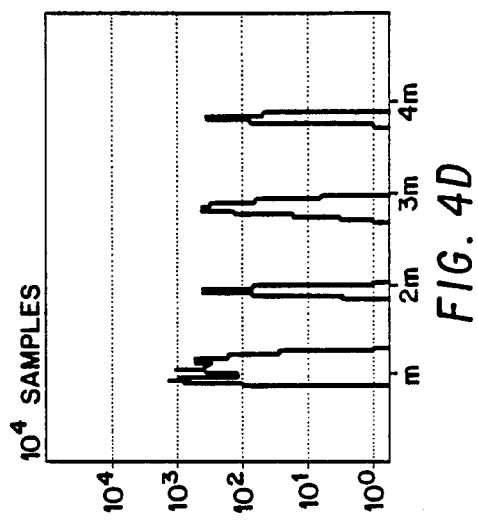
Figure 4A:
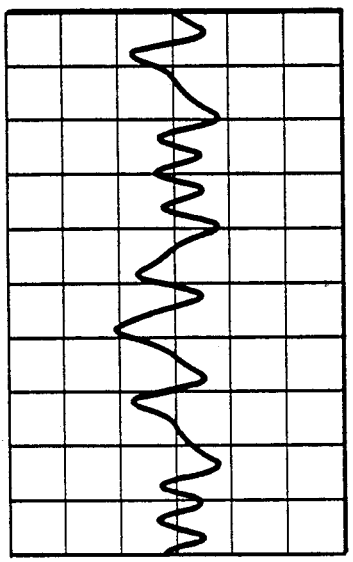
Figure 4C:
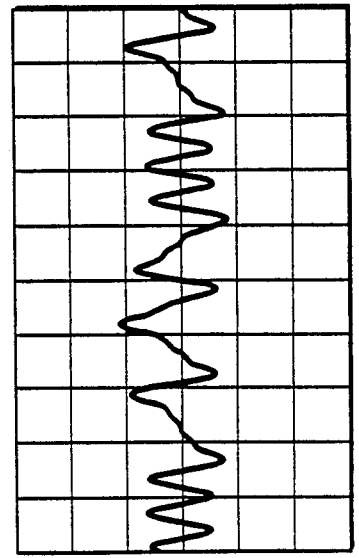

FIG. 4A shows the amplified reproduce head signal from a conventional continuous saturation current recording of the FIG. 3 NRZ data sequence made at 33,000 bits per inch. FIG. 4B shows the data transition histogram resulting from peak detection of this signal. The width of the distributions about the 2 m and 4 m data is due entirely to Gaussian jitter (noise and medium speed variations) since only one of each of these time intervals exists in the test pattern. The excessive width of distributions about 1 m and 3 m data and displacement of any data from its nominal correct position is due to either linear or non-linear peak shift. FIGS. 4C and 4D show significantly improved results from sequential impulse recording of the same data on the same system. Resolution and noise effects are improved, peak shift is reduced, and all shifts present are predictable from linear mechanisms. The sequential impulse system exhibits no non-linear errors.

The record levels for the tests of FIG. 4 were set for peak, upper band-edge output. The type of peak detector used is amplitude compensated by a delayed signal replica to function accurately with a wide signal level, noise and resolution range. This detector is the subject of my patent application Ser. No. 004,283, filed Jan. 6, 1987, which is a continuation of my application Ser. No. 790,887, filed Oct. 24, 1985, now abandoned.

Some benefits which can be obtained from sequential impulse recording are limited by interaction fields which preclude constant depth, surface recording of all wavelengths. The depth of recording will increase with each successive pulsed increment of a long interval between transitions. In accordance with the present invention, this problem can be minimized by amplitude equalized, sequential impulse recording, as illustrated in FIGS. 5-10.

Figure 5:
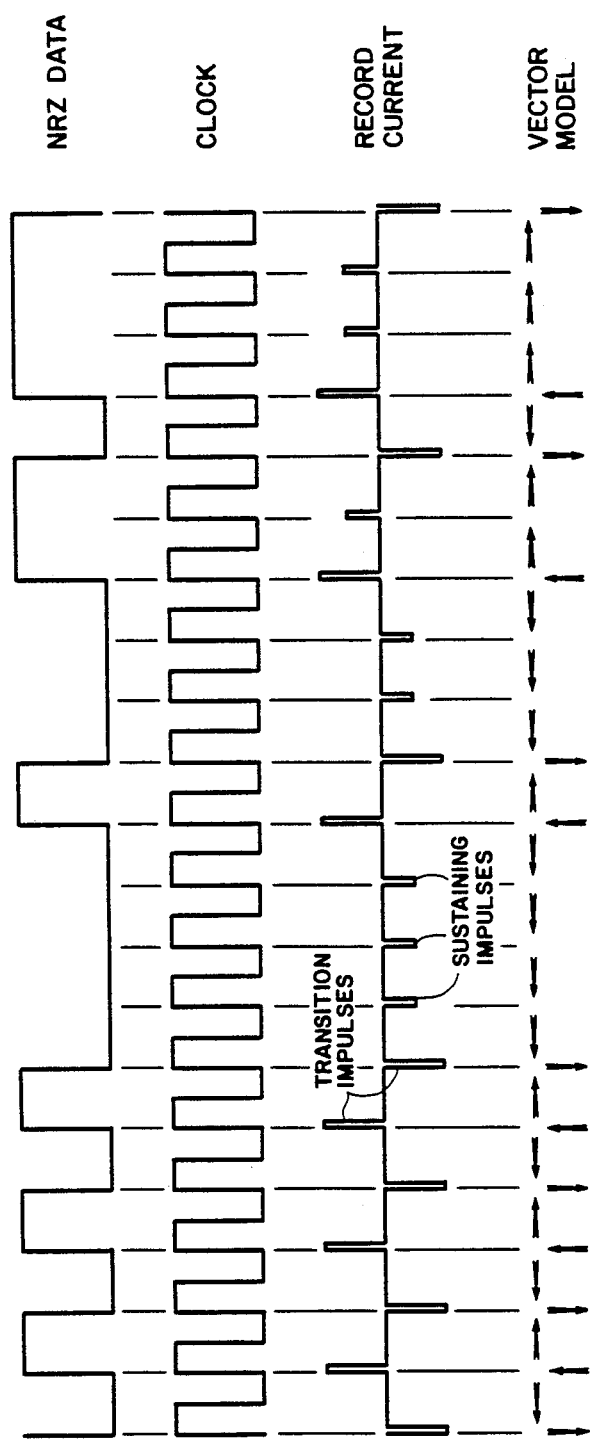
FIG. 5 illustrates amplitude equalized sequential impulse magnetic recording.

FIG. 5 illustrates an NRZ data pattern with clock and the record current waveform associated with amplitude equalized, sequential impulse recording; a magnetization vector model of a recording produced by this signal current is also shown. The current impulses corresponding to data transitions are maximal in amplitude. These transition impulses produce a record zone length or increment approximately corresponding to a bit cell, that is, the minimum interval between transitions. The record zone extends from the leading edge of the effective record head gap to its trailing edge. Impulses which do not correspond to a data transition but which are applied merely to sustain a long planar vector continuum are of a lower amplitude. The lower amplitude of these sustaining impulses assures only surface recording of long, planar continua and, in consequence, improved reproduce signal resolution.

The relative amplitude of the impulses is dependent upon the squareness of the B-H curve for the magnetic medium used. Typically, the amplitude of the transition impulses are selected for peak, upper band-edge output, while the amplitude of the sustaining impulses are selected for optimum data-transition-time-interval histograms and reproduce signal resolution, no post-equalization (reproduce equalization) for accurate data detection.

In sequential impulse recording, the high amplitude impulses produce instantaneous recording fields which penetrate more deeply into the medium than do their final recordings which become stable close to the medium surface as a result of demagnetization. This condition would seem ideal for data overwriting applications. However, in the FIG. 5 example of amplitude equalized, impulse recording, reducing the amplitude of sustaining impulses compromises overwrite performance. The recording waveform of this particular figure would be applicable only to systems employing an erase head or degaussed media.

Figure 6B:
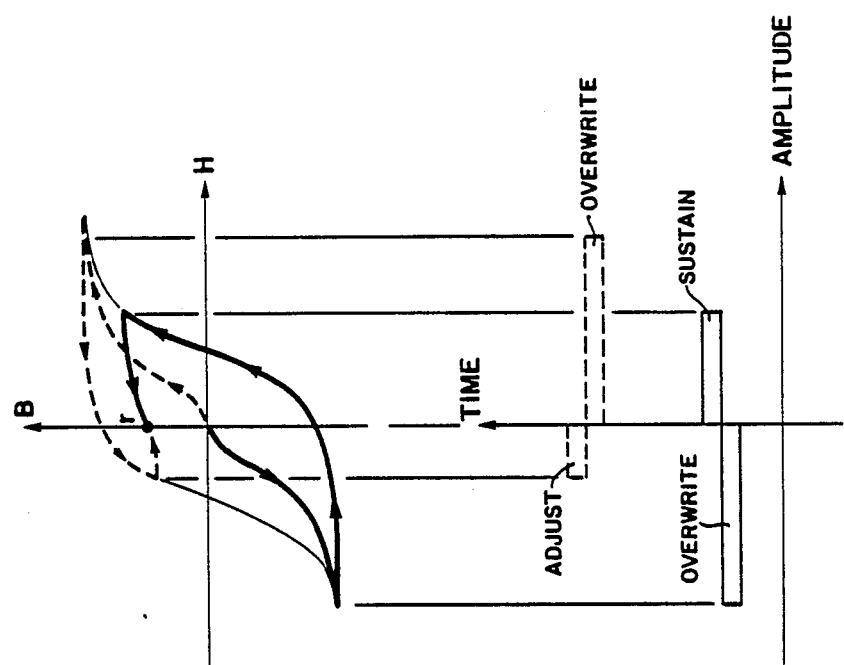
FIGS. 6A and 6B illustrate one approach to amplitude equalized sequential impulse magnetic recording with overwrite capability.
Figure 6A:
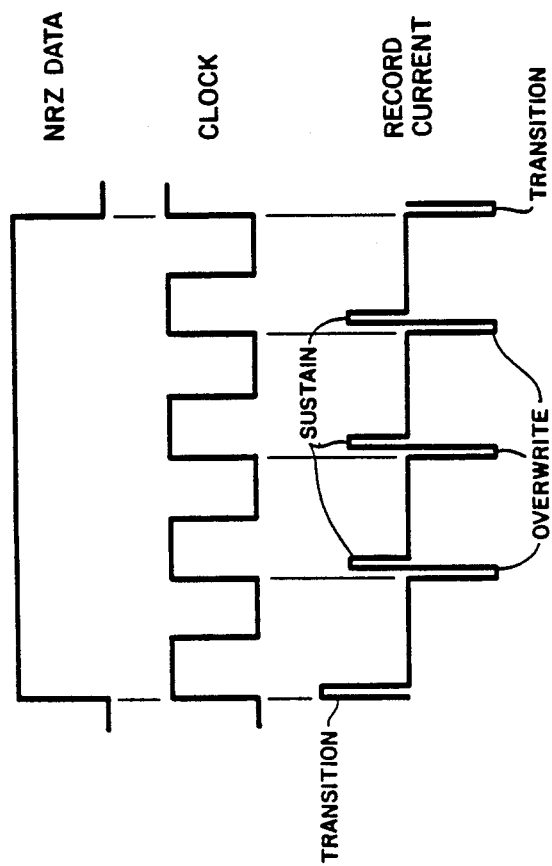

FIG. 6A shows a modification to the waveform of an amplitude equalized, sequential impulse recording signal which can achieve overwrite. Prior to each sustaining impulse, an overwrite impulse of opposite polarity is inserted. The duration of both impulses is short relative to the time of traverse of the affected medium through the record zone.

FIG. 6B illustrates a B-H curve typical of recording media; an appropriately scaled amplitude-versus-time recording signal diagram is also shown. The solid portion of the curve, with its arrows, traces the overwrite and record (sustain) cycle to the final sustaining remanence value, r. The negative, overwrite impulse causes the region within the record zone to be saturated in the negative sense, thereby overwriting any previous recording; the positive, sustaining impulse then produces the desired positive remanence. Alternatively, the impulse sequence shown in phantom in FIG. 6B could be used and the loop cycle also indicated in phantom, with its arrows, would describe the recording of sustaining remanence, r. Obviously, this same concept of overwrite impulses could be employed with transition impulses as readily as with sustaining impulses. In some systems, it may be found advantageous for overwrite impulses to exceed transition impulses in amplitude.

Figure 7A:
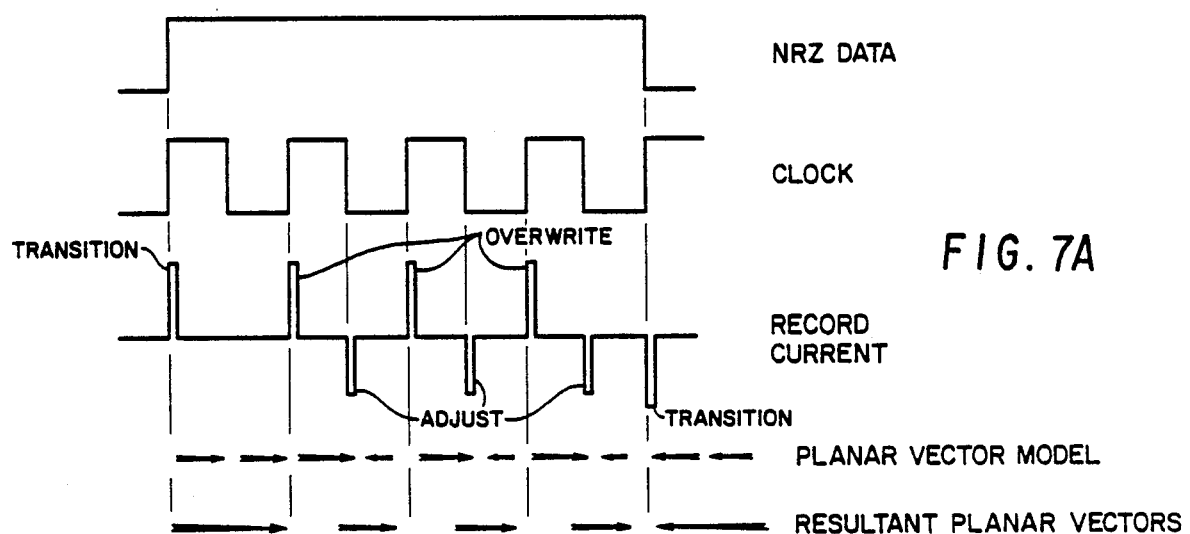
FIGS. 7A and 7B illustrate two other approaches to amplitude equalized sequential impulse magnetic recording with overwrite capability.

An overwrite method similar to that depicted in phantom in FIG. 6B uses mid-clock-interval amplitude adjustment of clock-interval overwrite increments to achieve record equalizaton. This approach to amplitude equalized, sequential impulse recording of a long duration NRZ data signal is illustrated in FIG. 7A. There, overwrite impulses of the same sense and of at least the same amplitude as the preceeding transition impulse occur at the clock rate. Each overwrite impulse is followed at mid-interval by an adjustment impulse of opposite sense and of amplitude sufficient to diminish, erase or invert the magnetization associated with only the latter half of each recorded overwrite increment, since the leading half has left the effective recording field. These adjusted, latter-half magnetizations can be averaged with former-half magnetizations during reproduction to achieve equalization without resolving the half-clock-interval variations to a degree sufficient to cause interference. The averaging which occurs during reproduction of the recording of FIG. 7A is essentially the same as reproducing a recording described by the resultant planar vector model shown in FIG. 7A.

Figure 7B:
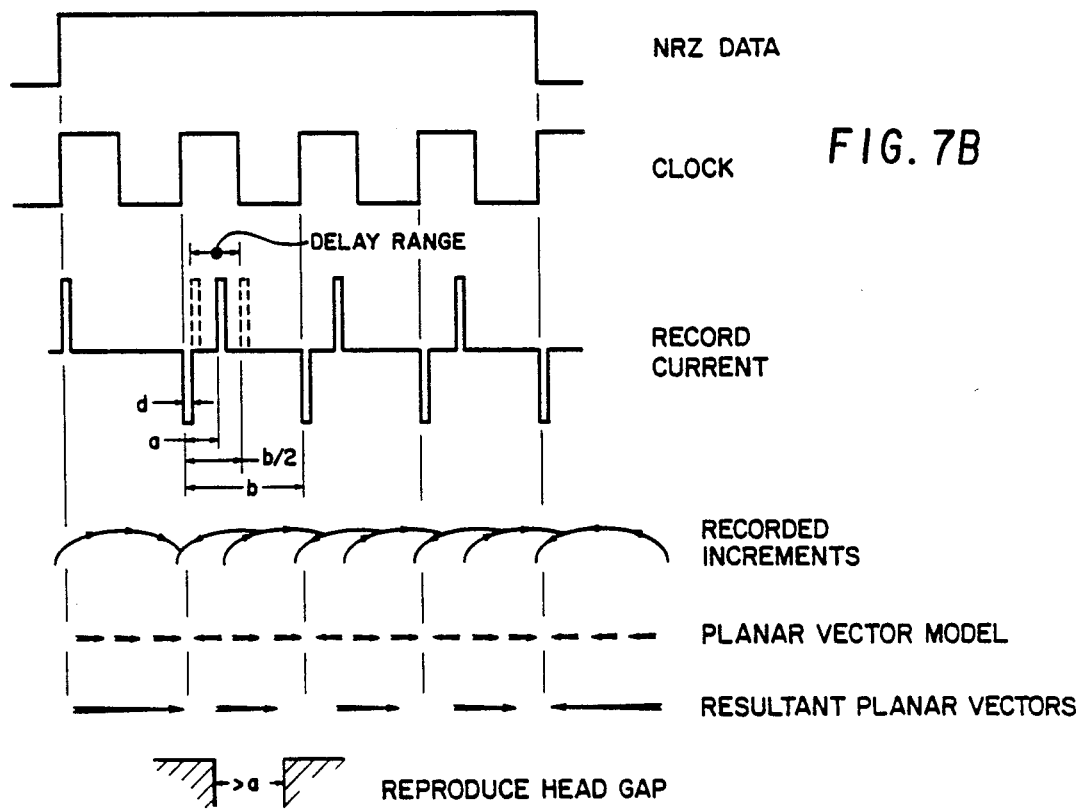

Overwrite, in conjunction with record equalization, can also be achieved by using correctly timed overwrite impulses of maximum amplitude and alternating polarity. This method is illustrated in FIG. 7B. The NRZ data sequence; the maximum amplitude transition impulses; and the maximum amplitude, negative overwrite impulses correspond identically to those shown in FIG. 6A. The interval between negative overwrite impulses is dimensioned, b, which is also the clock interval. A positive overwrite impulse follows each negative overwrite impulse after a delay period dimensioned, a. Note that the delay period determines how much of the negative recorded increment passes out of the effective recording field before the positive increment is recorded. The positive overwrite impulses are also of maximum amplitude. These overwriting impulses of the record current signal produce the illustrated overlapping recorded increments in the record medium. The planar magnetic vector model and resultant planar vectors of this process are also shown in FIG. 7B.

When the recording of FIG. 7B is reproduced by a head having a gap length substantially longer than the shortest planar magnetization, that is, substantially longer than the interval, a, the head response (sensitivity function) is the equivalent of its response to the resultant planar vector continuum shown in FIG. 7B. A reproduce head responds to changes in the average flux resolvable over lengths slightly less, to much greater than its gap. A reproduce head gap of appropriate scale is illustrated in FIG. 7B for reference. The magnitude of the resultant vectors and, therefore, the record amplitude equalization characteristic is continuously controllable by varying the delay interval, a, while always achieving overwrite. If the delay interval, a, is equal to the pulse width, d, the resultant positive planar vectors will be maximum; if the delay interval, a, is equal to b/2, then spatially equal regions of alternating sense flux will be recorded and the resultant flux, spatially integrated (averaged) by the relatively long reproduce head gap, will be zero. These two extremes of second overwrite impulse position are shown in phantom in FIG. 7B. Obviously, the same resultant, that is, positive average of FIG. 7B, could be obtained by making each first overwrite impulse positive, making each second overwrite impulse negative, and making the delay interval, a, greater than b/2. Thus, by the methods described in FIGS. 6 and 7, the effects of lesser amplitude sustaining impulses are obtained, with overwrite capability.

Figure 8:
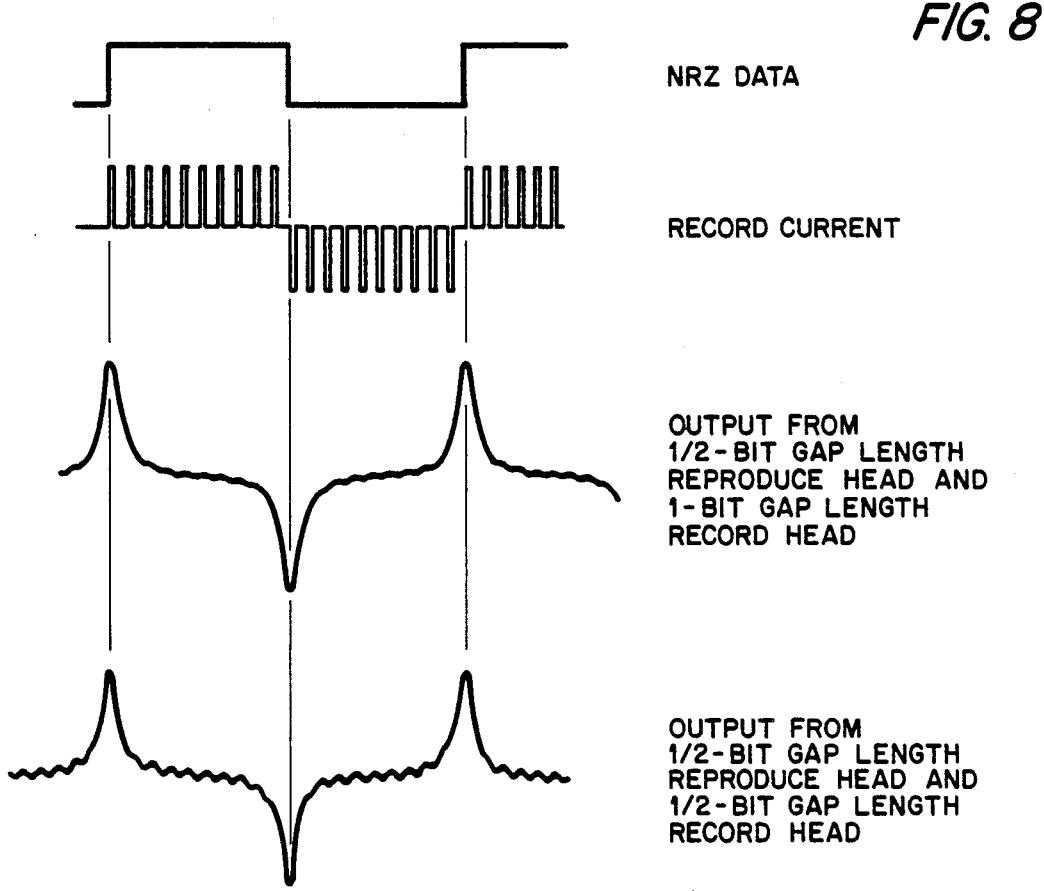
FIG. 8 shows the effect of record gap length on the clock signal level in the reproduced waveform obtained from sequential impulse magnetic recording.

An ideal length for a recorded increment resulting from a recording current impulse can approximate a minimum transition interval, for example, an NRZ bit cell. The recorded increment length is determined both by the gap length of the record head and the magnitude of the record current impulse. It is common practice for digital systems to utilize record and reproduce heads having gap lengths which are approximately equivalent to one-half a bit cell; these small gaps can significantly enhance system performance. With such record heads, sufficient recorded increment length that is equivalent to approximately one bit cell can be achieved by optimizing record currents for peak output of the maximum transition frequency. However, with sufficiently short reproduce head gaps or with high resolution, high output media, the impulse repetition frequency may be evident in an output signal. FIG. 8 shows reproduction of isolated transitions from the NRZ data waveform shown with one-bit-cell impulse spacing (clock rate spacing) occurring in the sequential impulse record current waveform. The data was recorded with both a one bit-cell gap length record head and a one-half bit-cell gap length record head. Both isolated data transition signals were reproduced from the same high resolution medium with the same reproduce head having a one-half bit-cell gap length. The half-bit gap length record head produces a discernible clock-rate component in the output signal.

In amplitude equalized, sequential impulse recording, the reduction of the amplitude of sustaining impulses inherently reduces the recorded increment length from a short gap record head. This can leave voids or variations in the recording. In consequence, a short gap reproduce head may resolve a clock-rate signal which can interfere with data detection. This can be avoided by seperately and synchronously clocking sustaining impulses at a higher rate than the transition impulse clock. The result will be that each increment is of ideal length as is shown in FIG. 9.

Figure 9A:
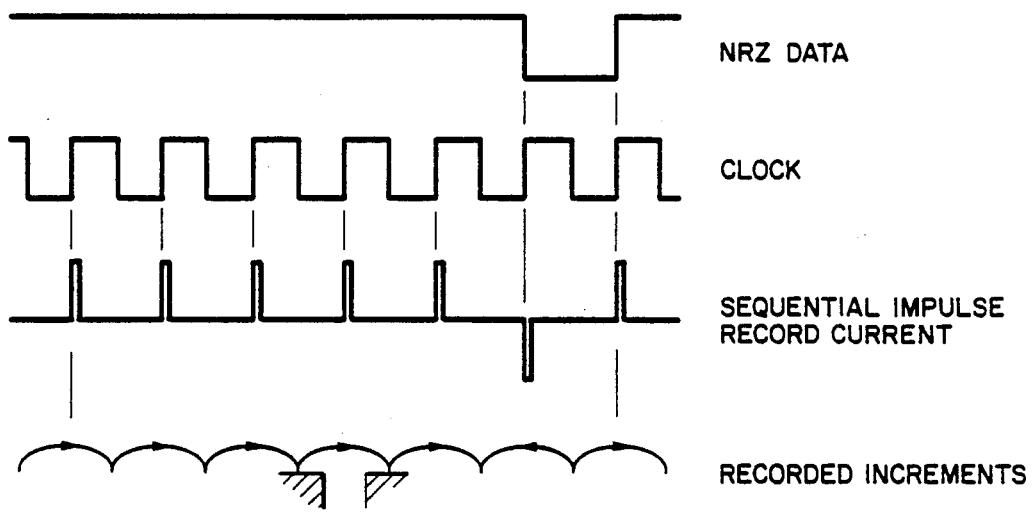
FIGS. 9A through 9C illustrate an approach to amplitude equalized sequential impulse magnetic recording, which can minimize clock signal in the recording.
Figure 9B:
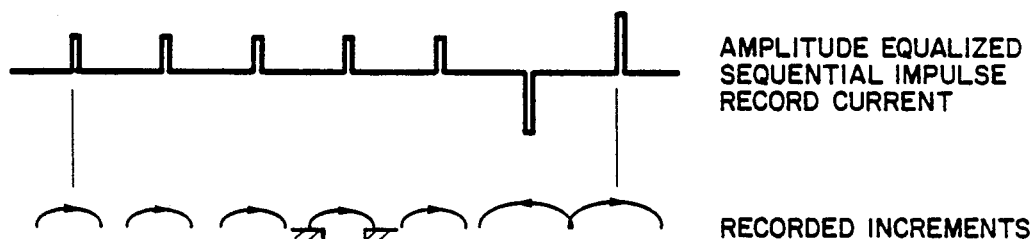
Figure 9C:
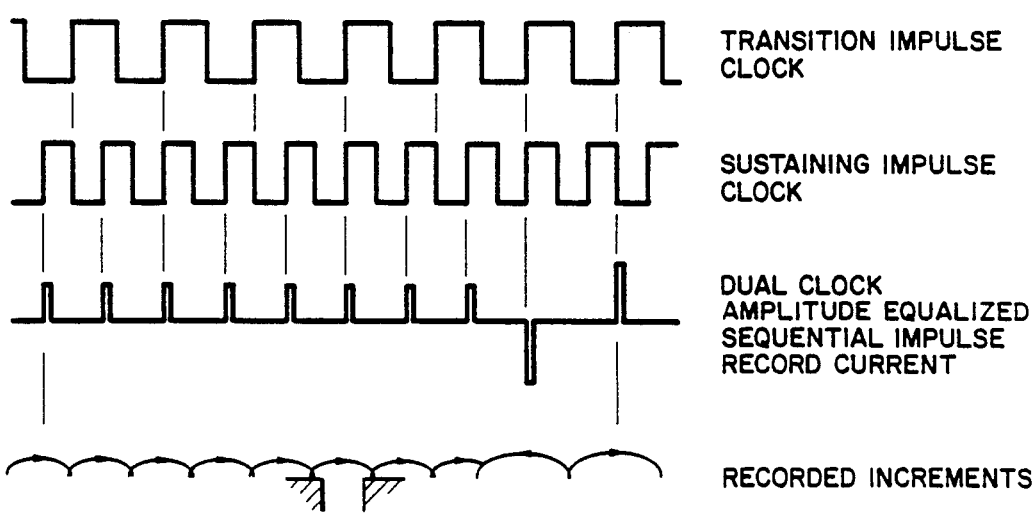

For the NRZ data signal and clock signal shown in FIG. 9, increments recorded by maximum amplitude current impulses (FIG. 9A) are ideally spaced. Sustaining increments recorded with amplitude equalized sustaining impulses but at the transition clock rate (FIG. 9B) include voids and could generate a significant clock-rate signal in the output. Sustaining increments and transition increments are both ideally spaced (FIG. 9C) when the intervals of each are determined by separate, synchronous clocks; the higher rate clock controlling the sustaining increments. Minimum, clock-rate output signal can result for this case. Record/reproduce gap lengths of appropriate scale are rendered in FIG. 9 for reference.

Figure 10:
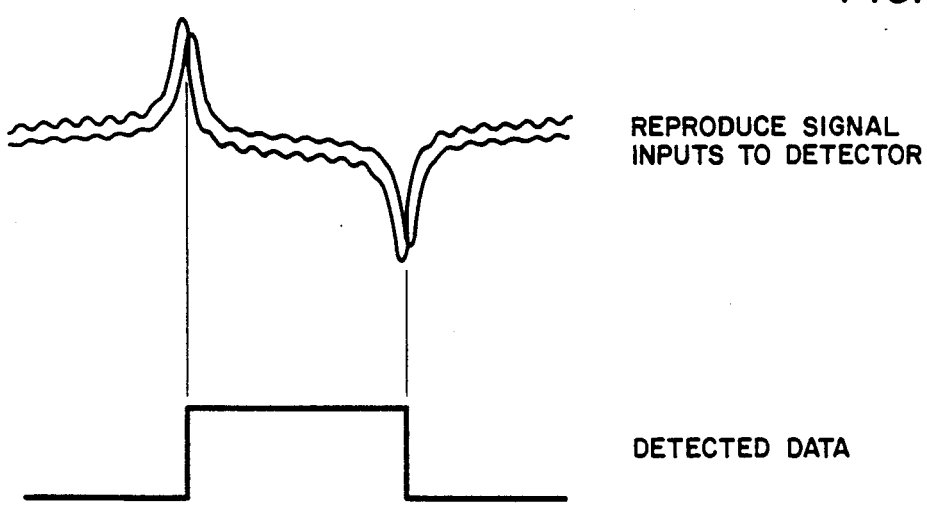
FIG. 10 illustrates clock signal interference immunity of peak detection by means of a delayed signal replica and dynamic biasing.

The dynamic bias feature of the data detector described and claimed in the aforesaid applications Ser. Nos. 790,887 and 004,283, allows accurate detection of peaks in the presence of substantial levels of clock components in reproduce signals. A summary indication of the concept of that application is shown in FIG. 10. Isolated data transitions ar detected when the reproduce signal and a delayed replica signal intercept. Signal baseline separation and clock signal interference immunity are controlled by the level of the dynamic bias step following each peak detection. As FIG. 10 illustrates, reasonably high levels of coherent signals can be included in the data signal without interfering with data detection. In fact, such coherent signals need not be merely accommodated but can be intentionally generated for useful purposes, such as a pilot signal.

Data code restrictions are often imposed in digital systems to assure transitions at minimum intervals. By limiting the maximum run-length of data sequences without transitions, a transition density adequate for clock recovery will result. Coherent pilot signals, if recorded in a manner not interfering with data and subsequently recovered in a reproduce channel, can be used to maintain a clock in the absence of data transitions. Thus, the need for maximum run-length limiting can be eliminated.

Other uses for recovered pilot signals might also prove useful such as their use as imbedded references for tracking servos. Pilot signals which are both synchronous and phase coherent with respect to data can be used to reproduce more ideal signal waveforms, thus functioning as pseudo-harmonics aiding error immune data detection.

Figure 11A:
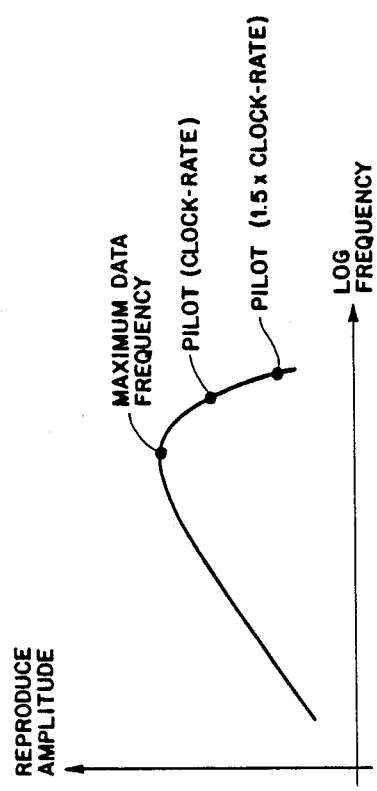
FIGS. 11A and 11B are graphical representations of two transfer characteristic curves plotting reproduce amplitude against log frequency.
Figure 11B:
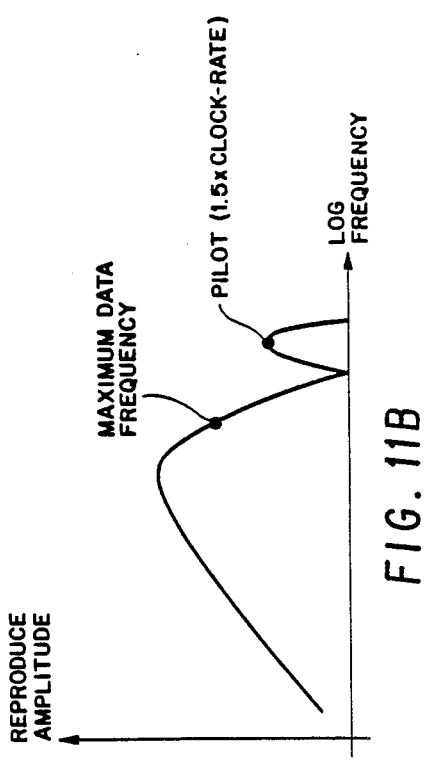

Useful pilot response in a reproduce channel can occur for pilot frequencies beyond the upper band-edge or within the signal pass-band. The upper band-edge is often defined as half the maximum transition frequency as occurs, for example, in a 1-0-1-0 NRZ-Level or a 1-1-1-1 NRZ-Mark data sequence In these examples, the symbol rate (clock rate) is twice the upper band-edge frequency. FIG. 11 illustrates typical, unequalized reproduce amplitude versus log frequency transfer characteristic curves. In FIG. 11A, the upper band-edge (maximum data frequency) is in the peak region of the curve. The location of a clock-rate pilot frequency and a 1.5 times clock-rate pilot frequency are also shown. Obviously, other synchronous pilot frequencies could be defined. In FIG. 11B, the upper band-edge is assumed to lie in the gap-loss slope of the curve. A clock-rate pilot frequency would lie within the first null region of the curve and no useful response would be possible. However, useful response may be found in the region of the curve's second peak which could accommodate a 1.5 time clock-rate (or another frequency) pilot signal. The usefulness of a second peak region response is determined by the output and resolution of the medium as well as the reproduce head gap definition.

Any synchronous signal which can be recorded and reproduced with data might be useful as a timing or servo reference. However, in order to enhance reproduced data signal waveforms, the pilot must be phase coherent with data transitions as well; that is, pilot signal peaks must correspond to data signal peaks, or in the case of constant amplitude with frequency post-equalization, pilot signal points of inflection (zero crossings) must correspond to data signal points of inflection. For typical digital data, no single frequency of constant phase can meet this criterion. Therefore, a pilot signal must be changed in phase to accommodate data transition phase if it is to serve as a useful pseudo-harmonic. Several approaches to pilot signal enhanced, sequential impulse recording are to be described and illustrated which include the record equalization features described above.

Figure 12:
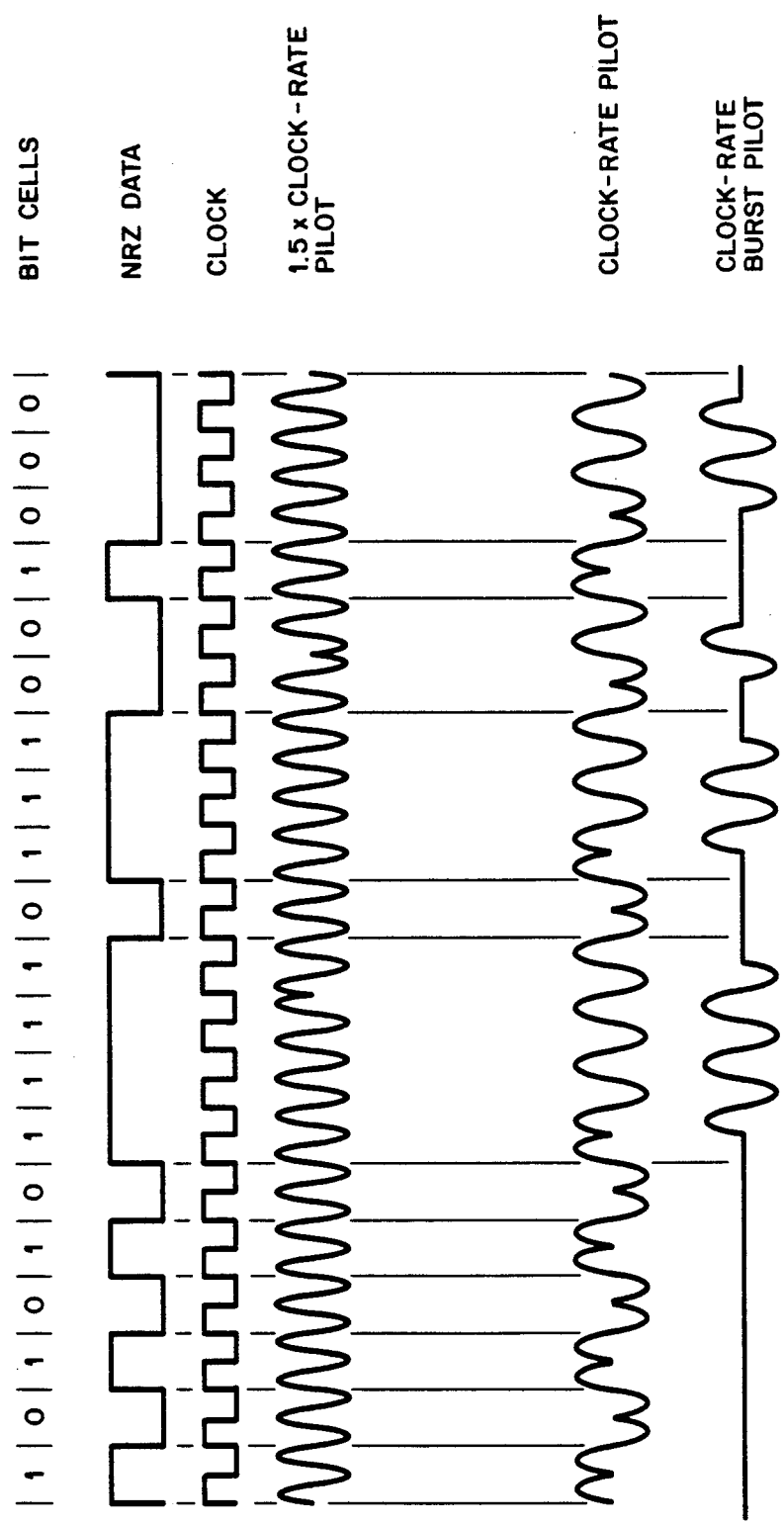
FIG. 12 depicts three clock-rate related pilot signals, and illustrates phase coherence of pilot signal with data transitions.

Phase accommodation may be adaptive, that is, a pilot signal may be changed in advance of a transition in accordance with a look-ahead determination afforded by delaying the signal; or phase accommodation may be systematic, that is, pilot phase may be changed according to an algorithm which predicts transition phase soley from preceding data sequences or other system information. FIG. 12 shows a reference clock defining one bit-cell per clock cycle, and an NRZ data waveform with phase accommodated pilot signals. A clock-rate pilot, and a 1.5 times clock-rate pilot are shown. For these pilot frequencies with NRZ data, only two phases differing by 180 degrees are required for data phase accommodation. Obviously, other pilot frequencies either beyond the upper band-edge or within the pass-band might prove useful and more than two phases might by required to facilitate their use. A pilot burst occurring only during intervals without data transitions would be sufficient for clock recovery. FIG. 12 shows an example of a burst, clock-rate pilot signal.

Figure 13A:
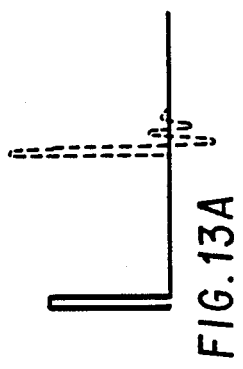
FIGS. 13A through 13C show three record current impulse waveforms.

Clock-rate pilots are made phase coherent with the NRZ data by a systematic alternation of phase following each data transition; 1.5 times clock-rate pilots are made phase coherent with the NRZ data by means of an adaptive phase change determined by means of a look-ahead delay. Such phase changes need only occur prior to data transitions which terminate an interval having an even number of bits, as is shown in FIG. 12. In the example of this figure, the look-ahead delay is one bit cell. In addition to the pilot functions previously described, the pilot signal can be used to obtain sustaining planar vector continuum magnitude for long intervals of a write equalized impulse recording. In the special case of recording sinusoidal pilots, this sustaining function is implemented by suitably clamping or offsetting the pilot signal to produce the level and sense necessary for equalization, as will be shown. A broad spectrum of signal current waveforms can be used to record pilots as well as transitions and sustaining levels. FIG. 13A illustrates a narrow, rectangular pulse waveform. This pulse is ideal for application to record head driver/record head combinations capable of receiving fast edge speed signals without producing detrimental ringing. An example of ringing is illustrated in phantom in FIG. 13A; it is produced by underdamped recording systems and may result in undershoot which at least partially erases the recording. Inversely, overshoot, if repeatable and of greater duration than the few nanoseconds required to switch magnetic media domains, is merely an incremental increase in the total impulse amplitude, controllable by compensating the driving (input) pulse amplitude.

Figure 13B:
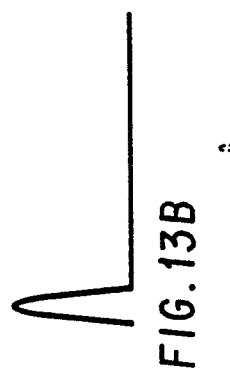

FIG. 13B depicts an approximate half-sinusoid impulse more readily accommodated by systems having record bandwidth limitations. This pulse is narrow in the peak region which, in essence, produces the greatest recording effect, but rise time is also a factor for consideration. An excessively long transition impulse rise time can extend recorded transition length and increase peak shift. Rise times are less critical for sustaining impulses, a fact which mitigates use of half-sinusoid pulses for this purpose.

Figure 13C:
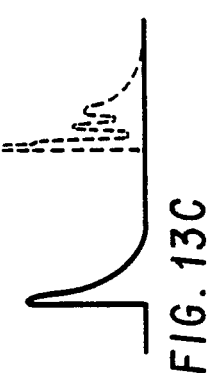

FIG. 13C shows an impulse waveform characterized by a fast rise and a slow, approximately exponential fall. This pulse is useful for controlling undershoot in underdamped recording systems as is shown in phantom. Underdamped recording systems exhibit fast edge speeds and are typical of current source head drivers with high value damping resistors or no damping resistors.

It has been found that, in the pilot enhanced or amplitude equalized impulse recording methods which are the subject of this invention, greater current impulse durations can be accommodated consistant with accurate data recovery than can be accommodated by the more fundamental, constant amplitude, sequential impulse method. The enhanced impulse techniques described herein can, in many cases, provide accurate data detection from recordings made with impulse (current on) duty cycles exceeding 35% for both transition and sustaining impulses. Thus, the enhanced impulse techniques are more forgiving of a limited record channel bandwidth provided that record head gap lengths do not appreciably exceed twice the distance traversed by the magnetic medium during the time interval between its most closely spaced, recorded data transitions or transition impulses. Record gap length with respect to sustaining impulse interval is relatively less consequential.

In general, the highest magnetic moment and output associated with a system's maximum transition rate will result from a record head gap length long enough to produce a recorded increment equivalent, in length, to that maximum rate interval (minimum transition spacing interval). A longer record gap may improve overwrite and reduce clock-rate components in the reproduce output signal, but, as has been stated, such components may be desirable as a pilot; furthermore, if improved overwrite is required, it can be achieved by increasing overwrite impulse amplitude to a level exceeding transition impulse amplitude without resorting to a long record gap. An excessively long record gap makes it more difficult to control the recorded depth of long wavelengths, produces phase errors and opposes a purpose of the subject invention which is to achieve a reasonably linear, phase and amplitude equalized, constant depth recording of digital data requiring little or no post-processing for accurate recovery.

Figure 14:
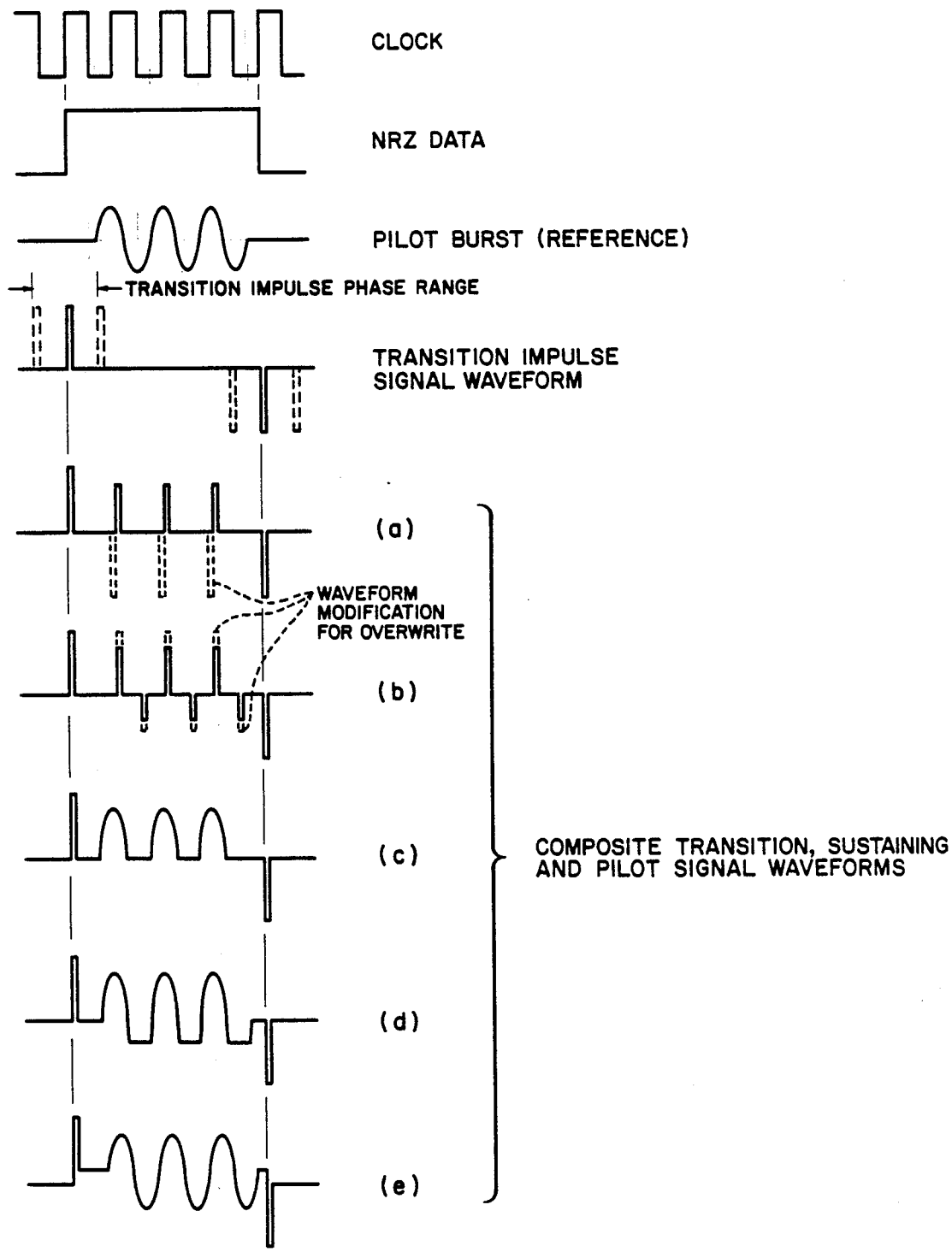
FIG. 14 shows several approaches to obtaining amplitude equalization with a pilot signal.

FIG. 14 shows composite current waveforms which might be used to equalize and record digital data. All of these waveforms are, in general, functionally equivalent. NRZ data; the clock signal; and the burst, clock-rate pilot are shown for reference. A transition impulse signal waveform is also shown with a phase (timing) adjustment range indicated by phantom line impulses positioned at each limit of adjustment. Typically, the relative phase of pilot and transitions would be fixed by system design or adjustable to achieve optimum output waveforms with minimum peak shift, that is, an optimum phase and amplitude equalized recording. Phase adjustment depends on pilot frequency and the phase transfer function of the record/reproduce channel.

For the solid line portion of waveform (a) in FIG. 14, one pilot cycle of low amplitude would be generated per sustaining impulse provided that the heads and medium offer adequate resolution, as was previously explained and illustrated in reference to FIGS. 8 and 9. In the solid line portion of waveform (b), low level, opposite polarity (negative) impulses are used in conjunction with sustaining level impulses. Use of this signal increases pilot output level over that of (a). The dashed line portions of (a) and (b) depict waveform additions modifying pilot and sustaining level recording sequences to simultaneously achieve overwrite. Waveform (c) corresponds to (a) but uses half-sinusoid impulses which might be produced by clamping negative half-cycles of a sinusoidal pilot signal to ground. Waveform (d) corresponds to (b) and might be derived from a sinusoidal pilot clamped to a negative level. Waveform (e) also corresponds to (b) but is derived from a low (sustaining) level offset of a sinusoidal burst pilot in accordance with data polarity. This latter technique is reminiscent of ac biased, linear region recording of a low data signal level if transition impulses are disregarded.

All of the composite signals illustrated in FIG. 14 can be employed to effect simultaneous recording of data transitions, equalized sustaining data levels, and pilots. Their selection would be determined considering record channel bandwidth, medium resolution, and circuit complexity. Obviously, rectangular impulse waveforms could be changed to at least one alternate, prototypical form of FIG. 13 for reasons previously explained or at the discretion of a system designer.

The sustaining impulse time interval of FIG. 14 is an NRZ clock period. It will maintain the required sustaining level through properly spaced recorded increments, as well as provide a pilot signal, with record and reproduce heads of correct gap dimensions (i.e. less than one bit-cell in length). If this time interval is increased, to record increments at medium space intervals substantially greater than a bit cell, pilot output will become excessive—at a new frequency—while sustaining level will become deficient. Therefore, a minimum impulse frequency limit, i.e. a maximum impulse interval limit, exists for recording pilots by the method depicted in FIG. 14. To record low (in-band) frequency pilot bursts, high rate sustaining impulses should be used, but they can be varied slightly about their nominal amplitude, that is, alternately increased then decreased, at the desired rate and phase, to record the lower frequency pilot signal. The equivalent of this pulse amplitude modulating technique applied to the constant amplitude, overwrite and sustaining pulse pairs of FIG. 7B, of course, would be to modulate the delay period, a, with the pilot signal.

Figure 15:
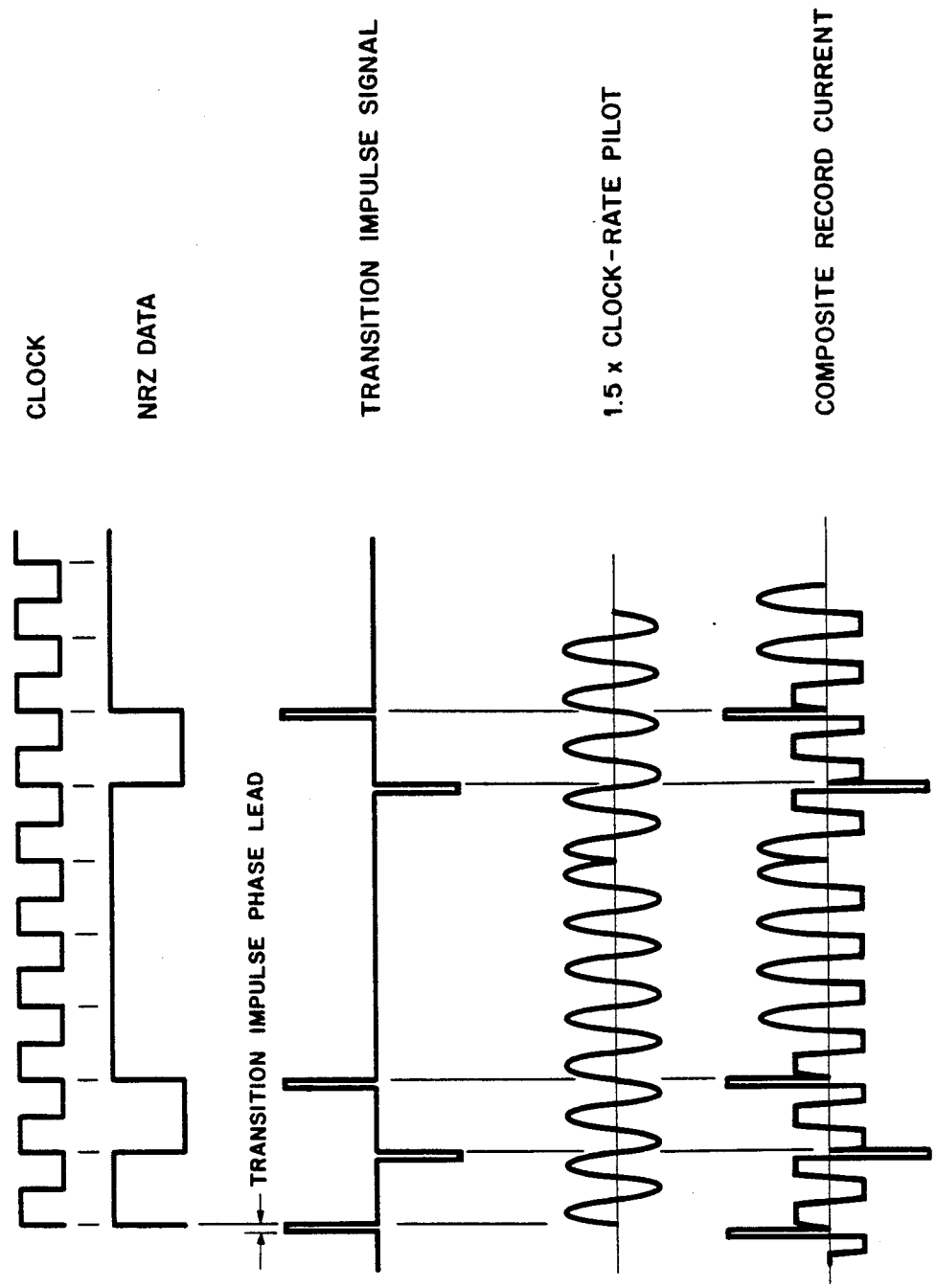
FIG. 15 illustrates combining data transition impulses with a pilot to obtain a pilot enhanced impulse recording current waveform.

FIG. 15 illustrates a composite record current signal, formed from a 1.5 times clock-rate pilot signal and a transition impulse signal timed with respect to NRZ data and clock. The pilot signal is modified as in FIG. 14(d) to obtain sustaining impulses which produce a phase and amplitude equalized recording. These signals are associated with a 10,667 bit per inch digital tape recording system using pilot enhanced, impulse recording. Bit cells recorded by this system are 93.7 microinches in tape length; record and reproduce head gap lengths were both nominally 95 microinches. The reproduce channel characteristic is described by FIG. 11B with the pilot frequency occurring in the second peak region of the curve. Gap definition and short wavelength resolution of the tape, at this density, were adequate to provide ideal pilot output.

The NRZ data sequence shown in FIG. 16 was used to evaluate this pilot enhanced impulse recording tape system. The test sequence is equivalent to that described in reference to FIG. 3 and used to produce the transition histograms in FIG. 4 for other recording methods. FIG. 16 also shows the composite record current, amplified reproduce head signal and detected data signal waveforms with a transition histogram produced in this evaluation. The histogram in FIG. 16 clearly reflects the minimal peak shift and high accuracy of detected data from this system. The reproduce head signal waveform exhibits the enhancing effects of the pilot signal on data transitions. Peaks are sharply defined with negligible shifts from perfect locations. Phase adaptation of the pilot, as required to accommodate data transitions, and the correct phase relationship between transitions and the pilot signal assure that the pilot adds constructively to all reproduce peak-forms.

The reproduced pilot signal is continuous, at one phase or another, and is recovered by filtering in this system. The recovered pilot is frequency divided to a clock-rate related frequency for clock recovery reference during long intervals without data transitions. Clock separation is thus assured without limiting maximum data run lengths. Accurate clocking was maintained during tests of this system employing data patterns having intervals between transitions up to 80 bits long.

It is particularly significant that the high degree of accuracy of this pilot enhanced impulse recording system is achieved by means of record equalization, not post-equalization, and that the reproduce head gap length is at least twice that of typical, commercial, data processing digital recorders of comparable density. Moreover, the record/reproduce channel is essentially linear and exhibits a high degree of noise immunity.

Pilot recovery from enhanced impulse recordings is not essential to the value of such recordings, nor is it required that reproduced signals always exhibit the marked enhancement effects of FIG. 16. In some systems the head/medium interface will not be capable of resolving a high frequency pilot or sustaining clock signal, but, even without such resolution, pilot enhanced impulse recordings are linear and equalized in phase and amplitude. They produce high resolution data signals with low peak-shift, whether or not a pilot frequency is discernible in the waveforms. In fact, a pilot enhanced recording is simply a properly phased (timed), amplitude equalized, sequential impulse recording; accordingly, as used herein, the term "pilot enhanced impulse recording" can refer generically to any of the improvements to sequential impulse recording which achieve a write equalized recording and which are the subject of this invention.

Figure 17:
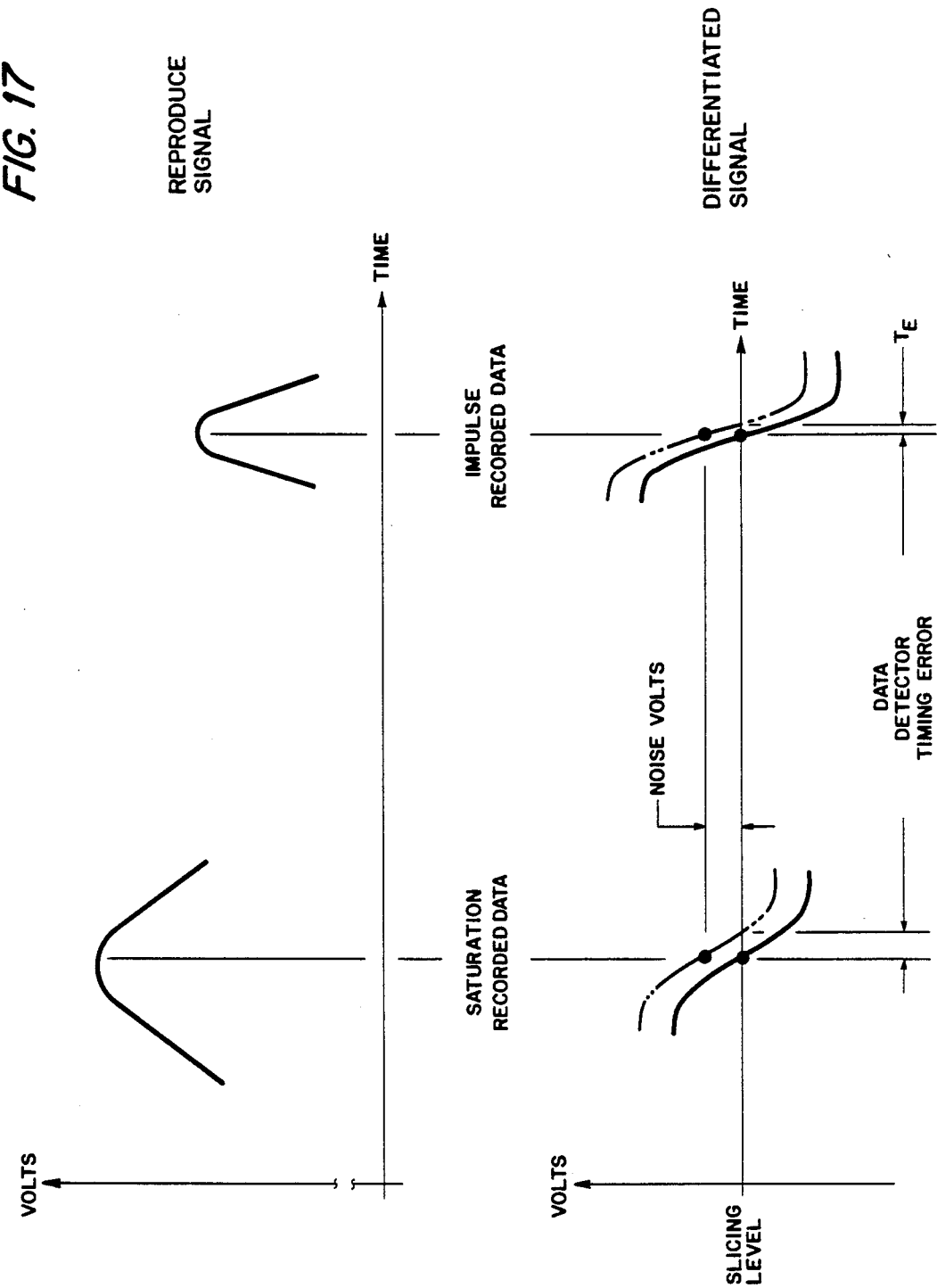
FIG. 17 graphically illustrates the difference in the effect of noise on timing errors between saturation or continuous recorded data and impulse recorded data.

FIG. 17 depicts reproduce signal peaks (transitions) representative of those from both conventional saturation recordings and impulse recordings. Signals representing the differentiation of these transition peaks for peak detection are also shown. When differentiated signals are offset from a peak detector slicing (threshold) level by noise, a timing error results. The signal, offset by noise, intercepts the slicing level erroneously in time, as is shown in FIG. 17. The lower the slope of the differentiated signal, the longer will be the timing error produced by noise. Since sharp peaks from impulse recordings produce differentiated signals having greater slope than those produced from the broader peaks of conventional saturation recordings, impulse recorded signals have greater noise immunity. This noise immunity exists despite the fact that isolated transition peaks from impulse recordings are lower in amplitude than isolated peaks from conventional recordings. In addition, media surface modulation noise is less from impulse recordings than from conventional saturation recordings.

The signal sub-system of FIGS. 15 and 16 was applied to the same recording system, including heads and medium, as was used to obtain the data of FIG. 4. The combined system was evaluated at a recording density of 33,000 bits per inch, the same as that of the FIG. 4 data. The high resolution reproduce signal and high detection margin histogram of FIG. 18 resulted from this evaluation. Pilot wavelength resolution of this head and medium combination was low and no pilot signal energy is evident in the reproduce waveform. In this case, only the linear, phase and amplitude equalized character of the pilot enhanced impulse recording system is evident, but improvement over the conventional saturation and basic sequential impulse recording techniques is obvious from a comparison of the data obtained for all three methods included in FIGS. 4 and 18.

Figure 18A:
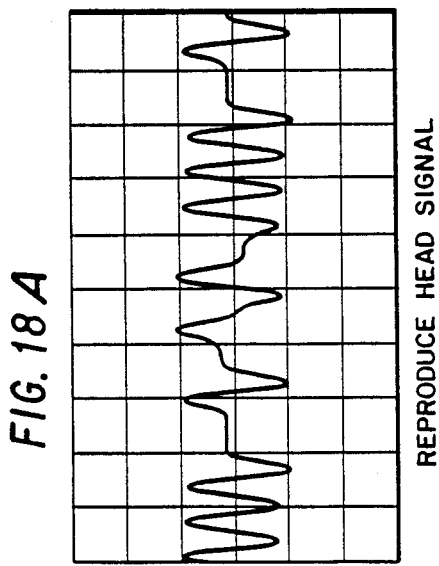
FIGS. 18A and 18B illustrate a reproduce head waveform and transition time interval histogram for pilot enhanced (amplitude equalized) impulse recorded data, for the same data word and comparable conditions as used for FIG. 4.
Figure 18B:
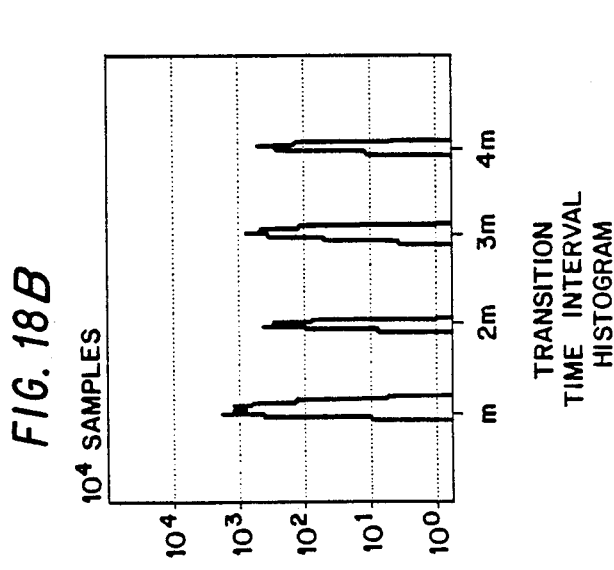
Figure 19:
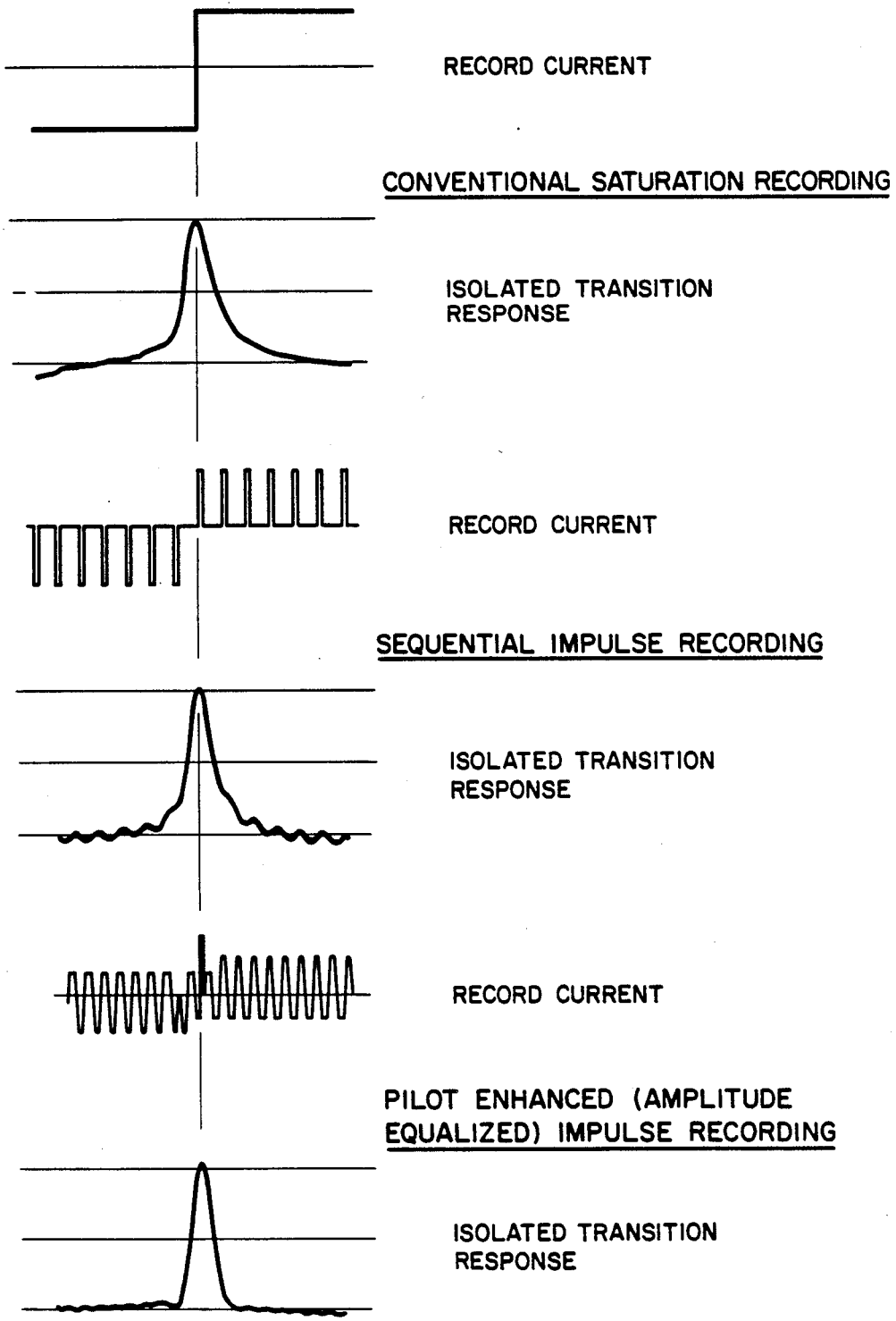
FIG. 19 provides a comparative depiction of transition responses obtained by continuous saturation recording, sequential impulse recording, and pilot enhanced (amplitude equalized) impulse recording.

Comparison testing of conventional, sequential impulse, and pilot enhanced impulse recording methods was conducted at a density of 33,000 bits per inch on a medium having higher resolution than that used for the tests of FIGS. 4 and 18. Both the record and reproduce heads had gap lengths of approximately 18 microinches. FIG. 19 shows the record current waveforms and reproduce channel, isolated transition responses associated with each method. The half-amplitude pulse width (PW-50) is tabulated below for each method in recorded wavelength equivalent terms:

| Recording Method | Reproduced Pulse PW-50 |
| --- | --- |
| Conventional | 52 microinches |
| Sequential Impulse | 34 microinches |
| Pilot Enhanced | 28 microinches |

These pulse widths compare to a bit cell length of 30 microinches. It is significant that, for the pilot enhanced method, the PW-50 is less than a bit cell. Pulse amplitudes were gain normalized in FIG. 19 to facilitate comparison.

FIG. 20 provides the comparison of reproduce waveforms and reproduce data transition time interval histograms among the three recording techniques. Test data sequences were the same as for the tests of FIGS. 4 and 18. Results are patent upon inspection of FIG. 20.

Figure 21A:
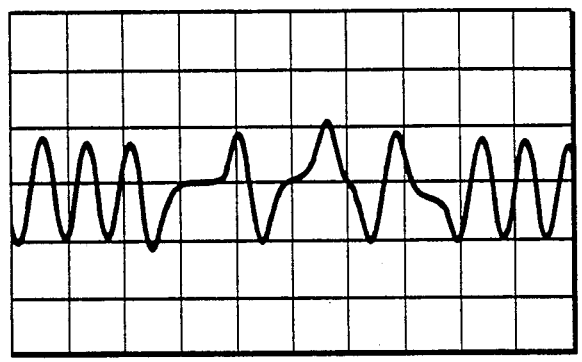
FIGS. 21A through 21C show a reproduce head signal, a data transition time interval histogram, and a data transition-to-clock time interval histogram, for a pilot enhanced (amplitude equalized) impulse recording, at a recording density of 45,000 bits per inch.
Figure 21B:
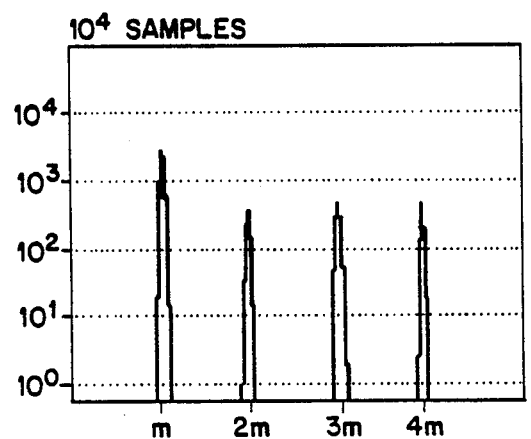
Figure 21C:
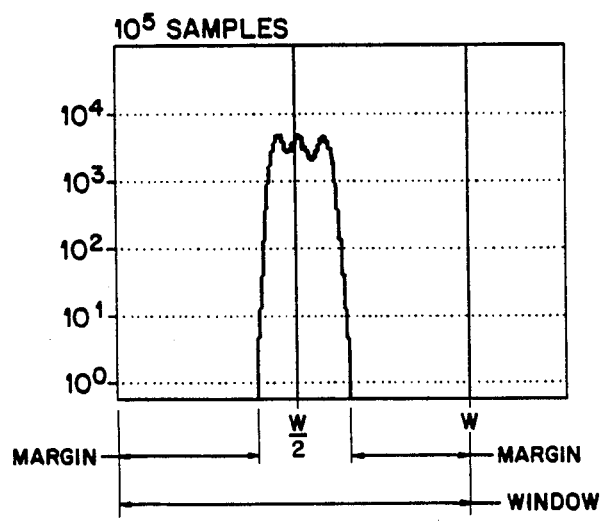

The same system that produced the results of FIG. 20 was then evaluated at the higher packing density of 45,000 bits per inch using the same medium and heads. FIG. 21 shows the results of the pilot enhanced impulse recorded data. Signal resolution is excellent and the window margin is a generous 70 percent.

Some channel codes accommodate more information in a given base bandwidth than NRZ by using phase in addition to binary levels to convey intelligence. The same minimum transition interval exists as for NRZ, but more sites affording opportunities for transitions are defined. For such codes, detection windows are narrowed to the minimum interval between adjacent, possible transition sites. An example of a high rate channel code is 3PM. Its information rate is 1.5 times an NRZ code rate, its detection window is one-third of an NRZ window, and its transition clock rate is 3 times that of NRZ.

Figure 22:
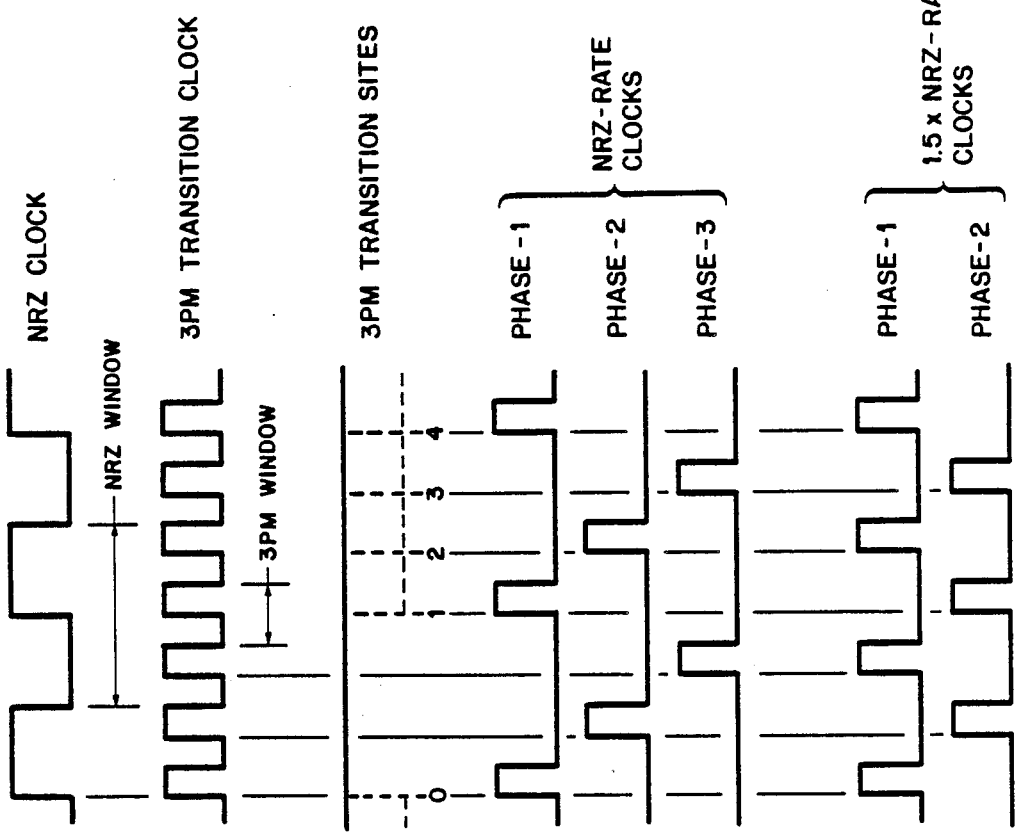
FIG. 22 shows alternate clocking schemes for impulse recording 3PM code.

When such codes are impulse recorded, it is not necessary to increase impulse clock rates (decrease all pulse intervals) over that which would be used for recording NRZ. It is merely necessary that such clocks exist in a quantity of phases to accommodate all possible transitions. This is illustrated in FIG. 22 for an impulse clock rate equivalent to that of NRZ, and for a rate of 1.5 times that of NRZ used with 3PM code. The 3PM transition clock is also shown with a comparison of 3PM and NRZ detection windows. During recording of such codes, logic circuits can systematically or adaptively switch the required impulse clock phases in anticipation of transitions. The same method can be applied with any code having a transition clock interval shorter than the minimum ideal interval between impulse recorded increments.

In the previously described example of pilot enhanced impulse recording, great benefit was derived from switching the phase of a 1.5 times NRZ clock-rate pilot to coherence with NRZ data transitions. In the described case, the procedure of adapting data transition timing to a constant phase pilot could be employed as an alternate.

Figure 23:
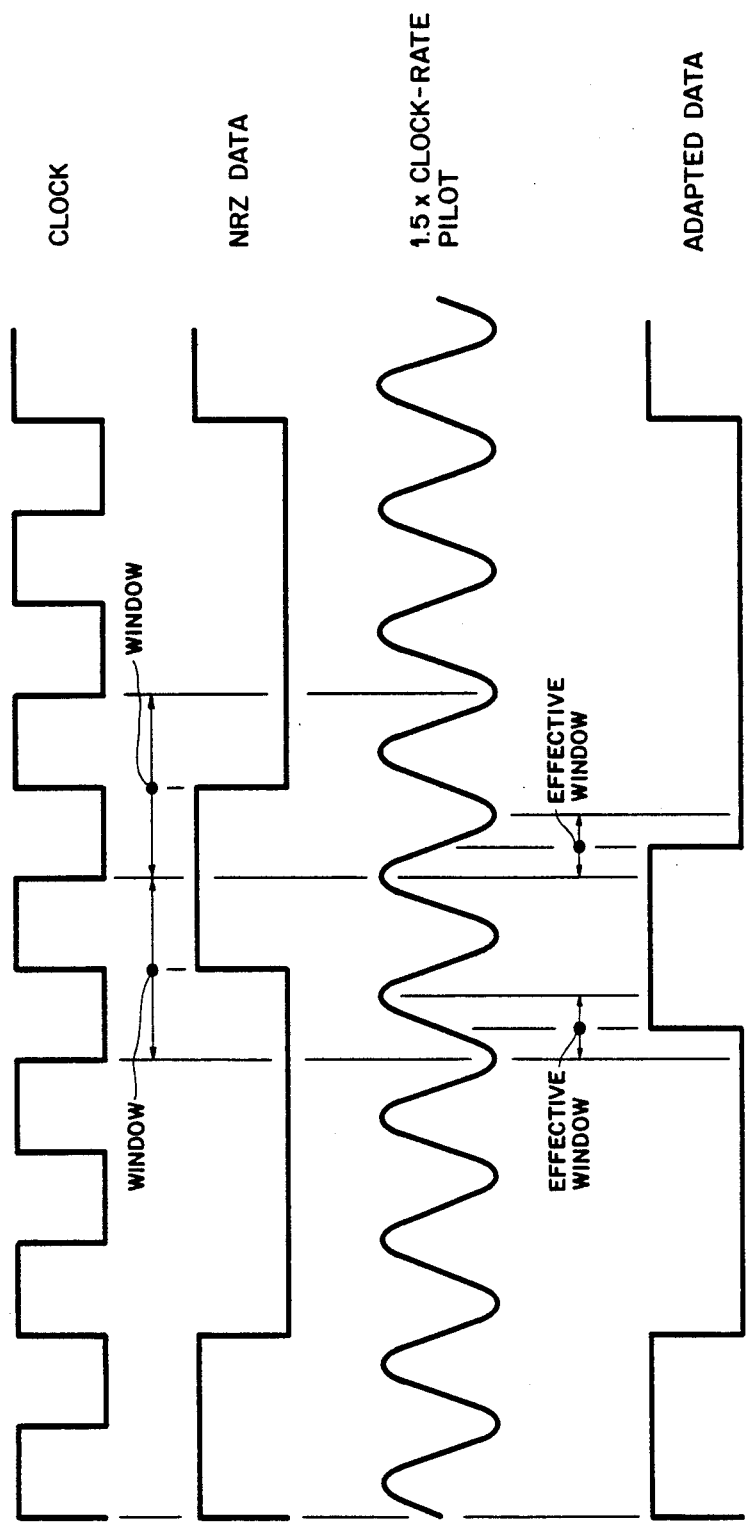
FIG. 23 illustrates one variation of pilot enhanced impulse recording in which data transitions are adapted for recording to phase coherence with a constant phase pilot.

For 1.5 times clock-rate pilots applied with NRZ data, only even-ordered intervals of like bits require a phase adaptation, odd-order sequences remain in phase with the pilot. When adaptation is required, a transition site could be found on both sides of the normal NRZ transition which would be in phase with the pilot, if used. These potential alternate sites are located a half-pilot-cycle from the transition. FIG. 23 illustrates employment of a data adapting algorithm for such a system. Even ordered, like bit interval data is alternately shortened for one occurrence, then lengthened for the next occurrence by a half-pilot-cycle (one-third-clock-cycle), as the need arises. Two-thirds of the NRZ detection window is consumed by these transitions being adapted to alternate sites, that is, the detection window effectively becomes the same as for 3PM code. The site spacing is also the same as for 3PM code and a similar transition clock would be employed. Gains in pilot enhanced signal accuracy may be sufficient to mitigate the disadvantage of narrow detection windows associated with this adapted data transition alternative.

DESCRIPTION OF EMBODIMENTS FOR IMPLEMENTING THE INVENTION

In the first embodiment for implementing the subject invention, a phase adapted, clamped, non-overwriting, sinusoidal pilot is recorded in conjunction with NRZ data transition impulses on degaussed magnetic tape [refer to FIG. 14, waveform (d)]. The pilot is used not only to enhance the reproduce signal but, in addition, to aid in clock recovery thus obviating any need for code run-length limiting.

Figure 24:
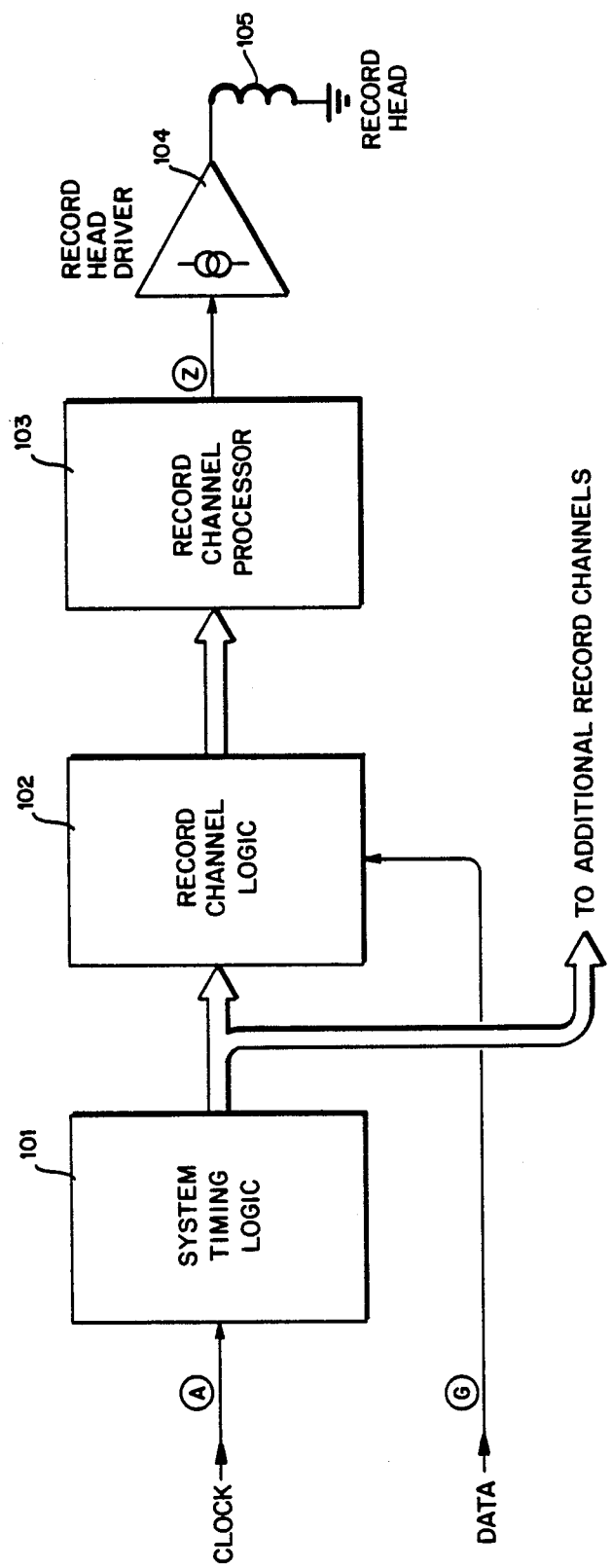
FIG. 24 diagrams the record system architecture of a first embodiment for implementing the subject invention.

FIG. 24 depicts the recording system architecture for this embodiment. The system timing logic 101 develops properly timed clock and pilot signals referenced to a host system clock. In multi-track, parallel recording systems, only one timing logic circuit need be used for all channels. The record channel logic 102 develops data transition pulses, a phase adapted pilot signal and pilot clamp control signals as required to record applied NRZ data. The record channel processor 103 generates the composite recording signal coupled to the current source head driver 104 which drives the record head 105.

Figure 25:
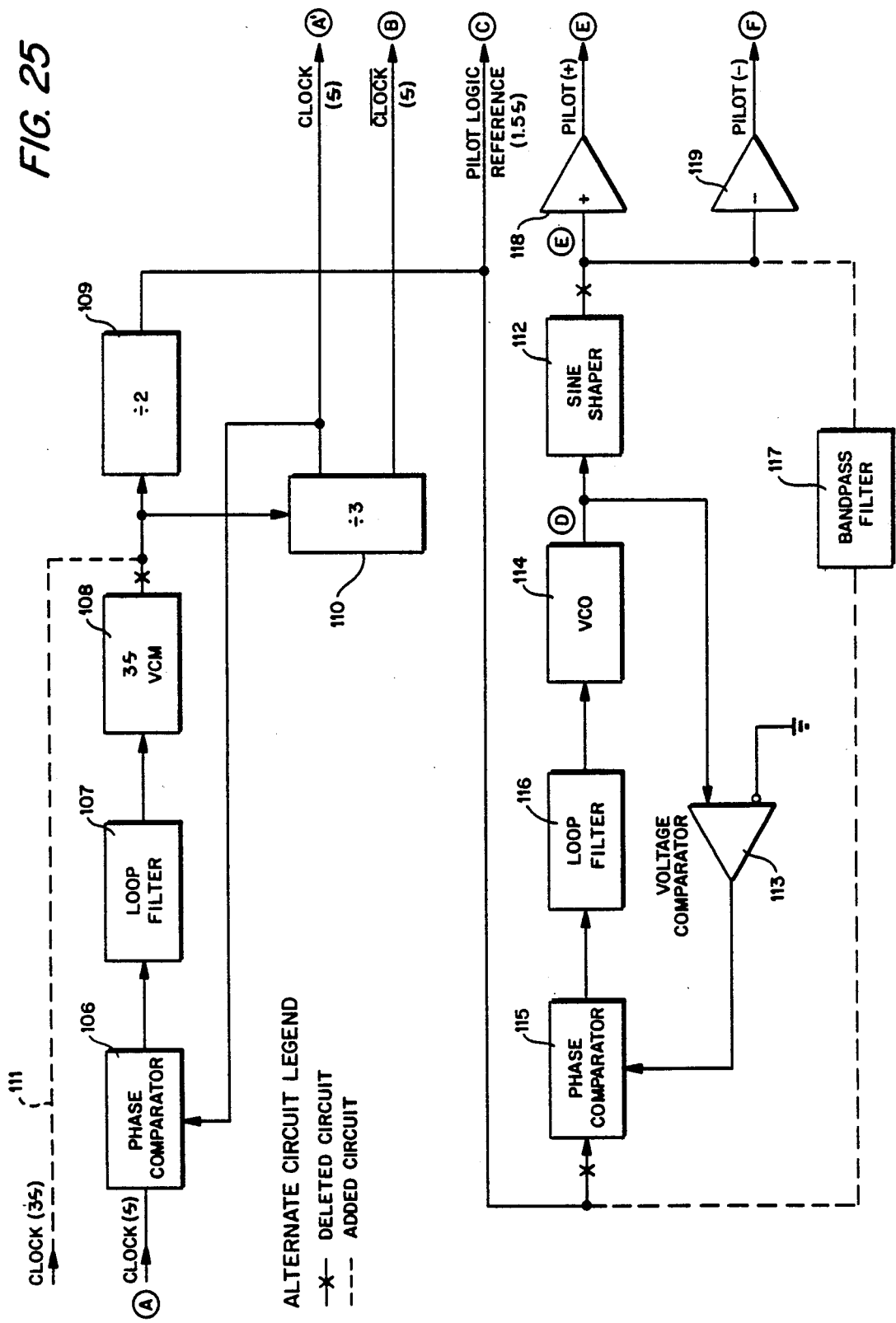
FIG. 25 is a functional block diagram of the record system timing logic used in the first embodiment.
Figure 26:
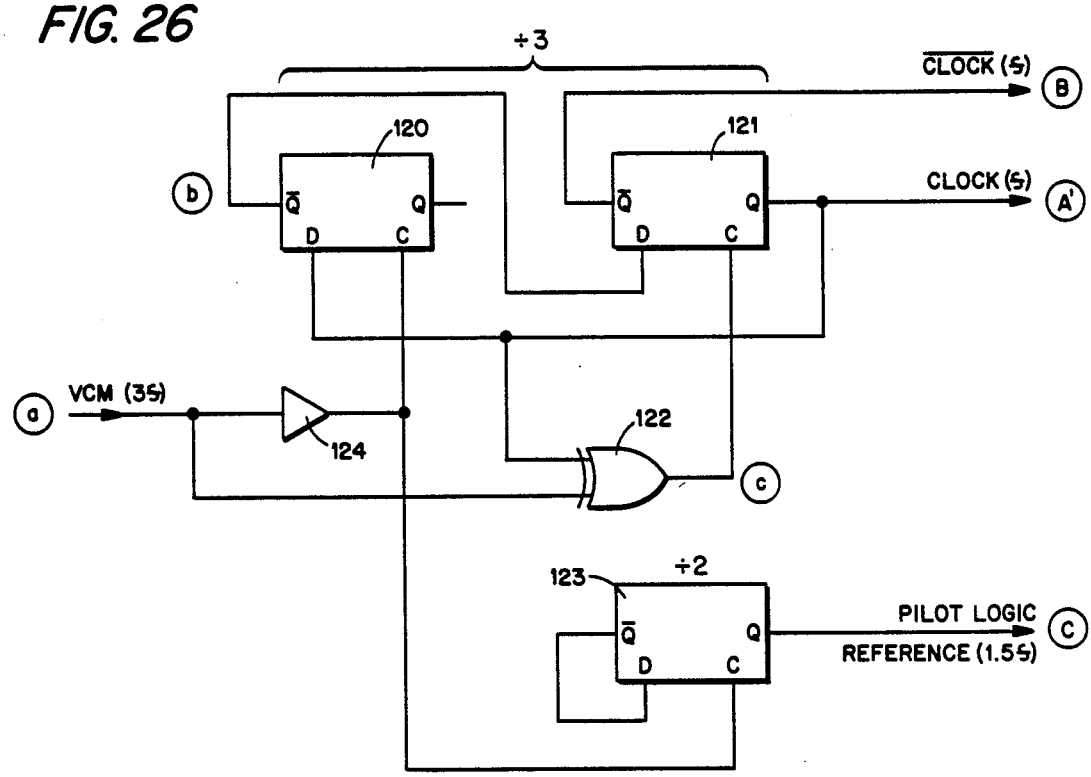
FIG. 26 is a logic diagram of the clock and pilot signal frequency divider circuit used in the first embodiment.
Figure 27:
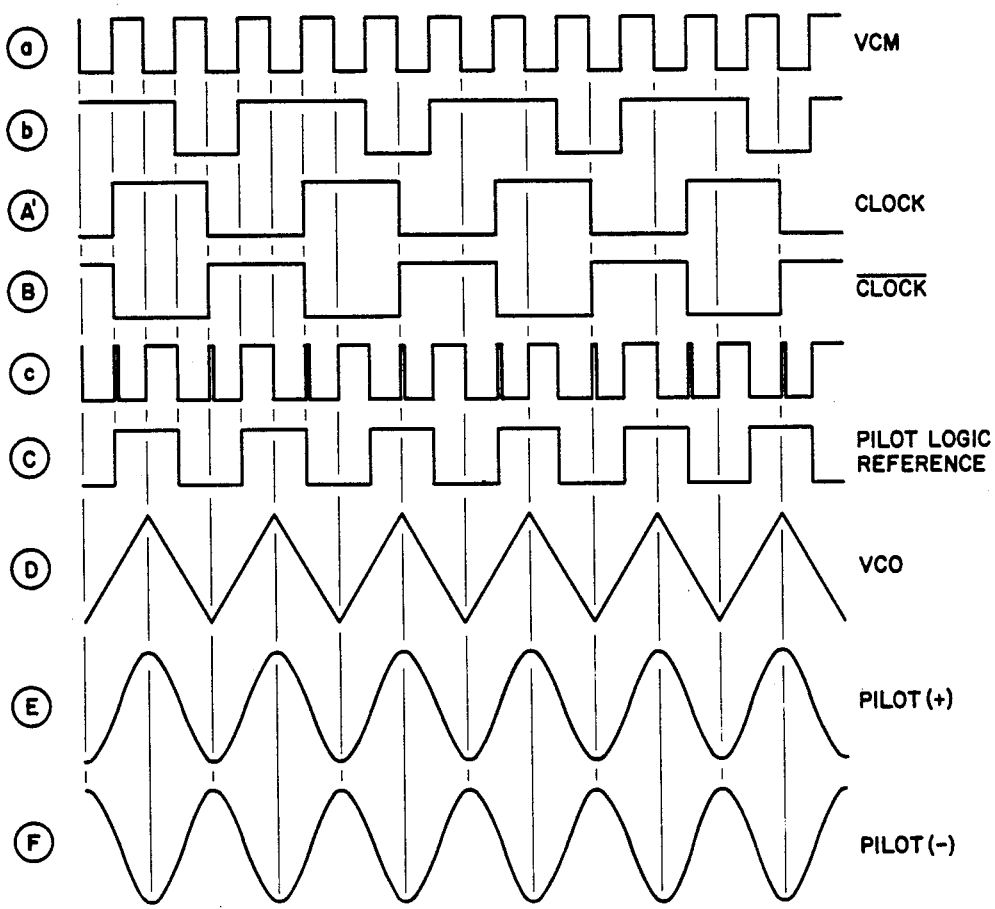
FIGS. 27A through 27F are timing diagrams for the logic of FIG. 26.
Figure 28:
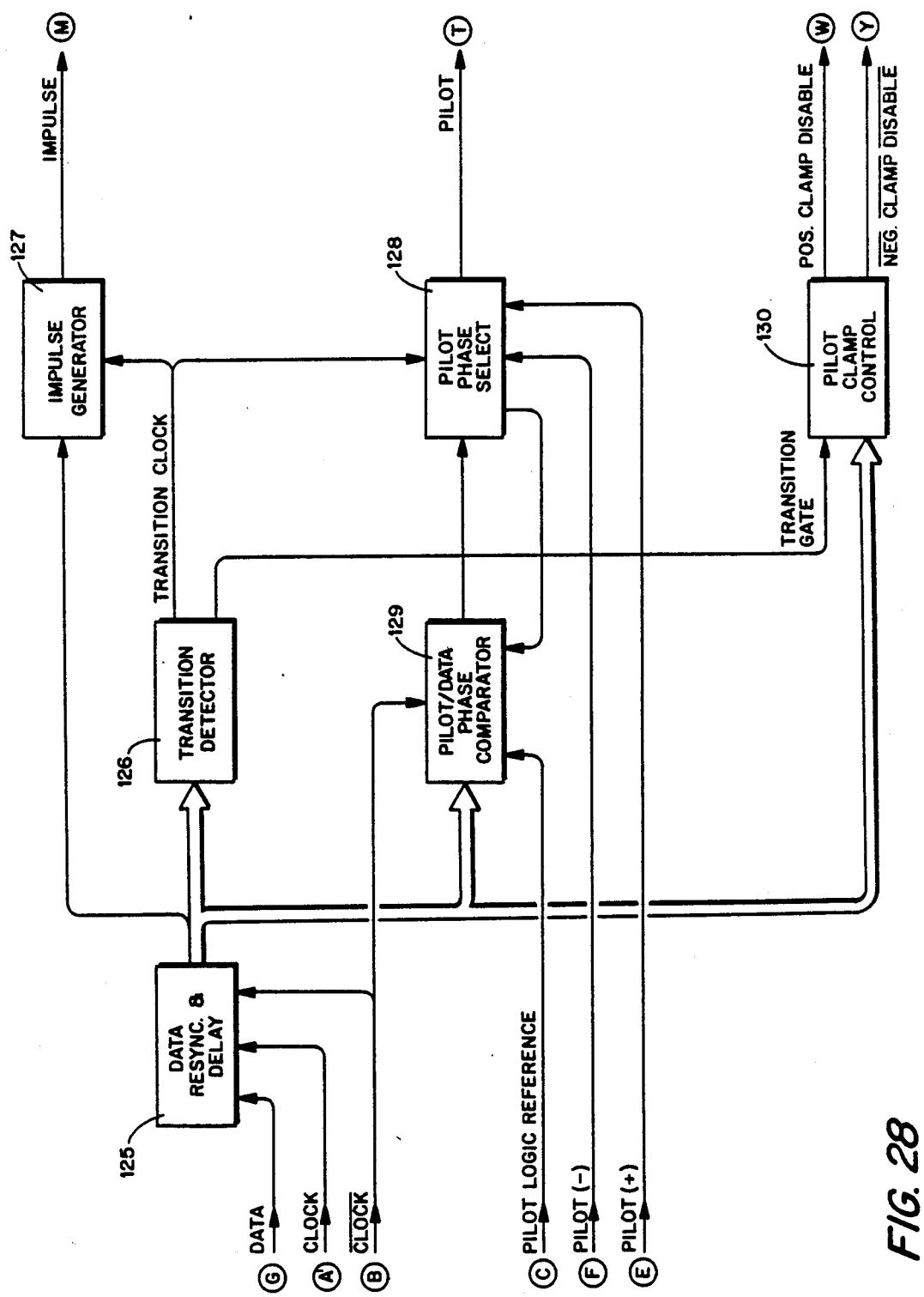
FIG. 28 depicts functionally the record channel logic of the first embodiment.
Figure 29:
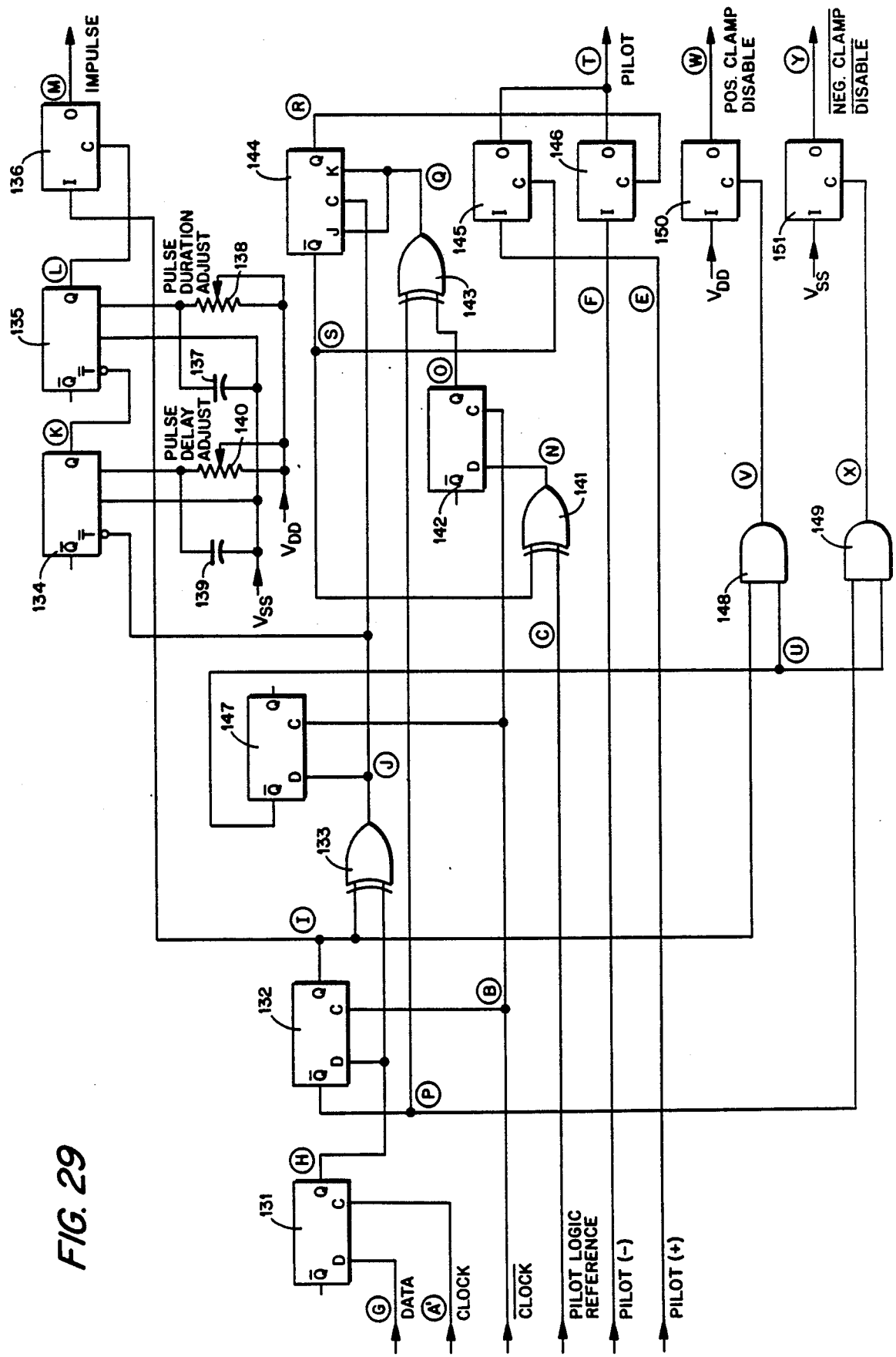
FIG. 29 is a logic diagram of the record channel logic in the first embodiment.
Figure 30:
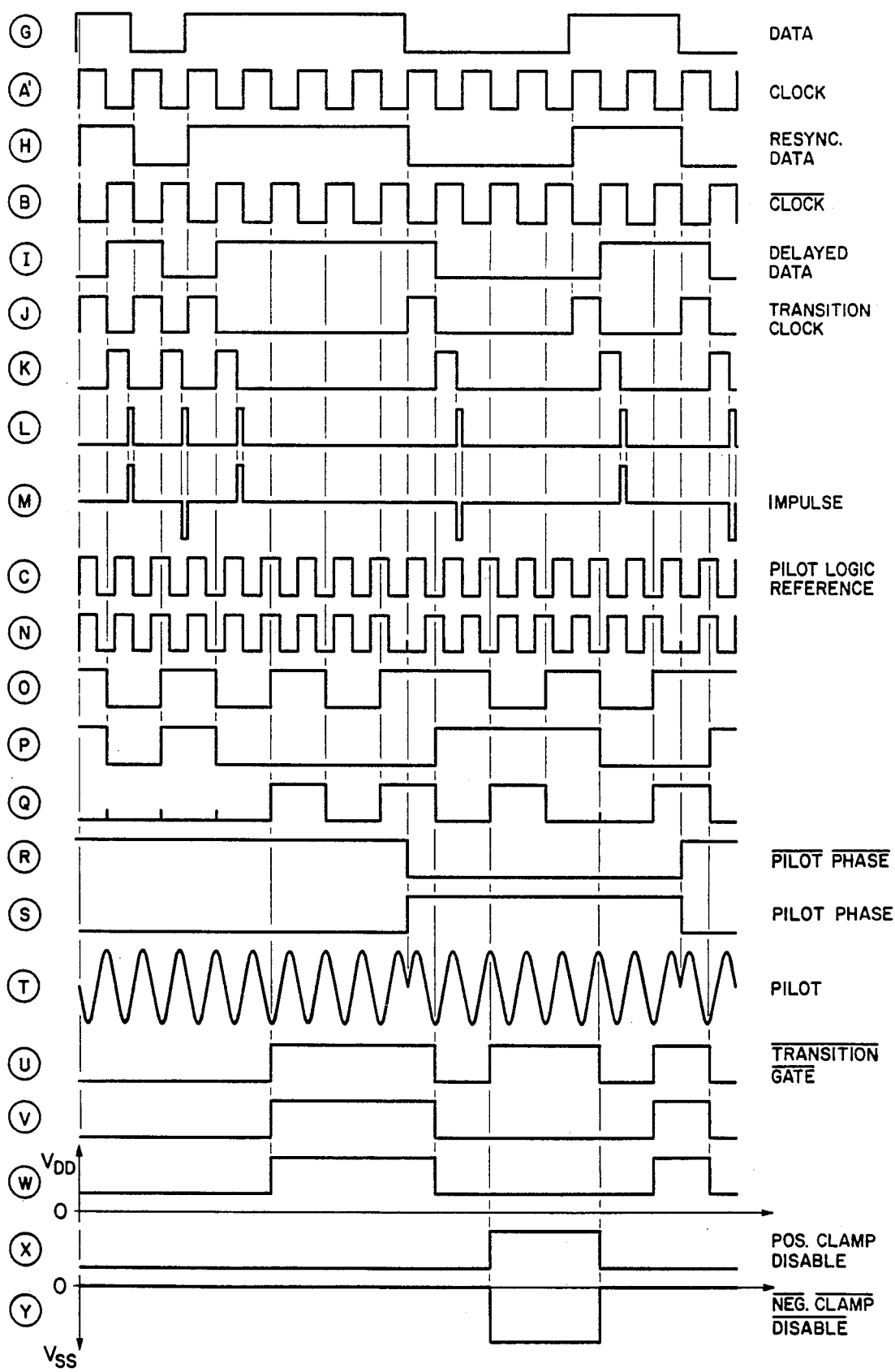
FIG. 30 is a timing diagram for the logic of FIG. 29.
Figure 31:
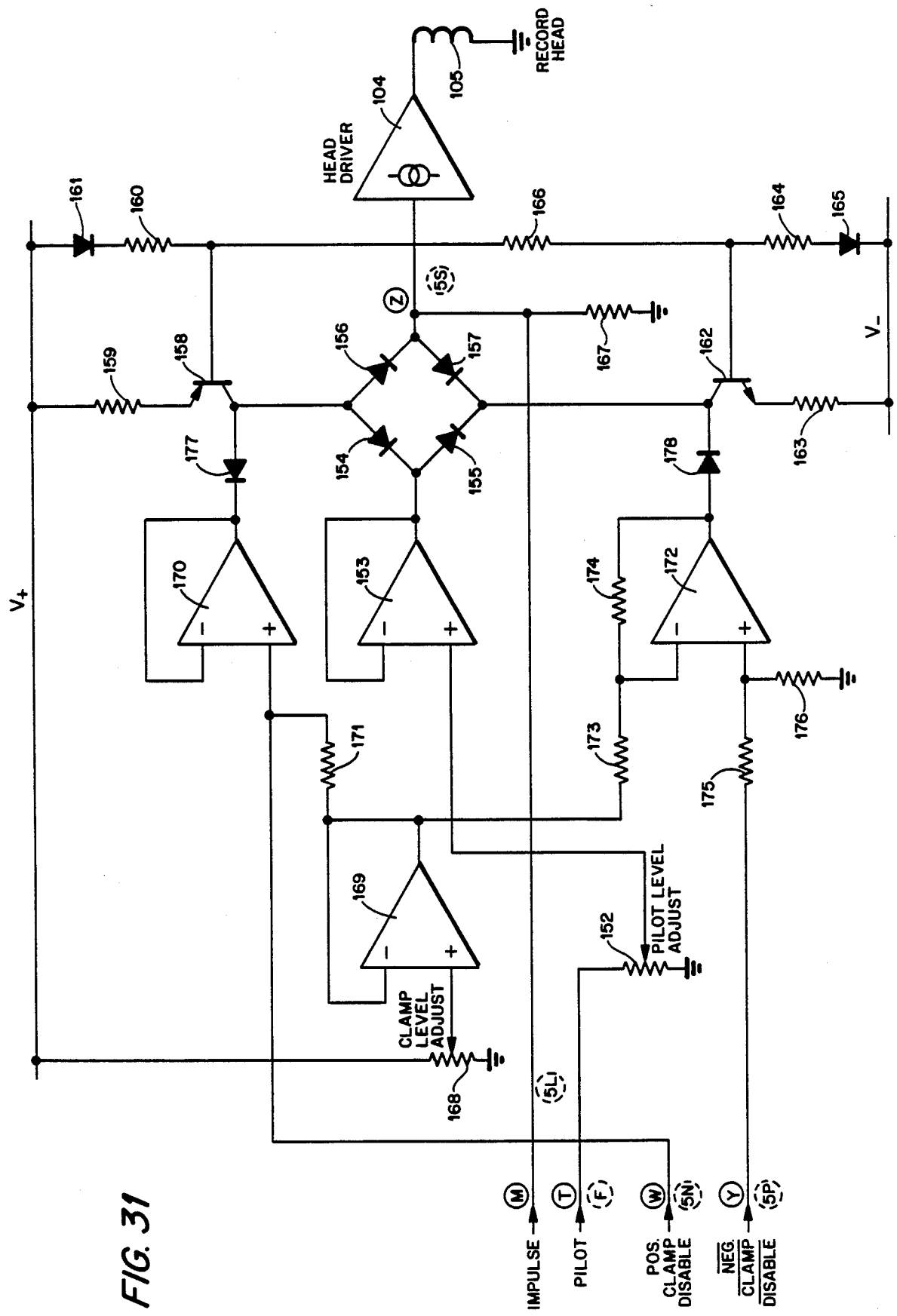
FIG. 31 is a schematic diagram of the record channel processor used in the first and fifth embodiments for implementing the subject invention.
Figure 32:
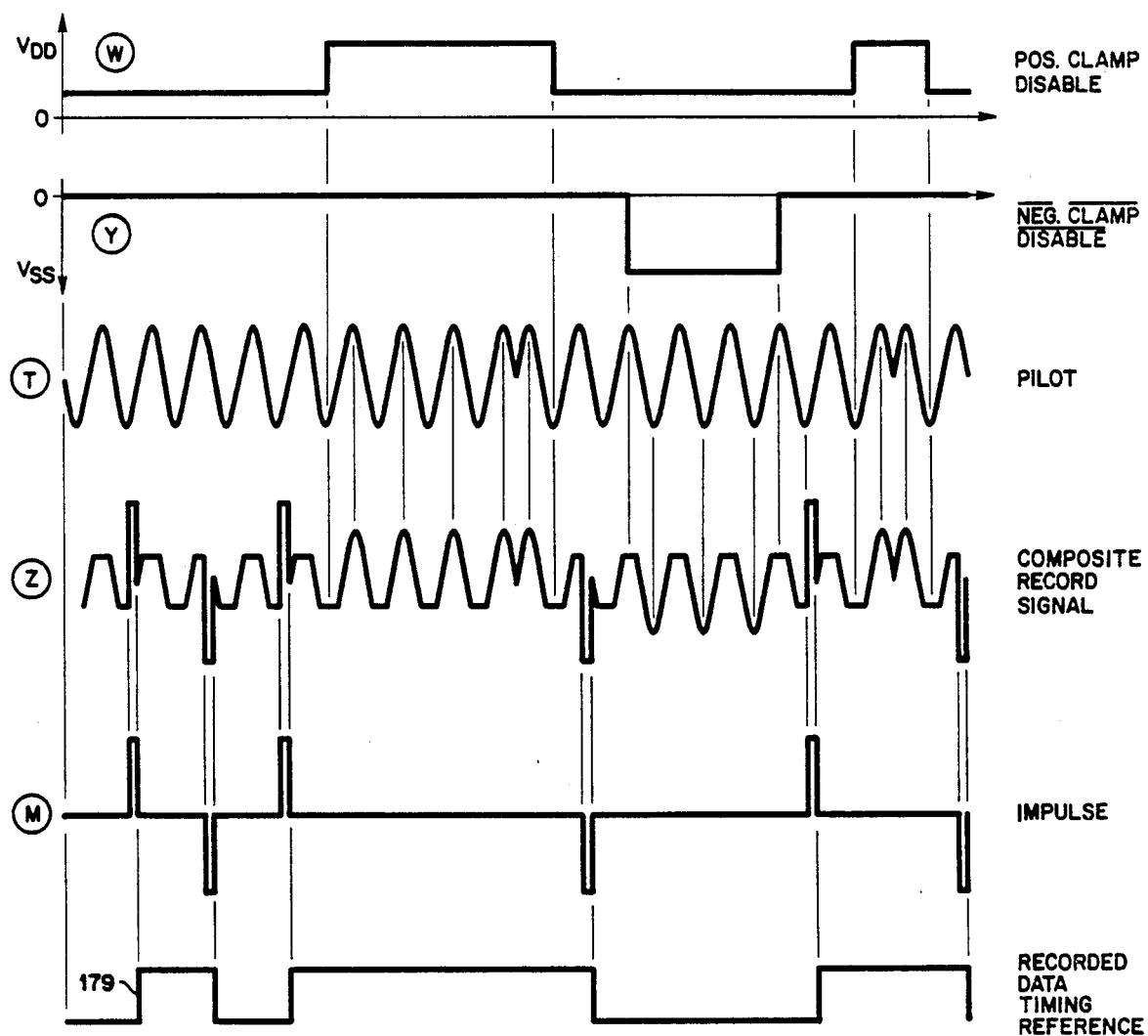
FIG. 32 diagrams signal timing for the circuit of FIG. 31.

Circled letter designations at signal sources in FIGS. 24, 25, 26, 28, 29, and 31 refer to like designations of signal waveforms shown among timing diagrams of FIGS. 27, 30 and 32.

FIG. 25 is a functional block diagram of the system timing logic 101. A conventional phase-locked loop (PLL) consisting of a phase comparator 106, a loop filter 107 and a three-times-clock-frequency, voltage controlled multivibrator (VCM) 108 is employed in conjunction with a divide-by-two circuit 109 to generate a logic level pilot signal which is 1.5 times the clock frequency. The VCM 108, in conjunction with a divide-by-three circuit 110, also generates clock plus inverted clock signals. Alternatively, a three-times-clock-frequency signal could be produced by the host system along an alternate circuit path 111, thus eliminating the need for the PLL.

Another PLL, referenced to the logic level pilot signal provides a triangular waveform signal for conversion to a sinusoidal pilot signal by the sine shaper 112. Sine shapers are known in the art and may be a diode-resistor network shaper or a differential amplifier driven beyond its linear range. The pilot PLL also includes a voltage comparator 113 which converts the triangular waveform from the voltage controlled oscillator (VCO) 114 to a logic level square wave for phase comparator 115 which, in conjunction with loop filter 116, provides the error signal voltage to control the VCO. For systems operating at a fixed data rate and pilot frequency, the sine wave pilot can be obtained by use of the bandpass filter 117 shown in an alternate circuit path of FIG. 25, thus allowing the pilot PLL to be eliminated. Filter 117 must be tuned to provide a signal in phase with the pilot logic reference signal from which it is derived. Buffer amplifiers 118 and 119 provide the respective pilot [pilot(+)] and inverted pilot [pilot(−)] signals required by this recording system.

The frequency dividers used in the timing logic are shown in FIG. 26. Two D flip-flops 120 and 121 are connected in a divide-by-three configuration with exclusive-or gate 122 to provide symmetrical square wave clock and inverted clock signals. D flip-flop 123 divides the VCM signal frequency by two, conventionally, and buffer 124 provides fan-out buffering for the VCM signal while assuring uniform propagation delay for output signals.

FIG. 27 is a signal timing diagram for the system timing logic 101 depicted in FIGS. 24, 25 and 26.

FIG. 28 is a functional block diagram of the record channel logic 102. The data resynchronizing and delay circuit 125 sets up appropriately delayed data signals for the logic. A data transition detector 126 develops a transition clock to trigger generation of rectangular impulses having the same polarity as instant data from impulse generator 127. The transition clock also triggers changes of pilot phase by the pilot phase select circuit 128 when the need for such changes is signaled by a pilot/data transition phase comparator 129.

The data transition detector 126 also generates a delayed transition gate from which, in conjunction with delayed data, clamp disabling signals are derived within the pilot clamp control circuit 130. In the absence of clamp disabling levels from this circuit, the pilot signal is clamped at both polarities. Sustaining impulses are formed by unclamping the pilot half-cycle corresponding to the required impulse polarity.

The record channel logic diagram, FIG. 29, together with the timing diagram of FIG. 30 provides details of record logic elements and functions. Bipolarity logic levels compatible with CMOS logic devices are assumed, for example, +6 volts ($V_{DD}$) and −6 volts ($V_{SS}$).

Data resynchronized to the clock signal by a D flip-flop 131 is coupled to another D flip-flop 132 to provide data synchronized to the inverted clock and, in consequence, delayed one-half a clock period. The data and delayed data signals are then applied to an exclusive-or gate 133 producing a transition clock signal which remains high for one-half a clock period following each data transition.

The transition clock signal is then applied to the negative slope trigger input of monostable multivibrator 134, the output of which drives the negative slope trigger of monostable multivibrator 135 which, in turn, provides short duration control pulses to silicon bilateral switch 136. When the switch control is low, the quiescent condition, a high isolation resistance exists between switch input and output terminals; but, when the control is high, the data level present at the switch input is applied to the switch output. Thus, transition impulses are developed having their duration determined by one multivibrator timing capacitor 137 and potentiometer 138 network, their delay with respect to the transition clock determined by another multivibrator timing capacitor 139 and potentiometer 140 network and their polarity determined by instant data.

The pilot/data transition phase comparator circuit 129 (FIG. 28) must perform the following functions:

(1) Sample, at the middle of each bit cell, the pilot reference signal level. This level correlates with the slope of the pilot signal which will exist at the end of the instant bit cell.
(2) Compare the level of the pilot slope sampling signal to the instant level of an inverted data signal. The inverted data level always correlates with the sense of the next data transition.
(3) Generate a phase error signal (flag) for each bit cell in which the pilot slope at the end of the cell will fail to correlate with the next data slope should it, in fact, occur at the end of the flagged cell.

(4) Receive a transition clock signal confirming the existence of a data transition and trigger a pilot phase change adaptive to data when the need for such a change is flagged by the phase error signal.

(5) Update the sense of the internal pilot reference signal to correlate with the instant pilot phase as it is changed.

The pilot logic reference signal is coupled to one input of an exclusive-or gate 141 which inverts it, or not, to correlate with the pilot phase currently selected. A signal correlating in level with pilot phase is coupled to the alternate input of gate 141 and its level determines inversion or non-inversion of the pilot reference.

Mid-bit-cell sampling of the pilot reference is accomplished by D flip-flop 142 being clocked by the inverted clock signal. The sampled level is held at the Q output of flip-flop 142 from mid-bit-cell to mid-bit-cell.

Coincidence of pilot and anticipated data slopes is detected by exclusive-or gate 143. Its output is low when the delayed, inverted data signal level corresponding to anticipated data slope coincides with the sampled pilot reference level corresponding to pilot slope; its output is high when pilot and data transition slopes would be non-coincident. This output is applied to both the J and K inputs of J-K flip-flop 144. When pilot and data slopes will be coincident, J and K inputs are low and the state of flip-flop 144 cannot be changed by its transition clock input. When pilot and data slopes will be non-coincident, J and K inputs are high and the flip-flop can change states if the transition clock goes high at the end of the sampled cell.

The complementary outputs of J-K flip-flop 144 control bilateral switches 145 and 146 which, in turn, select the pilot phase required for coherence with data. The J and K inputs of the flip-flop signal the need to adapt the pilot phase to a data transition should it occur; the clock input of the flip-flop signals the occurrence of a transition. If the pilot must change phase to accommodate a data transition, the transition clock will trigger flip-flop 144 to cause that change and also to cause a corresponding change in the pilot reference signal as previously explained.

This logic changes pilot phase at the time of the transition necessitating the change. Therefore, if it is desired that the pilot phase change one bit cell in advance of recorded transitions, which desire is presupposed for this embodiment, data transitions must be delayed one bit cell before recording as provided by other logic elements of this embodiment. This one bit look-ahead feature of the logic compensates response delays by reproduce circuits to pilot phase changes, thus ensuring pilot signal energy and data signal energy will be constructively additive at peaks corresponding to data transitions provided, of course, that the recorded transition, one-bit nominal delay is set for the precise phase coherence of pilot and data permitting them to be constructively additive. Also, the occurrence of pilot phase changes one bit in advance of recorded data transitions is compatible with the uniformally systematic spacing of recorded sustaining increments with respect to recorded transition increments on magnetic tape.

D flip-flop 147 generates a delayed, inverted transition gate signal from the transition clock. This signal is high when no transitions are occurring and is properly timed to signal unclamping of pilot half-cycles corresponding to the data polarity being sustained in a recording. Polarity discrimination is performed by and gates 148 and 149 referenced to delayed data and delayed, inverted data respectively. And gate 148 controls a bilateral switch 150 which provides a logic high, positive clamp disable signal when on and a high impedance when off. And gate 149 controls bilateral switch 151 which provides a logic low, negative clamp disable signal when on and a high impedance when off.

The output signals of the record channel logic 102 are coupled to the record channel processor 103 which converts them to a single, composite signal for recording. The schematic diagram of FIG. 31 and the timing diagram of FIG. 32 provides details of record channel processor operation.

The pilot signal is controlled in level by potentiometer 152 and is buffered by amplifier 153 configured as a unity gain follower. A bridge consisting of diodes 154, 155, 156 and 157 steers current from a source comprising a transistor 158, an emitter resistor 159, a bias resistor 160 and a temperature compensating diode 161. Transistor 162, emitter resistor 163, bias resistor 164 and temperature compensating diode 165 form a complementary current source (sink) also controlled by the diode bridge. Resistor 166 completes the bias network for the complementary current sources. In response to the pilot signal from the buffer amplifier 153, the diode bridge steers current from the complementary sources in a manner developing an identical pilot signal across resistor 167 if the operation of the clamp circuit is ignored.

However, the pilot signal across resistor 167 is normally clamped at both polarities to a level determined by the clamp level potentiometer 168 buffered by a unity gain follower amplifier 169. The clamp voltage is applied to another unity gain follower amplifier 170 through isolation resistor 171. The input to amplifier 170 can be overridden by a higher level, positive clamp disable signal. The clamp voltage is also applied to inverting amplifier 172 having input resistor 173 and feedback resistor 174 values which provide unity gain. Complementary clamp voltages of equal magnitude are thus provided by amplifiers 170 and 172. A low (negative) logic level negative clamp disable signal coupled to amplifier 172 through divider network resistors 175 and 176 will cause that amplifier output to reach a level too negative to clamp the less negative pilot signal half-cycles. In the absence of clamp disabling levels, these disable inputs are high in impedance and, in consequence, the complementary clamp voltages limit pilot signal amplitude.

When a positive half-cycle of the pilot exceeds its clamp level, diode 177 becomes forward biased and current is shunted to the output of amplifier 170 acting as a current sink and thereby limiting the pilot signal level across resistor 167. A logic high, positive clamp disable signal raises the diode 177 reference voltage too high for the diode to become forward biased by even the maximum pilot amplitude, this condition then allows the full pilot amplitude to be developed across resistor 167. The operation of the negative clamp circuit which includes diode 178 corresponds to that of the positive clamp circuit explained above.

The diode bridge isolates the pilot signal thereby permitting an impulse signal of high relative amplitude from a low impedance source to override it and eliminate interaction between pilot and impulse levels in the composite signal formed at the bridge output. The applied impulse voltage is converted to the correct peak record current by a current source head driver 104 which, in turn, drives the record head 105; correct relative pilot level is set by potentiometer 152. The head driver may include means to adjust record current or be gain fixed, depending upon the application system. Obviously, a potentiometer and a buffer amplifier could be added to the impulse input circuit to accommodate control of impulse level independent of record head driver gain.

One commonly used criterion of correct record current applicable to impulse current levels is the capacity to reproduce a maximum level signal from a recording of the system's highest data transition rate. Pilot levels and clamp levels are adjusted with respect to impulse levels to provide the correct sustaining record current for a properly equalized reproduce signal having sufficient pilot signal energy to enhance the reproduce waveform and to facilitate pilot recovery.

Signal timing shown in FIGS. 30 and 32 apply to pilot phase adaptation with a one bit, look-ahead delay. A data signal thus delayed does not actually exist in the circuits of this embodiment but its properly timed waveform 179 is shown in FIG. 32 for reference; of course, delayed impulse signals of approximate time correspondence to this reference waveform do exist.

Other look-ahead delays are possible as are numerous variations in logic consistant with recording a recoverable pilot and with record equalization. For example, a clock-rate pilot could be used with suitable changes in the pilot clamp logic and in the reproduce system to be described. The pilot/data transition phase comparator of this embodiment functions without modification when used with clock-rate pilots.

Figures 33A, 34:
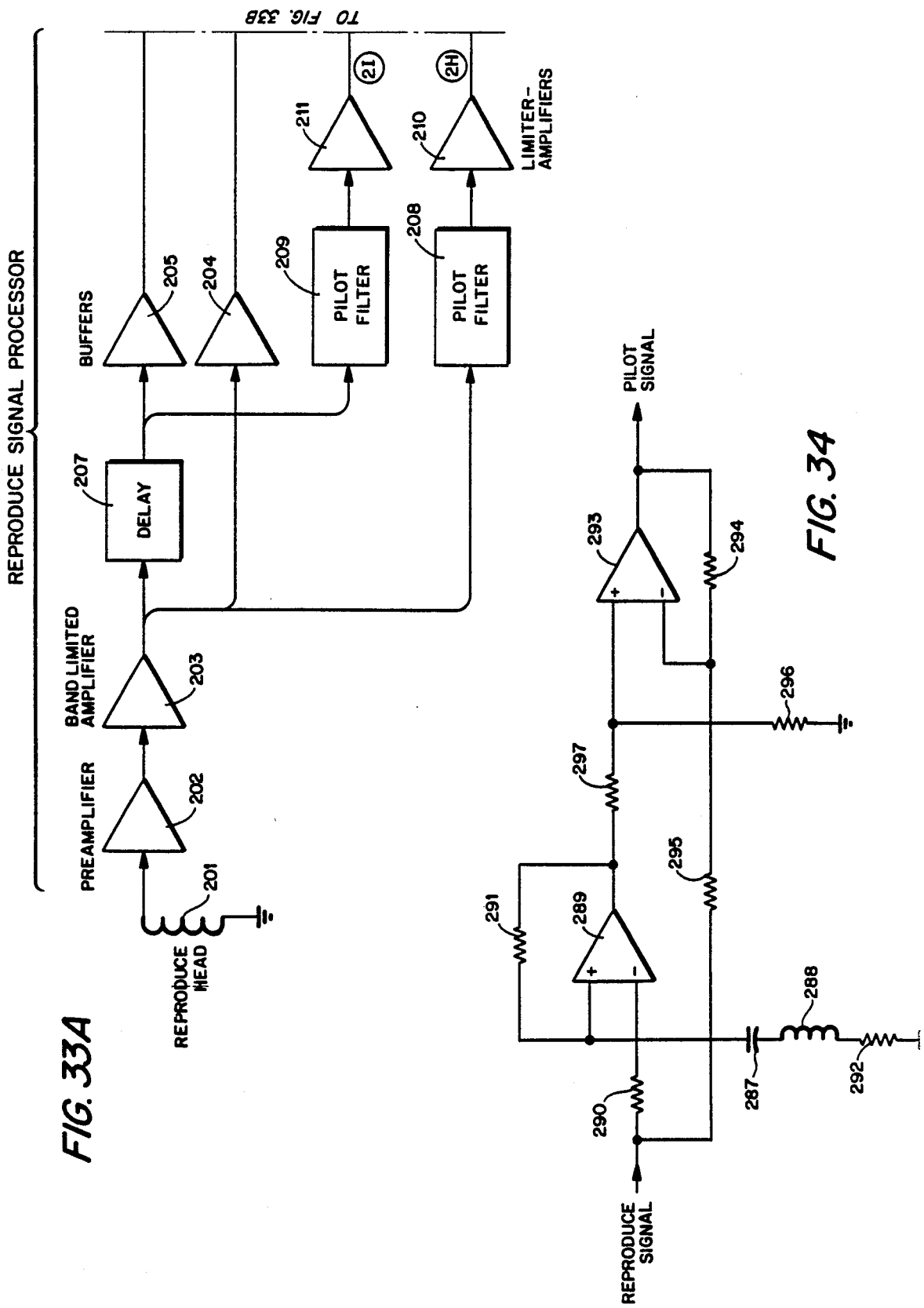
FIGS. 33A and 33B diagram the reproduce system of the first embodiment functionally.
FIG. 34 gives details of the pilot filters used in the reproduce system of the first embodiment.
Figure 33B:
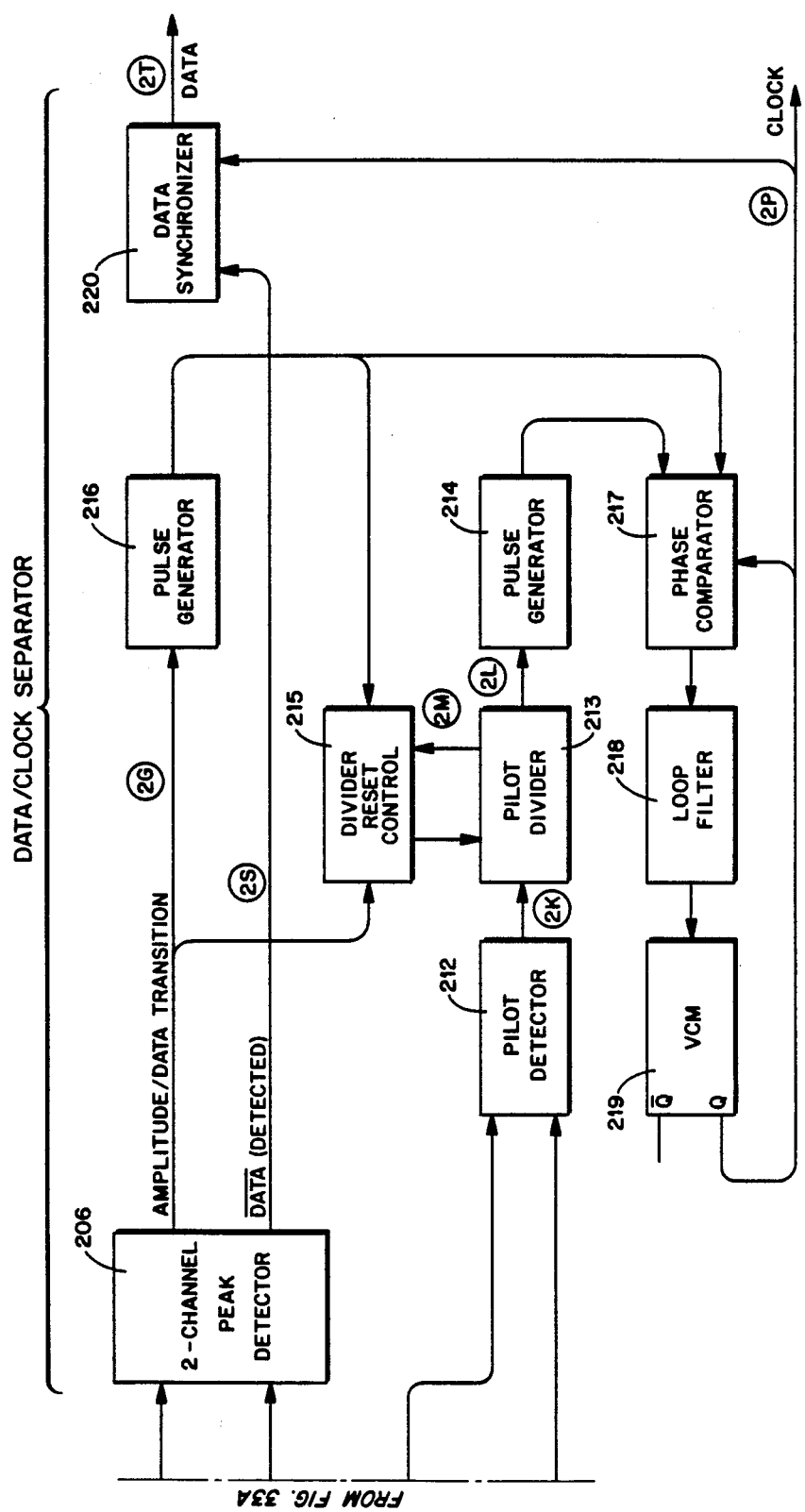

FIG. 33 shows a functional block diagram for the reproduce system of the subject, first embodiment. The reproduce system processes the analog signal from the reproduce head 201 then separates date and clock signals from that processed analog signal. The pilot signal is extracted in this embodiment and used to supplement data transitions for clock recovery; clock recovery is thus assured regardless of the length of intervals separating transitions in a data sequence. Circled, alphanumeric designations at signal sources in FIGS. 33 and 35 refer to like designations of signal waveforms depicted in FIG. 36.

Reproduce signal processing includes amplification and bandpass limiting by amplifiers 202 and 203. The output from amplifier 203 and a delayed replica thereof are buffered by amplifiers 204 and 205, respectively, and coupled to a delayed-replica referenced peak detector 206 of the type previously described (patent application Ser. No. 790,887). The delayed replica is provided by an analog delay element 207 having a delay equal to the pilot signal half-cycle period, which delay period facilitates clock recovery, as will be shown.

A pilot signal and a delayed pilot signal are selectively filtered from both the reproduce signal and its delayed replica by pilot filters 208 and 209, respectively. The two pilot signals are then amplified and limited by respective limiter-amplifiers 210 and 211 thereby providing two clamped sinusoidal signals approximating square waves and differing in phase by 180 degrees, that is, the delay period. These signals are then applied to the inputs of a pilot detector 212 which, in turn, provides a frequency doubled, logic level pilot. The clamp level of the applied signals is selected to be within the input voltage limits of the pilot detector. The pilot detector output undergoes frequency division by pilot divider 213 which drives pulse generator 214 to provide time-spaced pulses at intervals equal to some multiple of bit cell or transition site time intervals; for this embodiment, the pilot derived pulse interval is two bit cells. Divider reset control 215 elements reset the divider and hold it reset when data transitions are anticipated, thus inhibiting a pilot derived pulse when a data transition pulse is forthcoming. The anticipatory data function causing reset of the pilot divider represents an improvement to the referenced data detector (patent application Ser. No. 790,887) and is provided by an analog pulse amplitude sensing channel within that detector. A data transition signal is combined with the amplitude channel signal to trigger another pulse generator 216. Data transition derived pulses, when available, or pilot derived pulses are used for phase reference by a conventional clock PLL consisting of a phase comparator 217, a loop filter 218 and a VCM 219. The data channel output (inverted) of detector 206 is coupled to a data synchronizer (and inverter) 220 which synchronizes the data output signal to the clock signal from the PLL.

FIG. 34 is a schematic diagram of the essentially identical pilot filters used in reproduce signal processing. Capacitor 287 and inductor 288 are resonant at the pilot frequency and their LCR network impedance is extremely high at data frequencies. The gain of amplifier 289 to reproduce signals coupled through resistor 290 is approximately unity at data frequencies but higher at the pilot frequency and determined by the ratio of values for resistor 291 and resistor 292. The output of amplifier 289 is coupled to a differential input amplifier 293 which subtracts data frequencies and d.c. offsets while providing unity gain to the previously amplified pilot frequency; resistors 294, 295, 296 and 297 are, accordingly, of equal value.

The selectivity (Q) chosen for the pilot extraction circuit is limited by the need to achieve phase coherence of the reproduced pilot shortly after a phase adaptation to data or shortly after any transient response effects caused by data transitions, that is, the reproduced pilot phase must correlate with the recorded pilot phase coincident with or before release of a pilot divider pulse used as a phase reference by the clock PLL. When this selectivity criterion is met, the pilot derived phase comparator reference will be consistently correct in timing with respect to the data derived phase comparator reference. The circuit configuration of this embodiment provides adequate pilot selectivity without resorting to extremely high Q. The value of resistor 292 in the delayed-replica-channel pilot filter can be made slightly lower in value than its counterpart in the non-delayed channel. A lower value for this resistor can compensate any attenuation of the pilot signal by the delay function.

Figure 35A:
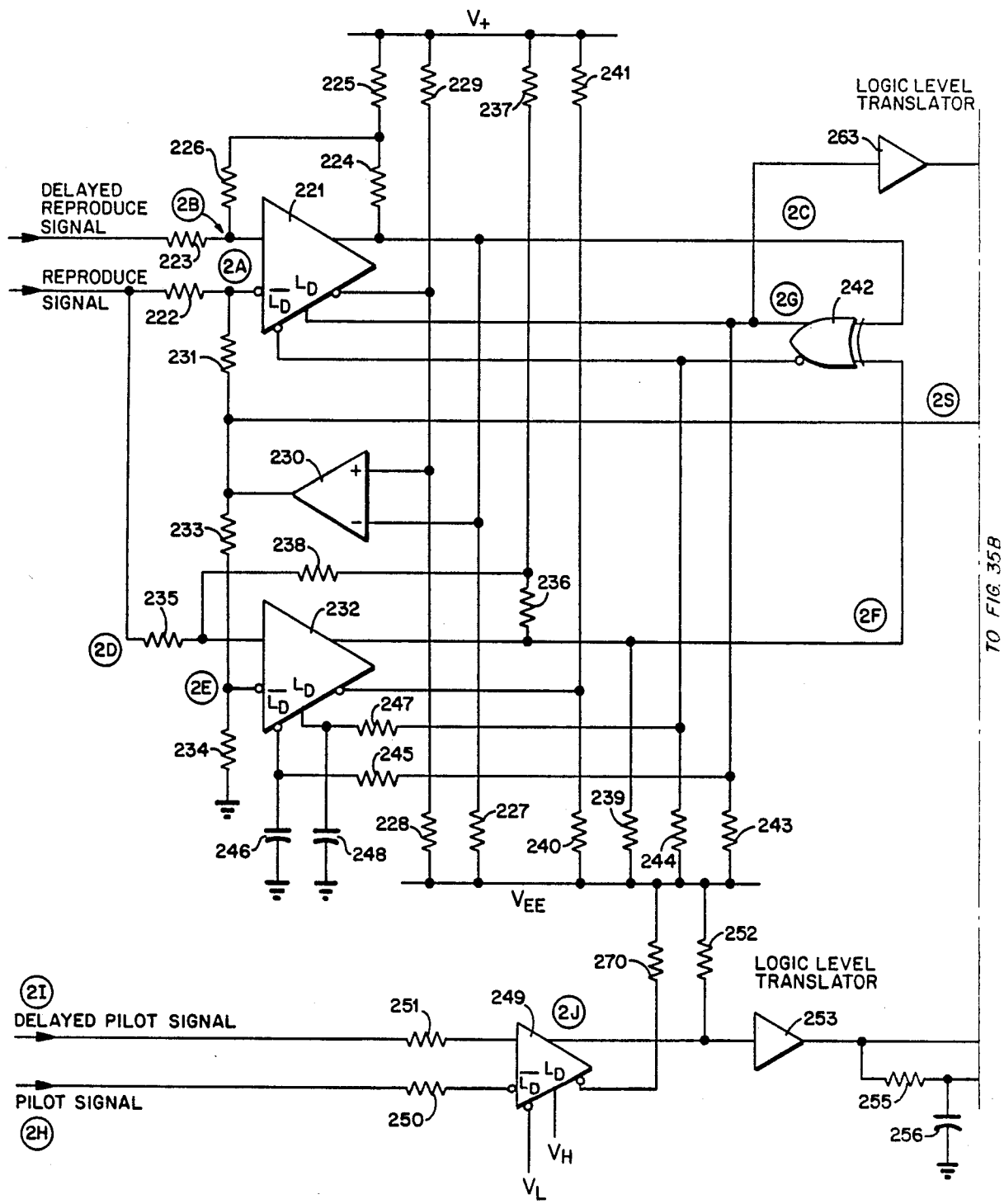
FIGS. 35A and 35B show schematically the reproduce system data/clock separator of the first embodiment.
Figure 35B:
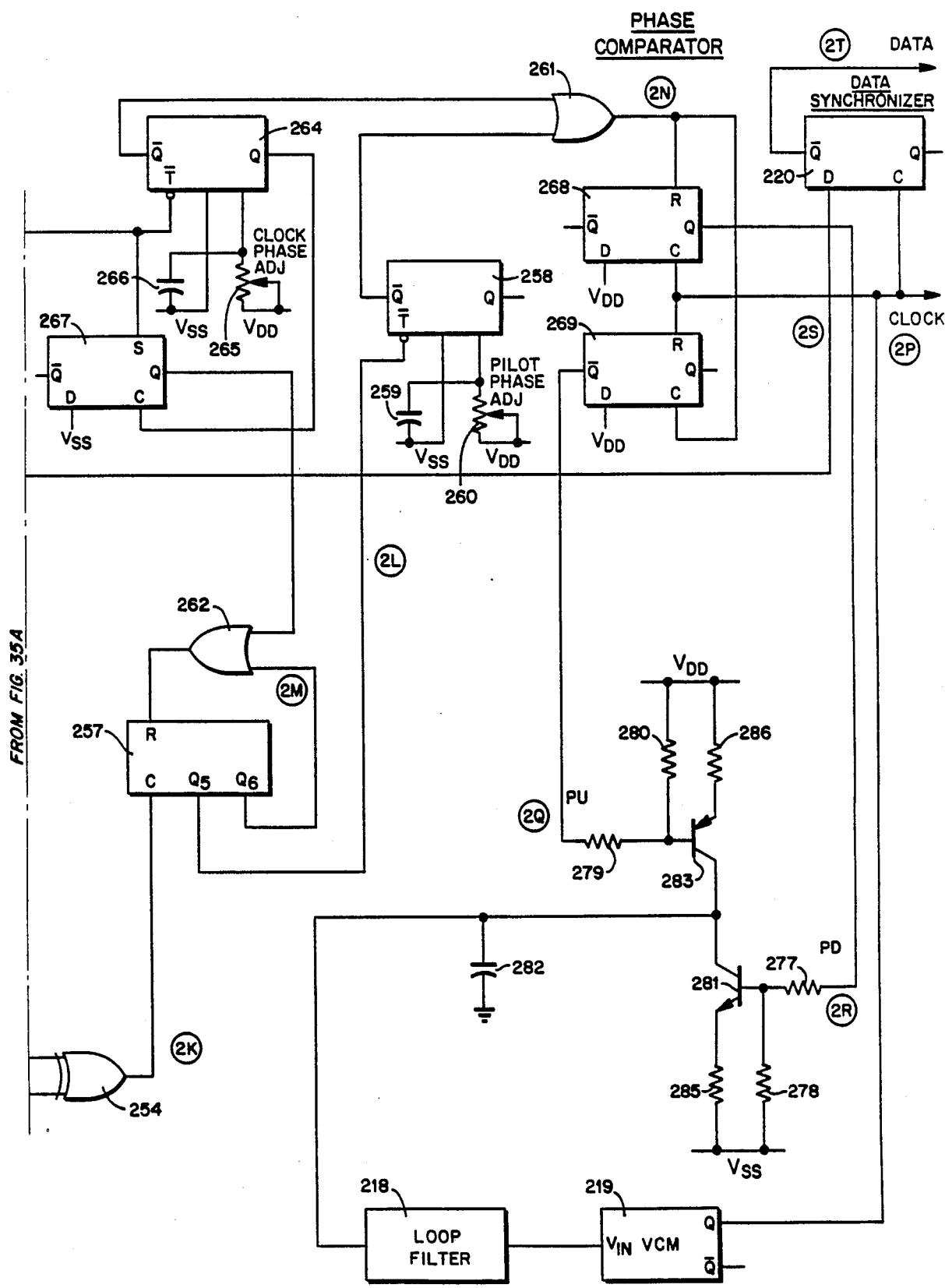

The balance of elements used in analog signal processing are known in the art and their functions need not be further elaborated. It is interesting to note that while no data signal post-equalization is employed in this embodiment by design according to objects of the invention, nothing save noise enhancement, complexity and cost considerations preclude such post-equalization. For example, a low Q version of the amplifier 289 stage of FIG. 34 could be used to obtain some peaking of the pilot to further enhance the data signal waveform FIG. 35 is a partial schematic diagram of the data/clock separator used in the reproduce system of the subject embodiment. Emitter coupled logic (ECL) components are used for data and pilot detection. Detector output signals are then translated to the same CMOS compatible levels used with the record system electronics previously described. Obviously, other logic families would be equally viable. The basic data detector is described in detail in patent application Ser. No. 790,887, but a brief description of its function and a more detailed description of the improvement applied with it in this embodiment follows.

The analog reproduce signal and its delayed replica from their respective buffers 204 and 205 (FIG. 33) are coupled to data detector voltage comparator 221 through isolation resistors 222 and 223, respectively. When these signals reverse polarity relatively in the regions of peaks corresponding to data transitions, those data transitions are detected by the comparator. Resistors 224, 225, and 226 form a regenerative feedback network to aid rapid switching of the comparator through its linear region and to provide hysterisis for noise immunity. Resistors 227 and 228 are emitter pull-down resistors of equal value and resistor 229 is equal in value to the sum of resistor 224 and resistor 225 values, thus providing a balanced output circuit for comparator 221. The complementary outputs of the comparator are coupled to a differential input amplifier 230 shown only functionally in FIG. 35. Amplifier 230 converts its ECL inputs to a bipolarity output symmetrical with respect to signal ground and inverted with respect to ECL level data. The bipolarity output levels are chosen to be compatible with the CMOS logic used in subsequent stages, thus effecting a CMOS inverted data signal translation.

The output of amplifier 230 is applied to the inverting input of comparator 221 through current limiting resistor 231 to dynamically bias the reproduce signal, consequentially maintaining amplitude separation of this signal and its delayed replica at all levels except peak levels which cause detection of data transitions. The dynamic bias separation accommodates reasonably high pilot signal amplitude without data detection interference. The output of amplifier 230 is also applied to an amplitude channel comparator 232 through voltage divider resistors 233 and 234, thus establishing a dynamic amplitude reference which alternates in polarity with analog data for analog pulse amplitude threshold detection.

Comparator 232 changes state in anticipation of data by comparing the reproduce signal amplitude coupled to it through resistor 235 with the dynamic threshold level established at its alternate input. When data transitions are not present in the reproduce analog signal, its level remains near the signal baseline and below the dynamic threshold level. When a data transition is imminent, the analog signal level increases, in the appropriate sense, toward the peak value effecting detection of that transition; but, prior to reaching peak value, the dynamic threshold is exceeded causing comparator 232 to switch, thereby providing an amplitude channel signal which anticipates detection of the data transition. Resistors 236, 237, 238, 239, 240 and 241, in the amplitude channel, function in an identical manner to their counterparts in the data channel, resistors 224, 225, 226, 227, 228 and 229, respectively. Anticipatory amplitude signal transitions and their corresponding data signal transitions are always of the same sense and both are coupled to exclusive-or gate 242 for the purpose of combining their functions in one signal The composite output signal of gate 242 goes high in anticipation of a data transition and goes low coincident with its detection. The complement to this composite signal is also provided by gate 242. Resistor 243 and 244 are emitter pull-down resistors.

Within the detector, exclusive-or gate 242 outputs are coupled to the complementary latch disabling inputs of comparators 221 and 232; the latch disabling inputs of each are sense opposed to the inputs of the other Following detection of a data transition, when the latch disable (LD) input of comparator 232 is high, comparator 232 is unlatched and able to change in anticipation of the next data transition, while the LD input of comparator 221 is low and comparator 221 is latched to the instant data level. When comparator 232 signals an anticipated data change, its LD input goes low, thereby latching its output, while the LD input to comparator 221 goes high, unlatching comparator 221 so its output can change state to signal the data change when it is detected. This latching sequence provides some immunity from spurious noise, precludes erroneous detection of data because of excessive pilot levels near the analog signal baseline, and assures that the composite amplitude/data transition signal from gate 242 is held for its required anticipatory period. Resistor 245 with capacitor 246 and resistor 247 with capacitor 248 are delay networks allowing the dynamic threshold signal referencing comparator 232 to settle, following each data change, before unlatching the comparator.

Amplitude limited, pilot and delayed pilot signals are coupled to a voltage comparator 249 through isolation resistors 250 and 251, respectively. The analog data delay used in this embodiment offsets the phase of these two pilot signals by 180 degrees, thereby effecting coincidence of alternate sense transitions in comparator 249 input signals. Comparator 249 change states accordingly, as its inputs change, to provide an ECL level pilot signal. Resistors 252 and 270 are emitter pull-down resistors. The latch disabling inputs of comparator 249 are maintained at latch disabling levels in this embodiment, but these inputs could be used to inhibit the pilot circuit should this reproduce system sometimes be used with non-pilot-enhanced data.

The ECL level pilot is translated to CMOS level by translator 253, then doubled in frequency by a doubler circuit comprising exclusive or gate 254, delay timing resistor 255 and delay timing capacitor 256. The output of gate 254 is a positive pulse for each input transition, regardless of sense. The duration of the positive pulses is determined by the values of resistor 255 and capacitor 256.

Pulses from gate 254 are used to clock a decade divider 257 configured to divide by six and automatically reset with each cycle. The leading positive edge of the reset ($Q_6$) signal pulse terminating a divider count cycle is coincident with the trailing negative edge of the divider output ($Q_5$) pulse used to trigger monostable multivibrator 258. Pulses from multivibrator 258 are negative for a duration determined by timing capacitor 259 together with potentiometer 260, and are coupled to the clock PLL phase comparator having input or gate 261. Thus, reference pulses are provided at two-bit-cell intervals to phase lock the clock while the pilot divider is functioning. The pilot divider output is inhibited by virtue of the divider being held reset when a data transition is being detected, or in anticipation of a data transition being detected, as will be shown. The divider reset function intiated by anticipated data transitions and the internal, divider reset function are both operative through or gate 262.

The amplitude/data transition signal from exclusive-or gate 242 is translated to CMOS level by translator 263. Each trailing (negative) edge of this signal corresponds to a data transition and triggers complementary pulses from monostable multivibrator 264. The duration of these complementary pulses is adjusted to be precisely one-half a clock period by potentiometer 265 in conjunction with capacitor 266. Each leading (positive) edge of the signal from translator 263 sets D flip-flop 267, the high output of which resets divider 257 through or gate 262, interrupting an pilot divider count in progress. The divider is held reset by flip-flop 267 from the time a data transition is anticipated until the data transition triggers multivibrator 264 which, in turn, clocks flip-flop 267 to the reset state. The inverted output of multivibrator 264 provides the data reference pulses to phase lock the clock PLL.

Figure 38:
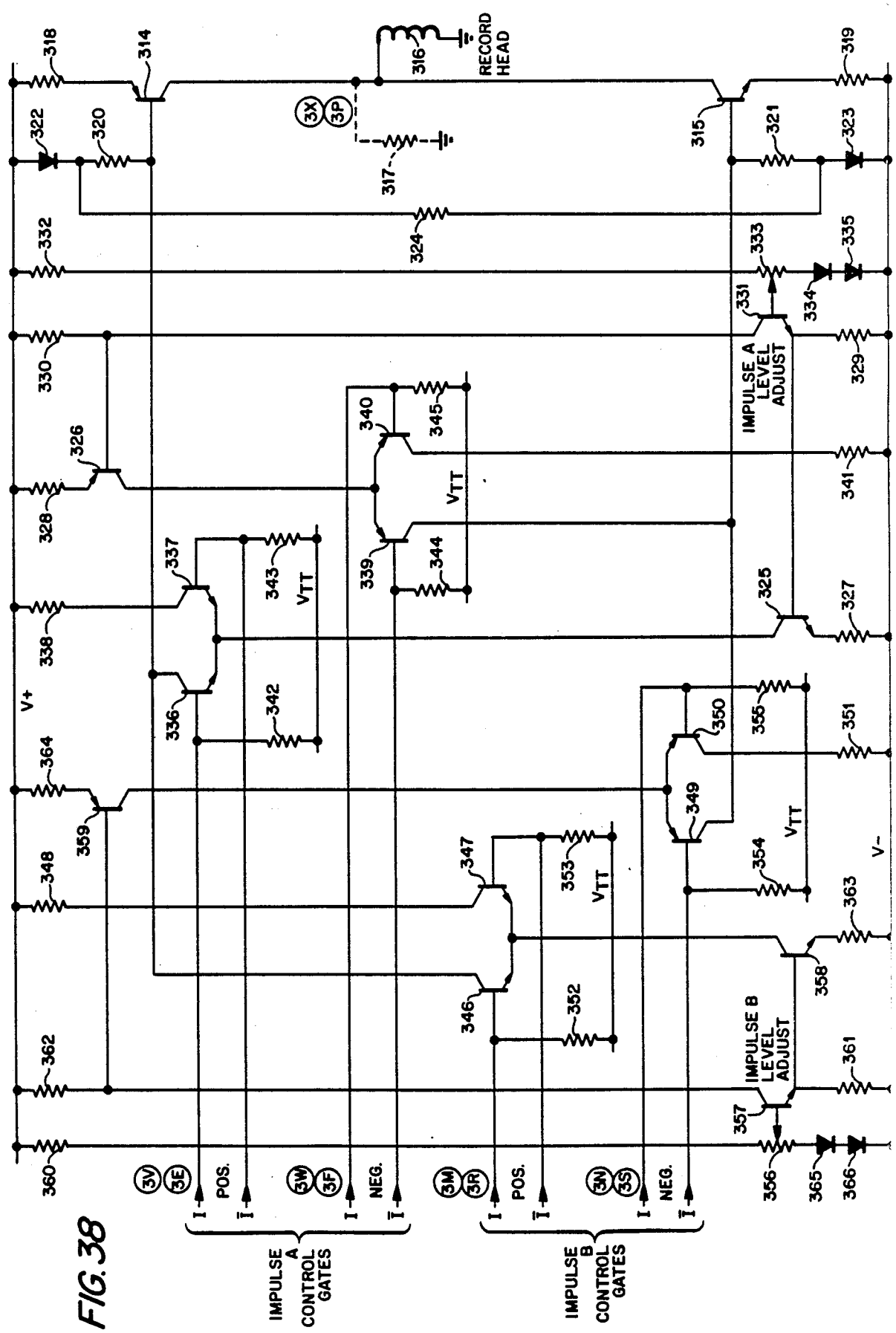
FIG. 38 schematically diagrams the record channel processor of the second through the fourth embodiments for implementing the subject invention.

When the data derived, half-clock-period reference pulses applied to or gate 261 have their trailing (positive) edges coincident with clock positive edges, the clock is correct in frequency and phase with respect to data transitions. The same correct correlation should exist between pilot derived multivibrator 258 pulses and the clock. To assure this correlation at phase lock, the pulse duration of multivibrator 258 is independently adjusted to compensate for pilot phase shifts with respect to data through the reproduce system thereby bringing both data reference and pilot reference edges into coincidence with positive clock edges at phase lock. With correct adjustment of duration, the pilot derived reference can sustain clock PLL phase lock in the absence of data transitions as reliably as the data derived reference can when data transitions are present. The timing diagram of FIG. 38 shows ideal logic timing margins between data transitions and pilot doubler pulses. This timing can vary with propagation delays of circuits employed to practice the invention and use of either analog or digital delay means, well known in the art, to control such timing may be desirable.

Figure 36:
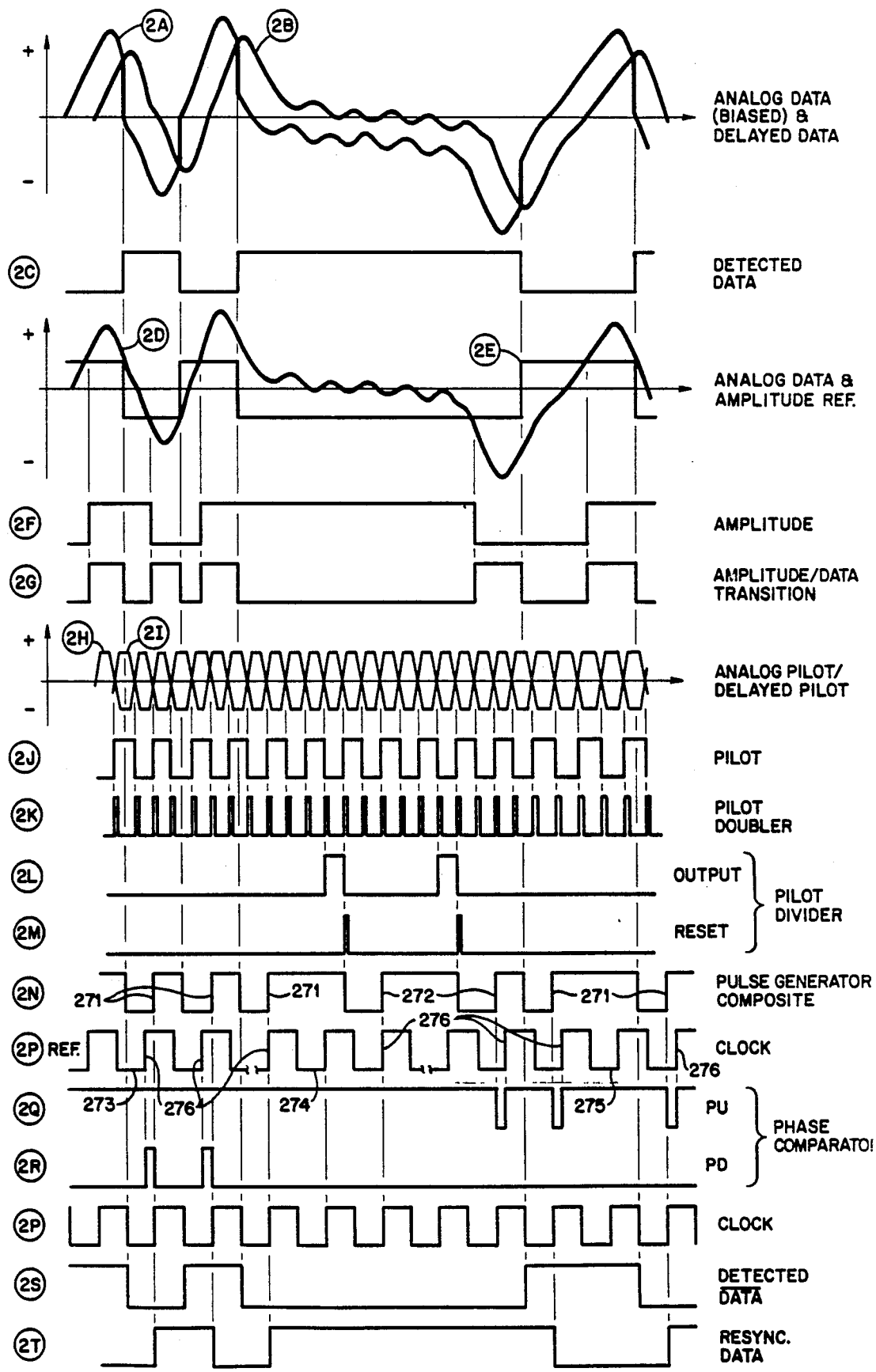
FIG. 36 is a data/clock separator signal timing diagram for the first embodiment.

Coincidence of reference pulse edges and clock edges is detected by D flip-flops 268 and 269 connected as shown in FIG. 35 to the clock VCM 219 and to or gate 261 providing the reference pulses. FIG. 36 shows or gate output signal waveform 2N having data derived reference edges 271 and pilot derived reference edges 272. Three conditions of VCM signal (clock) waveform 2P timing are also shown:

(1) 273, clock leads reference;
(2) 274, clock and reference in phase lock;
(3) 275, clock lags reference.

For all conditions, timing of clock edges 276 with respect to reference edges 271 or 272 determines the outputs from the phase comparator flip-flops 268 and 269 which drive a charge pump. When clock edges 276 lead reference edges 271 (condition 273 of waveform 2P) indicating a need to decrease (pump-down) the VCM frequency, the Q(PD) output of flip-flop 268 changes state (sets) for a period equal to the phase error; the pulse waveform 2R and a pump-down change in loop error voltage results. When clock edges 276 are coincident with reference edges 271 and 272 (condition 274 of waveform 2P) flip-flops 268 and 269 are simultaneously clocked and reset, therefore no change of state occurs, quiescent PD and PU signal levels are maintained and no change in loop error voltage occurs. When clock edges 276 lag references edges 271 and 272 (condition 275 of waveform 2P) indicating a need to increase (pump-up) the VCM frequency the $\overline{Q}$ (PU) output of flip-flop 269 changes state for a period equal to the phase error; the pulse waveform 2Q and a pump-up change in loop error voltage results.

The PD signal drives the charge pump through divider resistors 277 and 278 while the PU signal drives the charge pump through divider resistors 279 and 280. Transistor 281, when conducting, sinks current from capacitor 282 thus discharging it and causing the voltage across it to pump down. Transistor 283, when conducting, acts as a current source charging capacitor 282 and causing its voltage to pump up. The net charge of capacitor 282 determines the error voltage applied to loop filter 218 which in turn controls VCM 219 thus completing the loop. The values of emitter resistors 285 and 286 are equal and determine discharge and charge currents.

The phase-locked clock is coupled to D flip-flop (data synchronizer) 220 with the inverted data signal from the data detector (data channel). The inverted output ($\overline{Q}$) of flip-flop 220 then provides a data output of normal sense synchronized to the clock output.

In a second embodiment for implementing pilot enhanced/amplitude equalized impulse recording, rectangular pulse-forms are used for both transition impulses and 1.5 times clock-rate, sustaining impulses recording NRZ data on degaussed magnetic tape; no overwrite impulse sequence is used. Data of this embodiment is, of course, amplitude and phase equalized during recording, but no attempt is made to recover the pilot (sustaining impulse clock) when data is reproduced. The clock is recovered conventionally using only the data transition signal as phase reference for the clock PLL.

ECL functions are employed in this embodiment and in subsequent embodiments to be described, but some external components, for example, pull-down resistors may not be shown in logic diagrams. The use of such components external to logic devices is presupposed and their function is understood by those skilled in the art.

A commercially available monostable multivibrator (MC 10198) is used to generate all pulses which determine timing of current impulses used for recording. This EC1 device has two trigger inputs, one of which is controlled by two enabling signals to establish one of four possible triggering modes:

(1) positive slope triggering;
(2) negative slope triggering;
(3) triggering on both slopes;
(4) triggering disabled.

Obviously, a logic external to other pulse generating means could be designed to accomplish similar triggering mode control. The alternate, direct (high speed) trigger function of this device is independent of enabling signal control and exhibits less propagation delay than the enabled trigger. This specific device requires high speed trigger signals that are positive going, narrow (ideally) pulses which might be obtained, for example, by differentiating a rectangular waveform triggering signal with an RC network referenced to a logic-low voltage level. Such processing of rectangular waveform, logic signal positive edges to obtain narrow triggering pulses is presupposed, though not detailed, as part of each high speed trigger input ($T_H$) of the functional monostable multivibrators shown in FIGS. 43, 45 and 58 for other embodiments of this invention. The $T_H$ trigger inputs are not used in the present embodiment described by FIG. 37.

Figure 37:
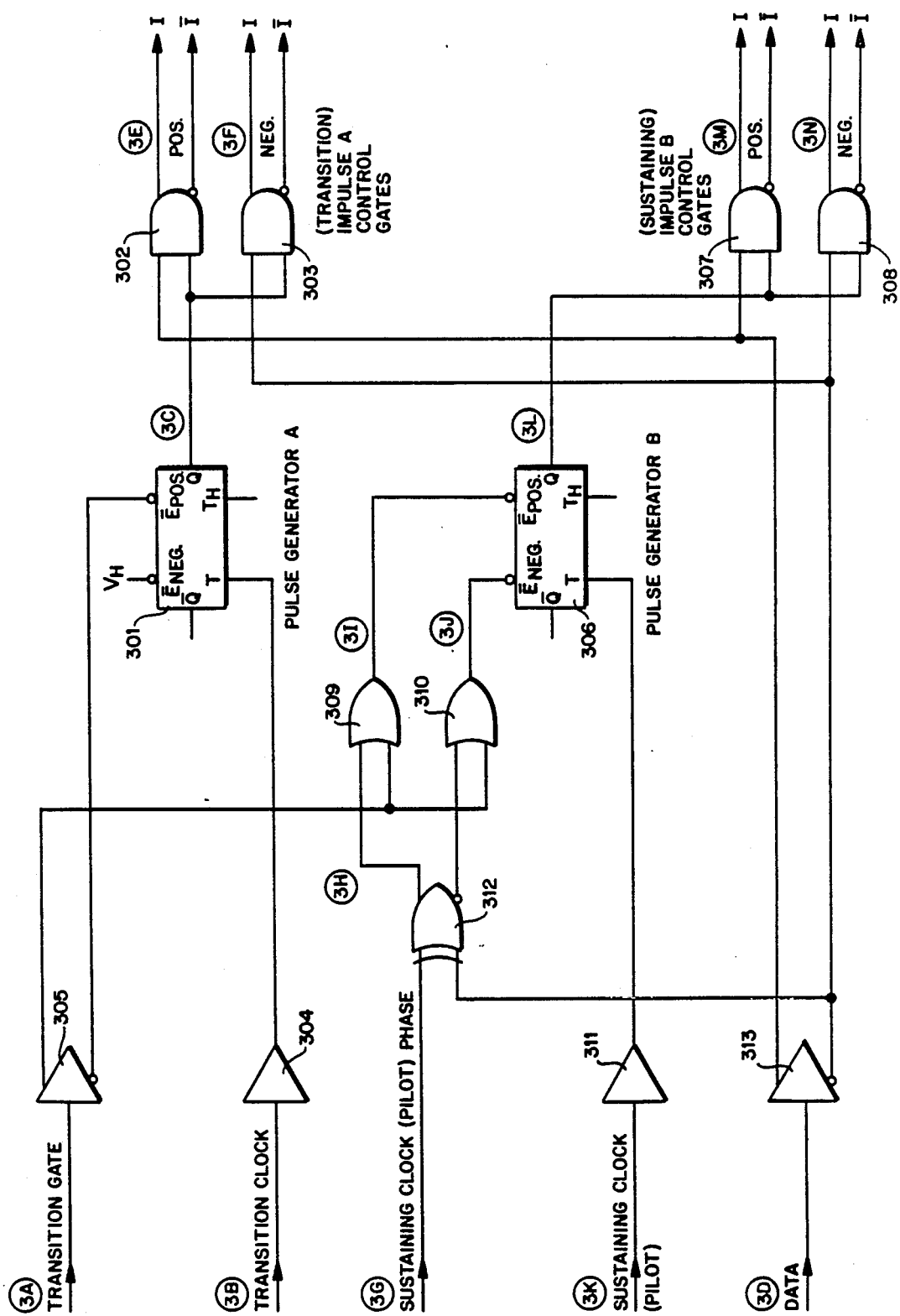
FIG. 37 illustrates a portion of the record channel logic used in the second embodiment for implementing the subject invention.

In the following description of the recording system of this embodiment, circled alpha-numeric designations at signal sources in FIGS. 37 and 38 refer to like designations of signal waveforms in FIG. 39. The logic functions of FIG. 37 presuppose the application of signals derived or conditioned in ways similar to those used to obtain the corresponding signals of the previously described embodiment (FIG. 29):

(1) a transition signal used as a transition gate is derived by applying data signals of correct relative timing to an exclusive-or gate.
(2) a correctly timed, continuous clock signal is used as a transition clock if and when the transition gate is high. This continuous, transition clock signal alone controls transition impulse timing, and its phase relative to a sustaining clock (pilot) must, accordingly, be predetermined.
(3) a single logic level pilot is used as a sustaining impulse clock and its phase with respect to a data clock is fixed and predetermined considering propagation delay and phase transfer functions of the particular recording channel.
(4) a pilot (sustaining clock) phase select signal, derived by using logic functions identical to pilot phase logic functions of FIG. 29, is appropriately delayed and used with data to select the sustaining clock slope (pilot phase) which triggers sustaining impulses.
(5) a correctly timed data signal is used to control impulse polarity and, with the pilot phase select signal, to control pilot phase.

Figure 39:
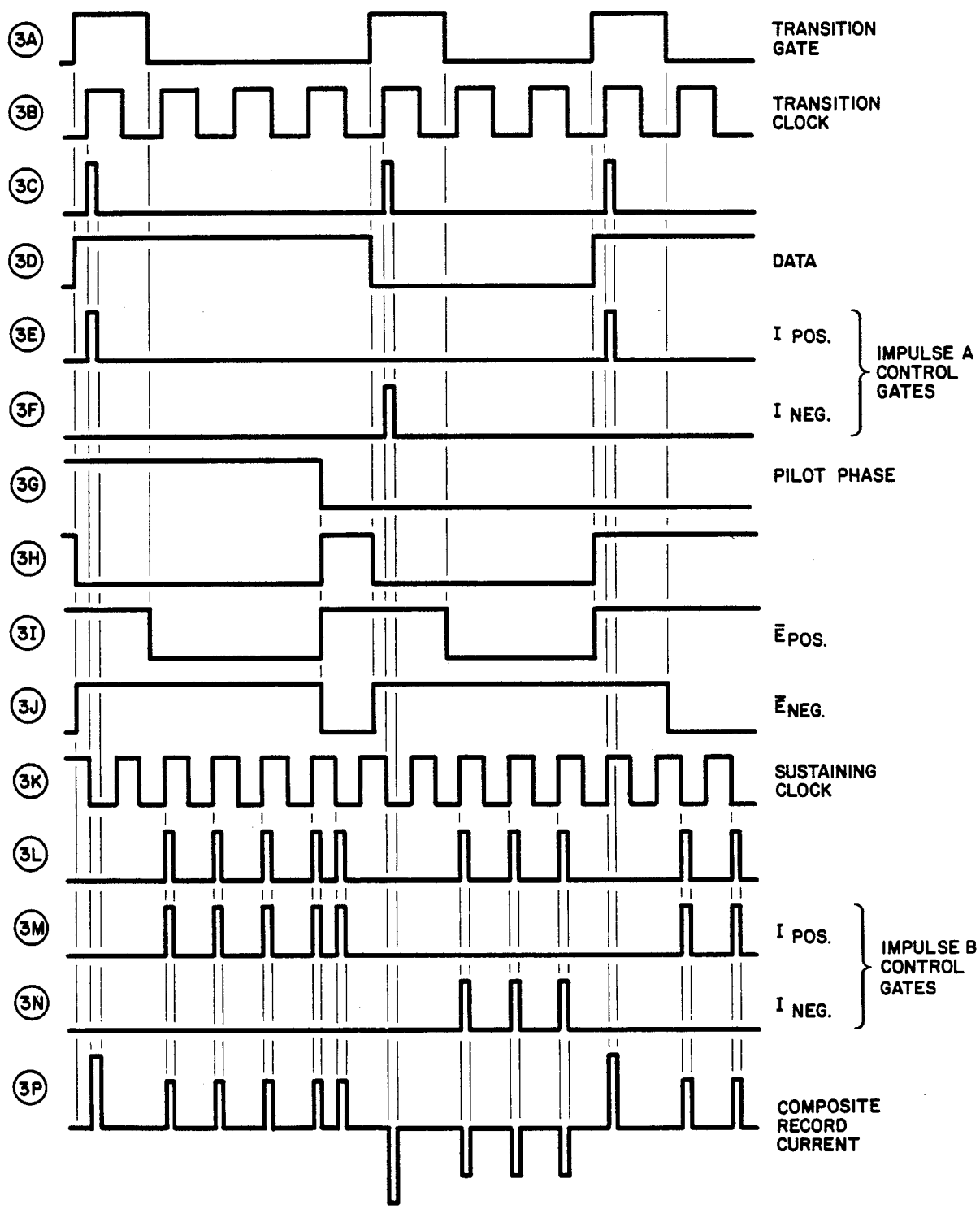
FIG. 39 is a second embodiment record system timing diagram.

The predetermined timing for the signals described in the foregoing paragraph is shown in FIG. 39 and is controlled by delay means and synchronizing register means commonly applied in the art. Some of these means, as well as the derivation of timing signals used in the logic, are explained in conjunction with other embodiments of the subject invention and need not be further elaborated for the subject embodiment. FIG. 37 is the record channel partial logic diagram showing specific variations of this embodiment with respect to other embodiments.

A monostable multivibrator (pulse generator A) 301 generates pulses used to drive the transition impulse control gates 302 and 303. Gates 302 and 303 are and gates functioning as transition impulse polarity discriminators referenced to complementary data signal inputs. Pulse generator A 301 generates a positives pulse for each positive going edge of the transition clock from buffer 304 when the inverted transition gate from complementary output buffer 305 is low; pulse generator A is disabled when that inverted, positive slope enabling input from buffer 305 is high, the no-transition state. The inverted, negative slope enabling input of generator A is held high disabling negative slope triggering at all times.

Pulse generator B 306 generates positive pulses correctly timed for phase adapted, sustaining impulse control through and gates 307 and 308. These gates are referenced to complementary data signals for polarity control. Sustaining impulses are disabled during transitions by a high gate signal from complementary buffer 305 applied to both enabling inputs of generator B through or gates 309 and 310. During no-transition intervals, if the output of or gate 309 is low, pulse generator B will provide a sustaining impulse driving pulse for each positive going transition of the sustaining clock from buffer 311. If the output of or gate 310 is low, each driving pulse will be triggered by a negative going transition of the sustaining clock. The pilot (sustaining impulse) phase, determined by the triggering slope for generator B, is selected by an exclusive-or function provided by gate 312 which combines the data signal with the sustaining clock (pilot) phase select signal. When the phase select signal is high the triggering slope corresponds to the data signal sense; when the phase select signal is low, the alternate pilot phase is selected by virtue of the triggering slope opposing the data signal sense being selected.

The data references for pilot phase selection and impulse polarity control are provided by complementary output buffer 313.

In the record channel processor of the subject embodiment, shown schematically in FIG. 38., complementary signals from impulse control gates 302, 303, 307 and 308 of the record channel logic are applied to differential current switches controlling a current source head driver.

Complementary transistors 314 and 315 provide current to a record head 316. Resistor 317 shown in a dashed-line circuit can be used for damping. Current from this complementary output stage is determined by identically valued emitter resistors 318 or 319 in conjunction with the voltage drop across identically valued resistors 320 or 321, respectively. Diodes 322 and 323 with resistor 324 provide a slight forward bias for the output transistors. The diodes also provide temperature compensation for their respective transistors.

Two complementary sets of two differential current switches (four switches) drive the complementary output stage. The amount of driver current steered through a base resistor 320 or 321 by one of these driver current switches determines a voltage drop which, in turn, determines an output current to the head. Both a transition impulse driver current value and a sustaining impulse driver current value can be independently adjusted. Each of these two driver current values is available from complementary sources for switching to the appropriate output transistor in accordance with instant data polarity. Impulse A complementary driver current source—switched in response to a pulse from pulse generator A—includes transistors 325 and 326 having emitter resistors 327 and 328 of equal value; these transistors are controlled by equal, complementary d.c. voltages dropped across resistors 329 and 330, respectively, by emitter and collector currents of transistor 331. The values of resistors 329 and 330 fix the equality of complementary current source control voltages and may differ by a small amount to compensate the difference in collector current and emitter current for transistor 331, that is, its base current. The voltage divider consisting of resistor 332 and potentiometer 333 adjusts the value of current from the complementary sources by setting source control voltage. Diodes 334 and 335 compensate base-emitter voltage changes with temperature of transistors 331, 325 and 326.

A current switch comprising transistors 336 and 337 steers transistor 325 collector current through resistor 320 causing an output current to the record head when the positive, impulse A (transition impulse) control gate is high. When the positive, impulse A control gate switches low, transistor 325 current is instantly steered through load resistor 338 consequentially interrupting record head current. Similarily, when the negative, impulse A control gate is high, transistor 326 collector current is steered through resistor 321 by a current switch including transistors 339 and 340, thus effecting a "negative" current output to the record head. When the negative, impulse A control gate goes low, transistor 326 current is steered through load resistor 341 and head current ceases. Resistors 342, 343, 344 and 345 are emitter pulldown resistors for their respective impulse control, and gates (FIG. 37). These resistors can also provide the proper terminations matching characteristic input line impedance of the differential current switches.

The alternate, complementary set of current switches including transistors 346 and 347 with terminating resistors 352 and 353 and transistors 349 and 350 with terminating resistors 354 and 355 function in response to positive and negative impulse B (sustaining impulse) control gates, respectively. Impulse B current switches steer current through resistor 320 and load resistor 348 or through resistor 321 and load resistor 351 to effect control of sustaining current impulses to the record head.

The sustaining, driver current level is independently determined by adjusting potentiometer 356 which controls a complementary current source including: transistors 357, 358 and 359; resistors 360, 361, 362, 363 and 364; and diodes 365 and 366; which components function identically with their counterparts in the impulse A, complementary current source.

The duration of transition and sustaining current impulses is equal to the duration fixed for pulse generator A and pulse generator B, respectively, by external timing components used with the monostable multivibrators of this embodiment. These external components are not shown in FIG. 37.

Recordings produced by circuits of this embodiment can be totally compatible with a reproduce system described by FIGS. 33, 34 and 35, provided that the reproduce head/magnetic tape interface offers sufficient resolution for pilot recovery and that data rates are compatible with CMOS logic devices and the other components used. However, the requirements assumed for this embodiment are that the pilot need not be separately recovered nor resolved, that only pilot equalizing effects are employed and that data rates exceeding the capacity of the first preferred embodiment reproduce system might be required. Considering these assumptions, a less complex reproduce system based on ECL devices is used with this embodiment, is functionally diagrammed in FIG. 40 and is schematically diagrammed in FIG. 41. The numeric component of alphanumeric references for elements of FIGS. 40 and 41 corresponding to like numeric references in FIGS. 33 and 35 designate elements which are functionally identical but which may differ by virtue of design optimization for their respective embodiments. For examples: amplifier bandwidth can vary from one embodiment to another; functionally equivalent logic devices have differing application restraints, speeds and levels for each logic family; delay element 207 of FIG. 33 has its delay specified at a pilot half-period (one-third of a bit cell) to facilitate pilot recovery while delay element 207A of FIG. 40 need only have its delay specified as optimum for the desired detector bandwidth, usually between one-fourth and one-half of a bit cell. The circled alpha-numeric designations at signal sources in FIGS. 40 and 41 refer to like designations of signal waveforms in FIG. 42.

Figure 40:
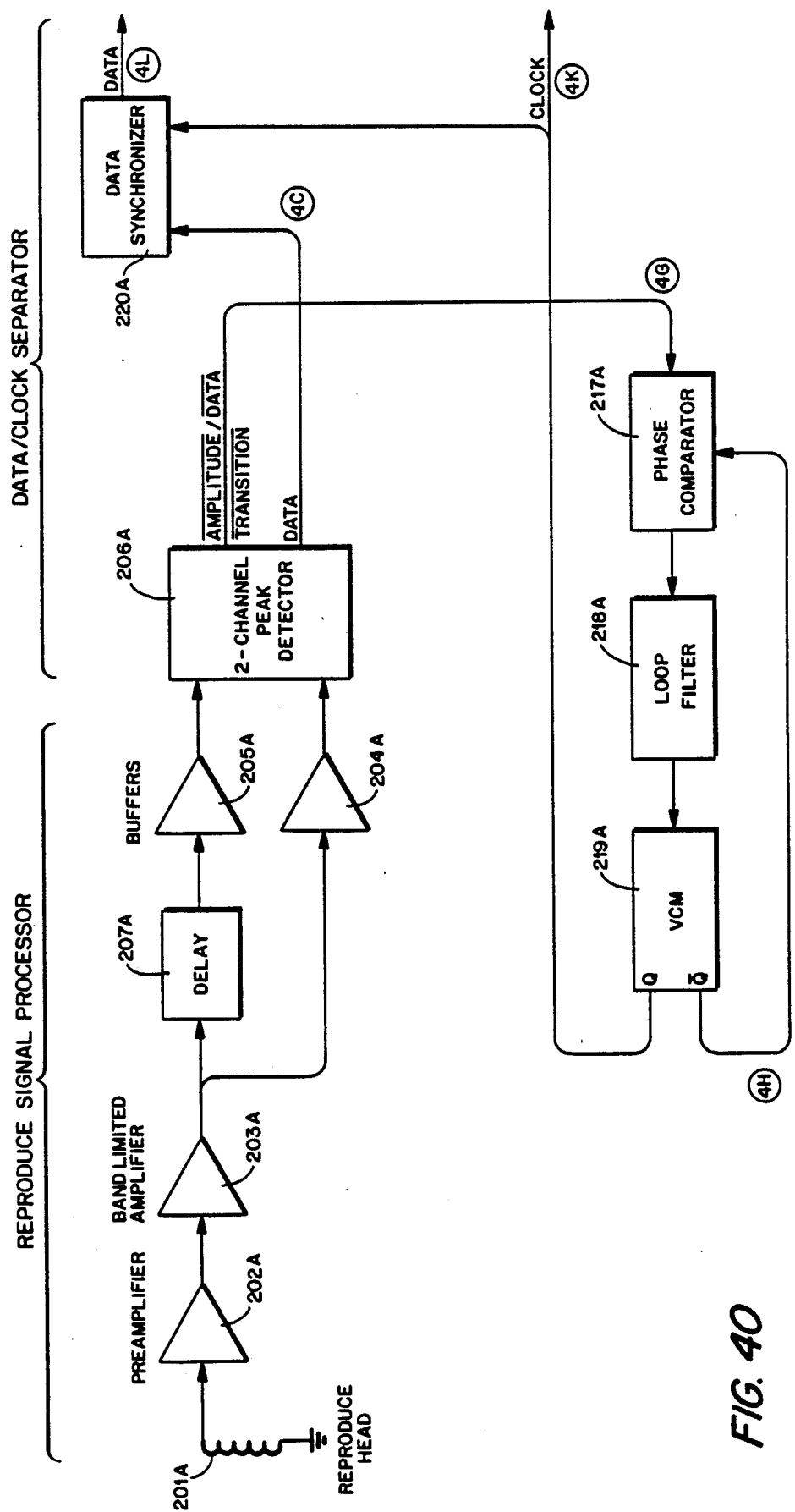
FIG. 40 is a functional block diagram of a reproduce system for the second through fourth embodiments.

FIG. 40 is the functional block diagram of the reproduce system for the subject embodiment. All general functions correspond to those which have been previously explained for another embodiment. However,* specific functional differences exist within the clock PLL phase comparator and its external connections:

When a clock reference edge leads a data reference edge—one phase comparator error condition—a pump down (PD) pulse must be generated over the time interval separating the two edges. Since clock edges occur regularily, every bit cell, and occurrence of data edges can be infrequent, the comparator logic must anticipate data changes and discriminate between isolated clock edges not requiring correction and those clock edges associated with the data leading, error condition which do require correction. In the previously described embodiment, this anticipatory function was accomplished by delaying the data derived, reference edge through use of pulse generator 216 (FIG. 33); in the present embodiment, the amplitude channel of the two-channel peak detector 206A provides the anticipatory function allowing data transitions to be used directly, without delay, in deriving data reference edges; the Q output of the VCM 219A is, accordingly, used as the clock reference for the phase comparator. The amplitude and data transition intelligence used by the phase comparator of this embodiment is provided in a single, composite signal from exclusive-or gate 242A (FIG. 41).

Another specific functional difference between the present embodiment and the one previously described exists in the interface between the phase comparator logic and the charge pump; in the present instance, logic levels cannot directly drive the charge pump, and must be translated. ECL level to bipolarity level translation is provided by differential current switches as is shown in FIG. 41. The pump-up switch comprising transistors 401 and 402 steers current from resistor 403 to resistor 280A when on and to load resistor 404 when off. Similarily, during pump-down, transistors 405 and 406 steer current from resistor 407 to resistor 278A, but quiescently, current is steered to load resistor 408. Emitter pull-down for phase comparator D flip-flops 268A and 269A is accomplished by resistors 409, 410, 411 and 412. Resistors 413 and 414 are emitter pull-down resistors for VCM 219A; resistor 415 is an emitter pull-down resistor for D flip-flop 220A.

Figure 41A:
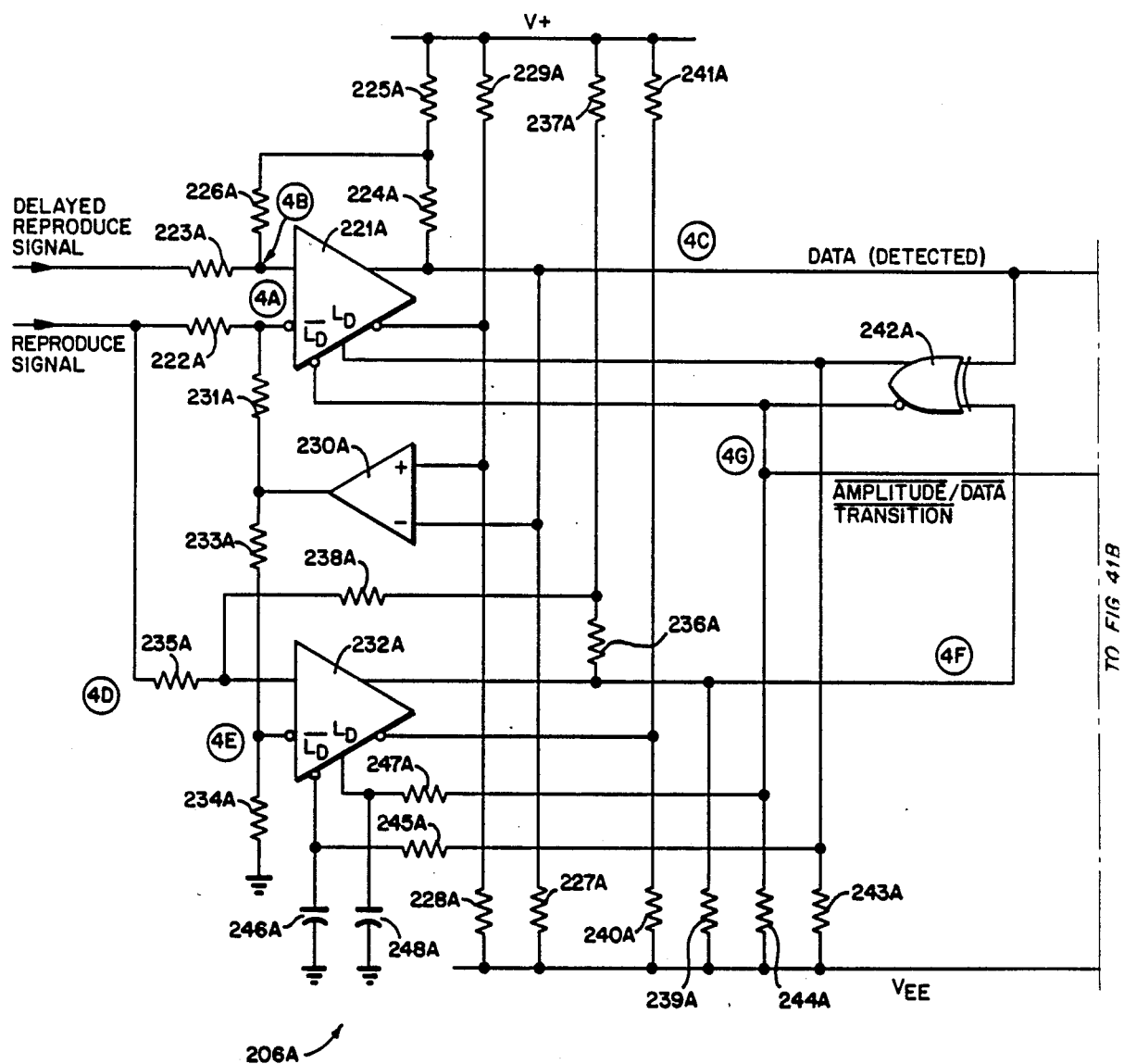
FIGS. 41A and 41B depict schematically the data/clock separator of the second through fourth embodiment reproduce system.
Figure 41B:
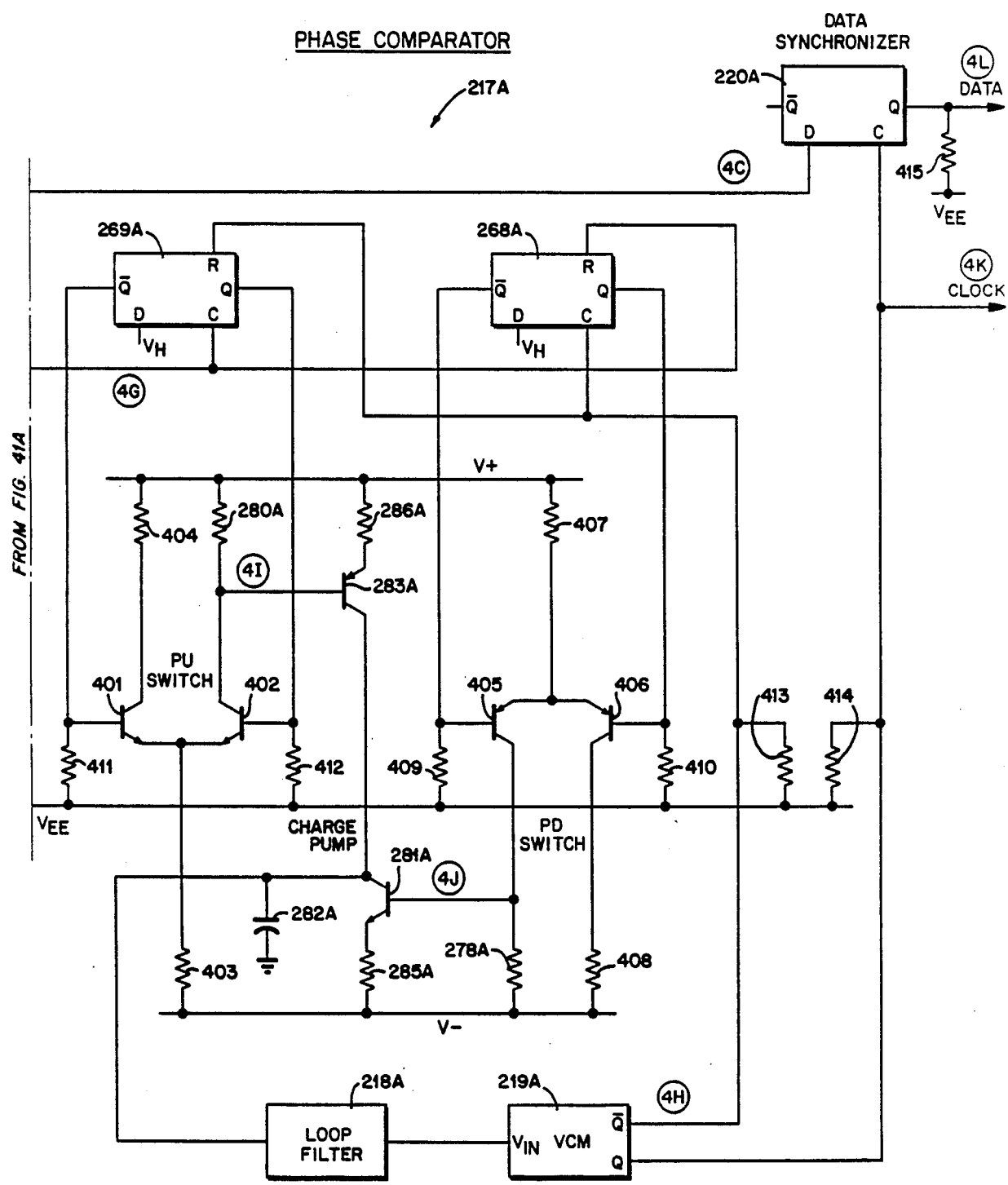

All other elements shown in FIG. 41, which remain to be explained, function in the manner explained for their counterparts in the embodiment of FIG. 35.

Figure 42:
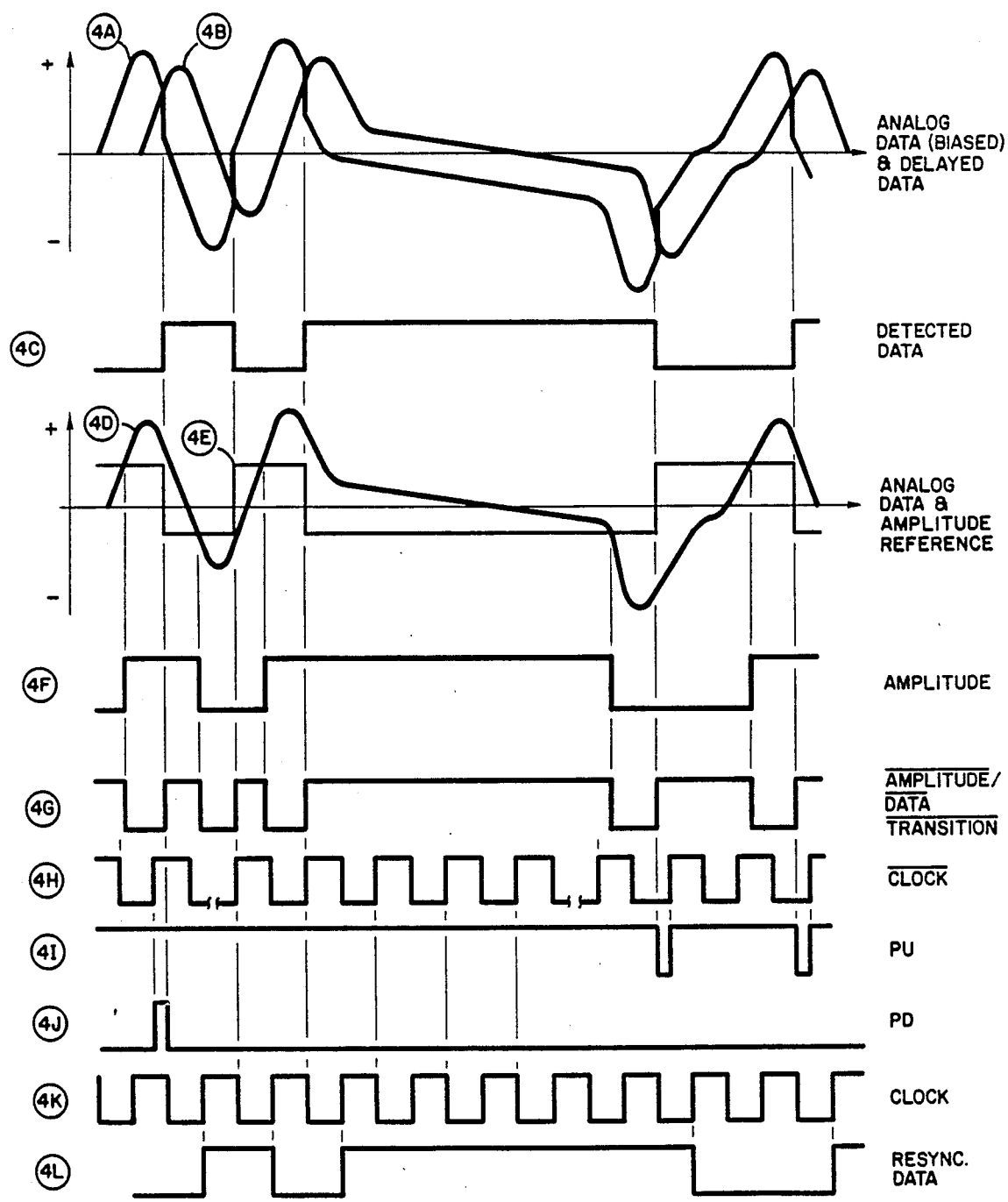
FIG. 42 includes 4A through 4L shows signal timing details for the circuit of FIG. 41.

It should be noted that, in the data detecting method common to the reproduce systems described herein, the time period of the data anticipating function is determined by and is controllable through the relative amplitudes of an analog signal and a bias (threshold) signal; this is apparent upon inspection of waveforms 2D and 2E of FIG. 36 or waveforms 4D and 4E of FIG. 42. Further control of this functions duration can be effected by selecting between use of the non-delayed analog data signal (as shown) or use of the delayed analog data signal to limit the range of such anticipatory durations controllable by amplitude. Design factors affecting this selection are:

(1) Reliability of the anticipatory function in qualifying or verifying data;
(2) Noise or transient immunity;
(3) Drop-out or signal amplitude reduction immunity;
(4) Logic timing considerations.

Factors (1) through (3), above, could each be weighted equally between the reproduce systems of the first and second preferred embodiments described, but factor (4) weighting is more application defined: The logic timing considerations for the embodiment of FIGS. 35 and 36 are not particularily restrictive in that the anticipatory period is used only to hold the pilot logic divider disabled (reset) when a data transition is imminent; a wide range of durations would suffice. However, when the anticipatory function is used by the clock PLL phase comparator as it is in the embodiment of FIGS. 41 and 42, its duration should not exceed half a bit cell. If the duration exceeds this limit, an erroneous pump-down pulse can be generated by a large, leading data edge phase error, which error should only generate a pump-up pulse. A minimum limit is also imposed on the anticipatory function duration used by a clock PLL; the range of detectable phase errors in which the clock reference edges lead the data reference—a pump-down condition—can only be as great as the anticipatory period, therefore, it is desirable to have that period great enough to provide a generous control range for the pump-down signal. Stated conclusively, when the anticipatory function is used to enable a PLL phase comparator, its duration should be as close to a half-bit-cell as possible without exceeding it to ensure maximum PLL capture and lock range. Obviously, a half-bit-cell pulse generator such as generator 216 shown in FIG. 33 could be used to delay data reference edges, thereby effecting the required phase comparator anticipatory function. Such a generator must be adjusted for the correct pulse duration with each change of data rate while an amplitude channel anticipatory function can be self compensating with data rate.

The reproduce system described for the subject embodiment has no provision for pilot recovery, nor for maintaining the clock PLL in lock during excessively long intervals between data transitions. However, this system can be fully compatible with the recording system of the first embodiment provided that data run-length limiting assures sufficient transition density to maintain the clock PLL in phase lock.

In a third embodiment for implementing the subject invention which is a modification of the second embodiment, overwrite impulses are added to transition and sustaining impulses, thereby producing a composite signal capable of overwriting previously recorded data on magnetic tape. The polarity of each overwrite impulse is always opposite that of instant data and sustaining levels.

The record channel processor of FIG. 38 is used for this embodiment as it was for the second described embodiment except that impulse A control gate inputs and level potentiometer 333 control sustaining impulses, while impulse B control gate inputs and level potentiometer 356 control both transition and overwrite impulses.

Figure 43:
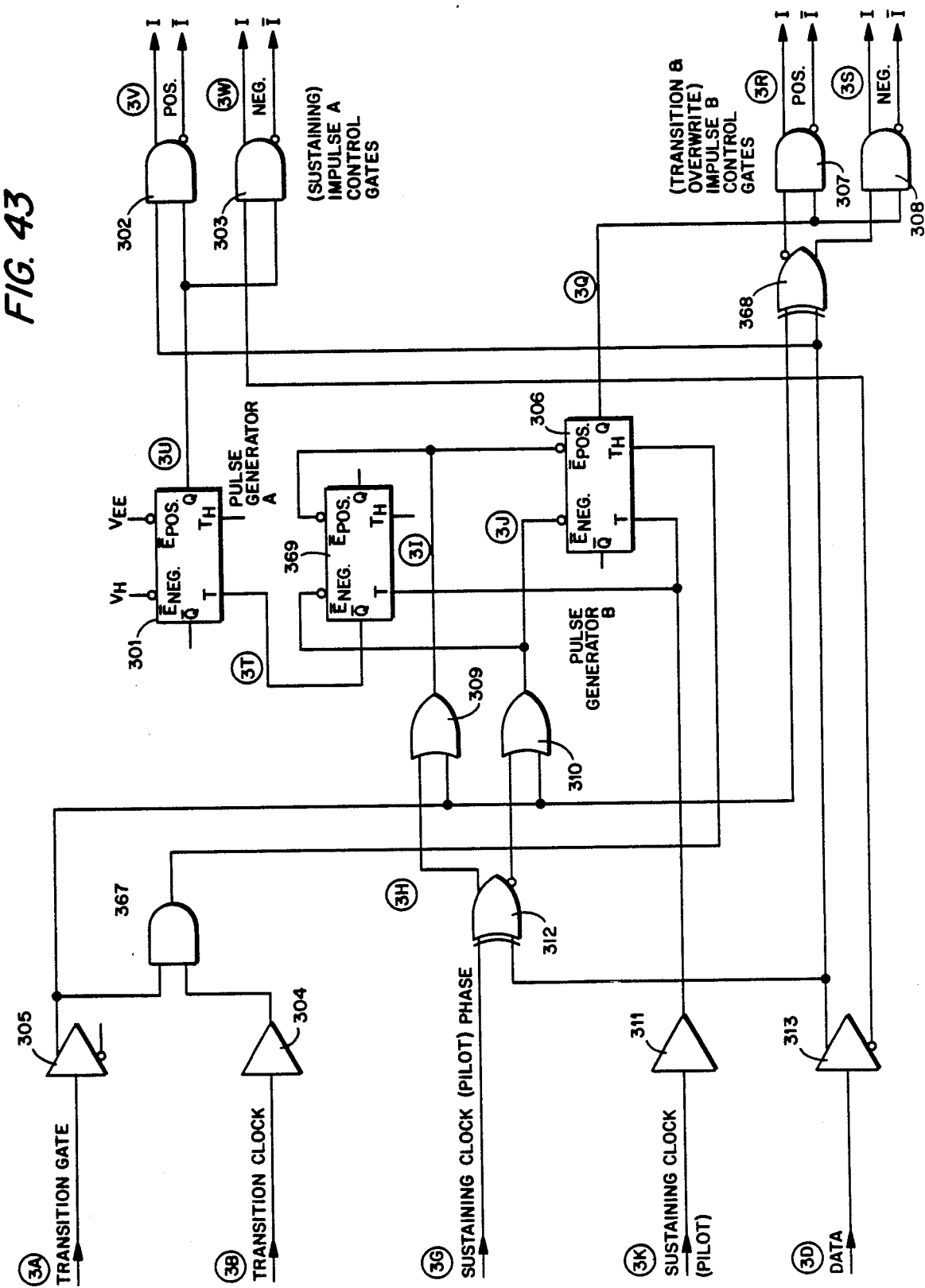
FIG. 43 is a partial, record channel logic diagram for the third embodiment for implementing the subject invention.
Figure 44:
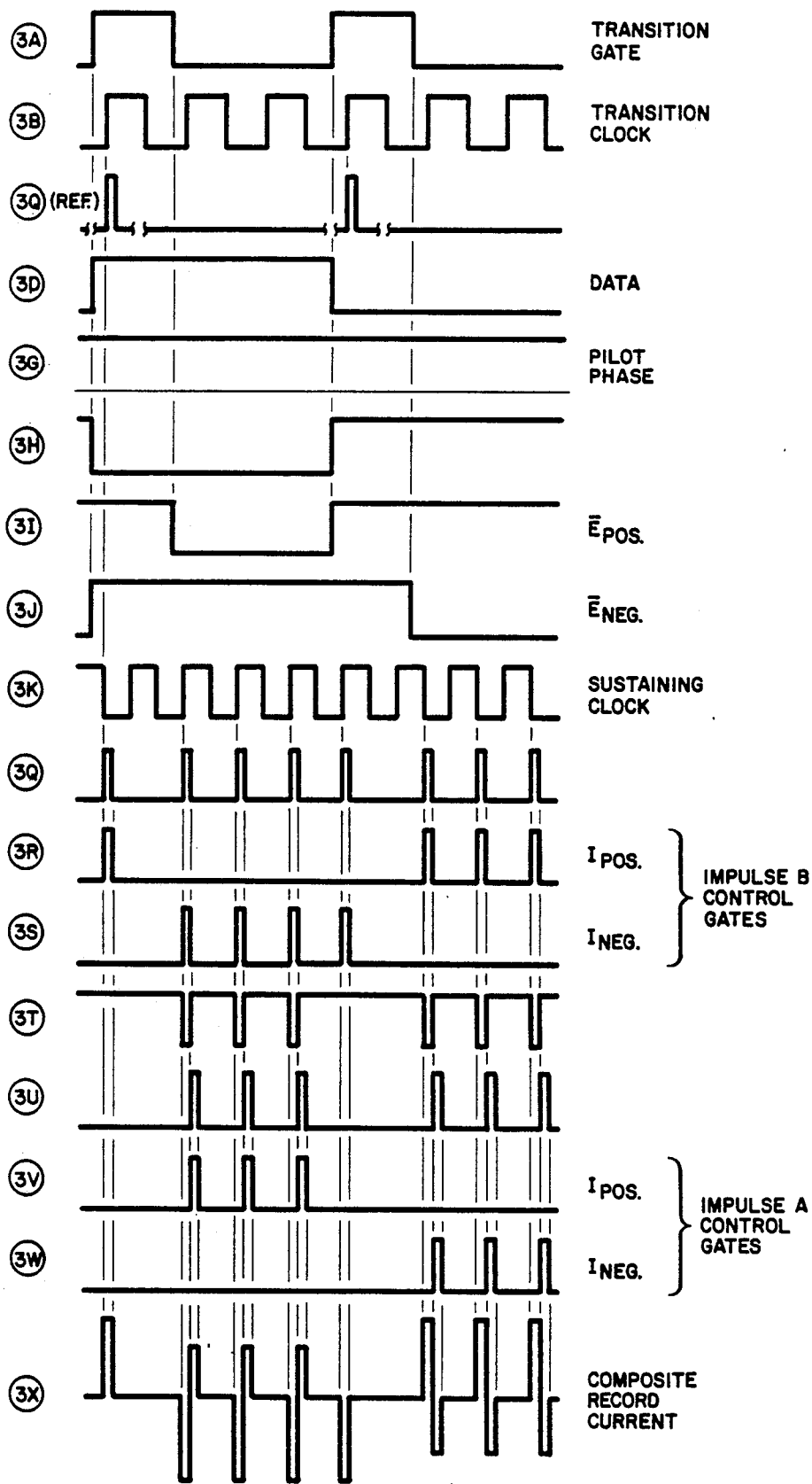
FIG. 44 is a third embodiment record system timing diagram.

Circled alpha-numeric designations at signal sources in FIGS. 38 and 43 refer to like designations of signal waveforms depicted in FIG. 44. Where such designations are common to those of FIGS. 37 and 39, the logic functions constituting the signal sources are also common. Reference numbers for devices shown in FIG. 43 which are common to those of FIG. 37 designate like devices.

FIG. 43 shows the modified record channel logic for this embodiment. And gate 367 provides a transition trigger to pulse generator B 306. This trigger input acts directly and is unaffected by enabling inputs. During a transition phase, the alternate sustaining clock trigger of generator B is held disabled by the transition gate acting through or gates 309 and 310. During a no-transition phase, generator B provides overwrite control pulses at the sustaining clock rate and phase, which phase is controlled as it is in the second described embodiment.

Exclusive-or gate 368 alternates transition impulse and overwrite impulse polarity by changing the polarity of the control gate data references from complementary output buffer 313 in accordance with the transition gate signal from buffer 305.

A delay generator 369, another monostable multivibrator, is also enabled and triggered in parallel with generator B 306 during no-transition phases. The delay generator sets up triggering of generator A 301 which generates a sustaining impulse gating pulse at a controlled time following overwrite impulse gating. The enabling signal controlled trigger of generator A is held permanently enabled for positive slope triggering. Other logic functions are identical to those of FIG. 37, previously explained, and will not be further elaborated.

Figure 46:
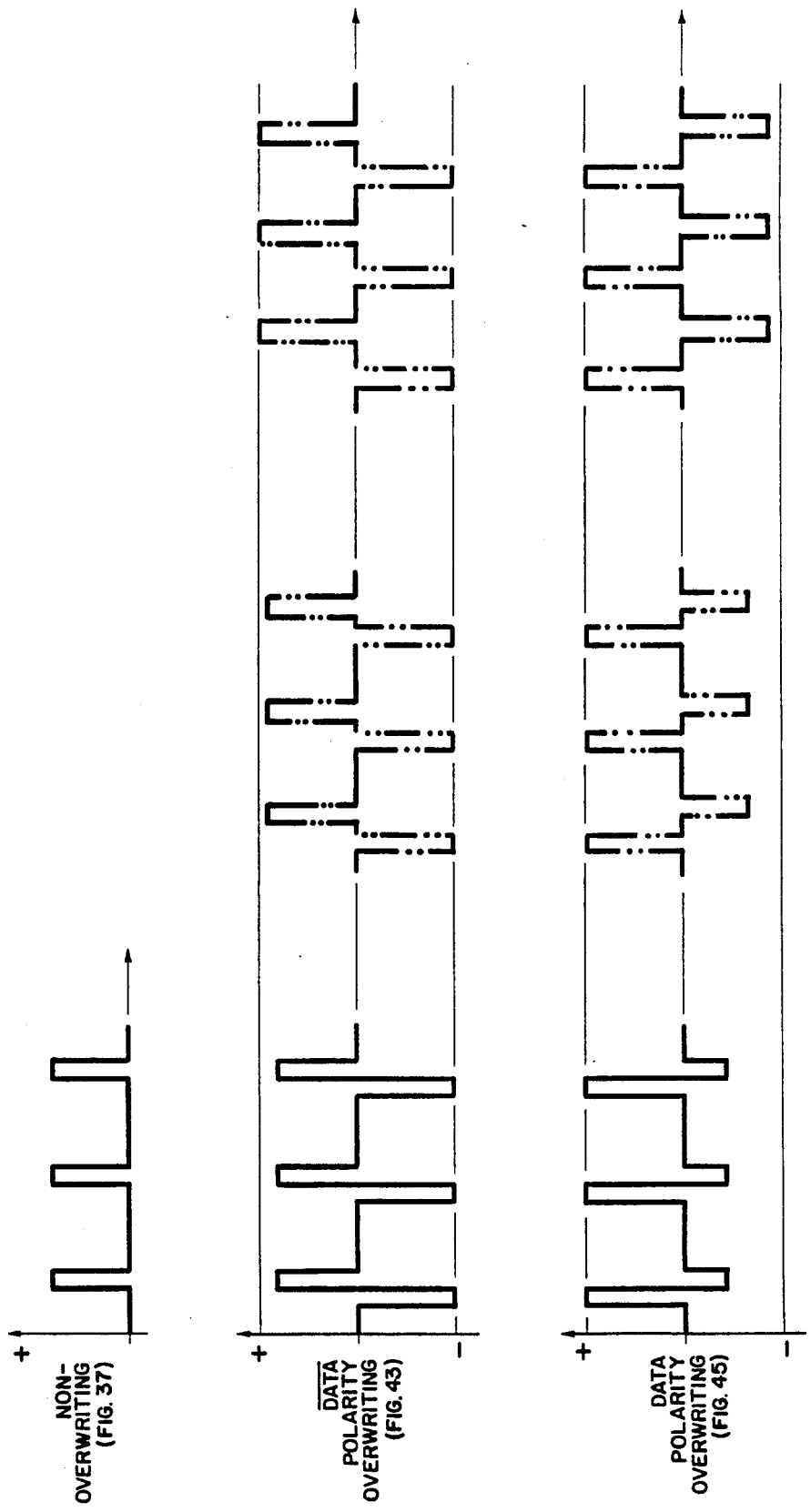
FIG. 46 diagrams comparatively the record current waveforms of the second through fourth embodiments.

The timing diagram of FIG. 44 shows the effect of fixing the delay generator 369 pulse interval equal to generator B 306 pulse interval; each overwrite impulse is followed by a contiguous, sustaining impulse. Other delays can be used and sustaining impulse levels can be varied in conjunction with different delays to effect equalization as has been previously explained and as can be seen in FIG. 46. The polarity of sustaining impulses for this embodiment is always in accordance with instant data, while overwrite impulses are always inverted with respect thereto.

Within limits imposed by data rate, either reproduce system associated with the two previously described embodiments can be compatible with the record system of the subject embodiment.

Figure 45:
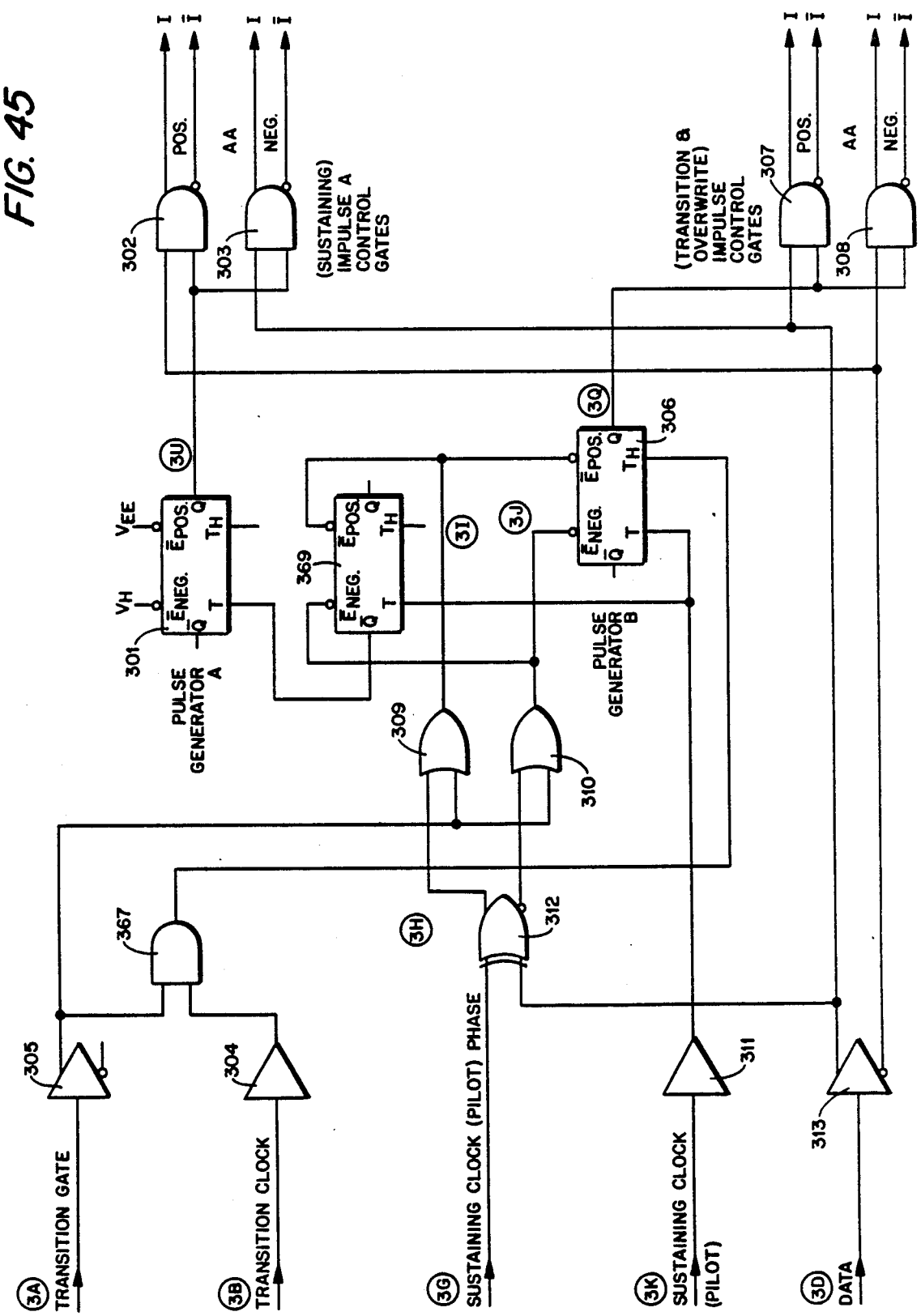
FIG. 45 illustrates part of the record channel logic for the fourth embodiment for implementing the subject invention.

FIG. 45 illustrates a partial logic diagram of a fourth embodiment for implementing the subject invention differing from the third only in that overwrite impulses are of the same polarity as instant data and that sustaining (adjustment) impulses are opposite in polarity with respect thereto. These differences allow fixing the data polarity references for impulse control gates as shown in FIG. 45. All other logic functions and connections have been previously explained in the context of describing other embodiments, and the numerical references associated therewith are provided as a convenience. Circled alpha-numeric designations of signal sources in FIG. 45 which are common to those of FIGS. 37 or 43 indicate that logic functions constituting the signal sources are also common.

FIG. 46 shows the sustaining signal or overwrite and sustaining signal waveforms associated with recording a positive, sustaining data level using recording systems of the second, third and fourth embodiments described herein. Signal level and timing variations are shown in phantom to indicate the ranges of possibility for achieving overwrite, write equalization and pilot recording.

Figure 47:
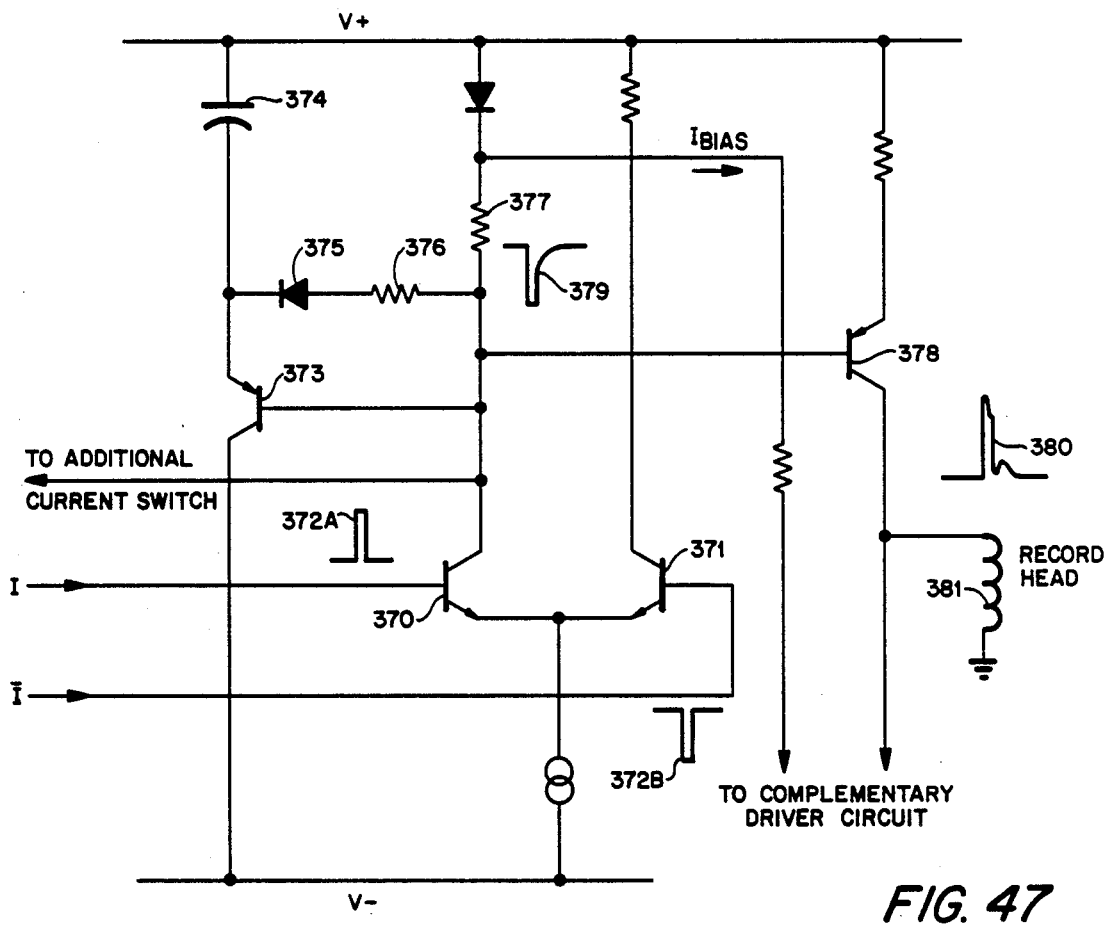
FIGS. 47 and 48 illustrate recording impulse shaping circuits.

Impulses which are shown as ideally rectangular can of course, be modified in shape for reasons previously explained. For example, the partial schematic diagram of FIG. 47 shows the addition of a capacitive shaping circuit modification to a differential current switch controlling a head driver. When the switch comprising transistors 370 and 371 is driven on by a differential signal having rectangular pulse waveform 372A and 372B, the collector voltage of transistor 370 falls instantaneously and current from emitter-follower transistor 373 rapidly charges shaping capacitor 374.

When transistor 370 is switched off, its collector voltage rises instantaneously to the sum of capacitor 374 voltage (at transistor 373 emitter) and the voltage drop across diode 375 and resistor 376; consequently, transistor 373 is switched off. Capacitor 374 then discharges through diode 375, resistor 376, resistor 377 and the base-emitter network of transistor 378 allowing the remaining collector voltage change of transistor 370 to occur more slowly until its quiescent level is reached, as shown by waveform 379.

An additional current switch, which might also control the base of transistor 378, would produce essentially identical results. The fast leading edge and partially exponential trailing edge of waveform 379 results in a current impulse (waveform 380) to the record head 381 which remains at an effective recording level only briefly, as desired, but which eliminates possible subsequent erasure caused by a head circuit ringing, undershoot cycle.

Figure 48:
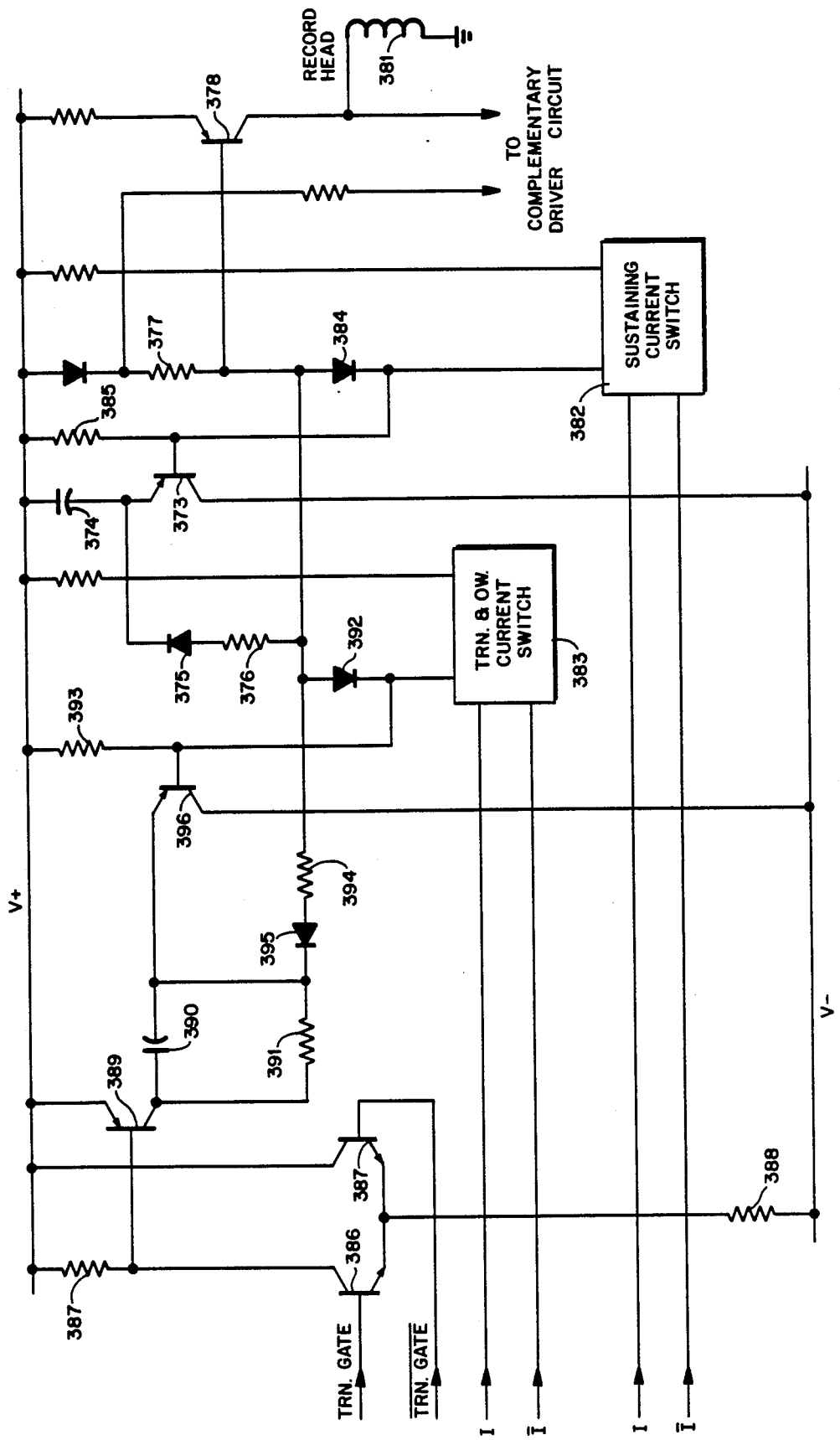

When opposite polarity current impulses are contiguous, as are the overwrite and sustaining impulses of waveform 3X in FIG. 44, undershoot can only be deleterious at the last trailing edge, that is, the sustaining impulse trailing edge; accordingly, the partial schematic diagram of FIG. 48 shows a fixed, impulse shaping circuit associated with a differential switch 382 controlling sustaining impulses and a gated, impulse shaping circuit associated with a differential current switch 383 controlling both transition and overwrite impulses. The gated, impulse shaping circuit is enabled during transition impulses, which are assumed to be isolated, but disabled during overwrite impulses, which are assumed to be contiguous with sustaining impulses.

The fixed shaping circuit is identical to that of FIG. 47 except for the addition of a diode 384 isolating current switch 382 as the only control source for this fixed circuit and, necessitated thereby, the addition of resistor 385 establishing a d.c. reference for emitter-follower transistor 373. The reference numbers for other elements of the fixed circuit of FIG. 48 are the same as for their counterparts in FIG. 47.

The gated shaping circuit of FIG. 48 is enabled by a complementary transition gate signal, as from complementary output buffer 305 in FIG. 43. This signal drives a differential current switch comprising transistors 386 and 387, collector load resistor 387 and emitter current source resistor 388; the current switch controls saturating, switching transistor 389 to connect shaping capacitor 390 into the circuit during generation of transition impulses. A relatively high valued resistor 391 prevents capacitors 390 from being charged partially by leakage currents when transistor 389 is off. Diode 392 isolates current switch 383 as the only source controlling this gated, shaping circuit. The functions of resistors 393 and 394, diode 395 and transistor 396 are the same as those of resistors 385 and 386, diode 375 and transistor 373 respectively.

Obviously, impulse shaping circuits of FIGS. 47 and 48 must also exist in complementary form with the complementary head driver circuit not shown in these figures. Alternatively, the single ended complementary head drivers applied with single winding record heads in the various preferred embodiments of the subject invention can readily be design translated into equivalent, double ended head drivers applied with dual winding (center-tapped) record heads and applied with duplicate impulse shaping circuits rather than complementary ones.

Other RC pulse shaping circuits are known in the art. As one alternative, resistive damping of the head driver can be employed to limit undershot caused by record head circuit ringing, as exemplified by resistor 317 of FIG. 38, but, resistive damping can also limit impulse rise time and, in consequence, highest data rates. Low impedance voltage source head drivers which decouple record head inductance and capacitance can be applied effectively to control undershoot as well as current impulse rise times.

In a fifth embodiment for implementing the subject invention which is a modification of the first embodiment, a fixed phase pilot is recorded to enhance NRZ-Level data having its transitions adaptively timed to that fixed pilot (FIG. 23). Two transition clocks, offset in phase by a pilot half-cycle, are made available to adapt data edges for recording as required to accommodate the pilot. Selection of the correct clock phase to effect such accommodation at each data transition assures that all transitions will be phase coherent with the pilot and enhanced by it. When data recordings thus enhanced are reproduced, the original data timing is restored by logic additions unique to the reproduce system of this embodiment. All other design requirements presupposed for the subject embodiment are the same as for the first described embodiment.

Figure 49:
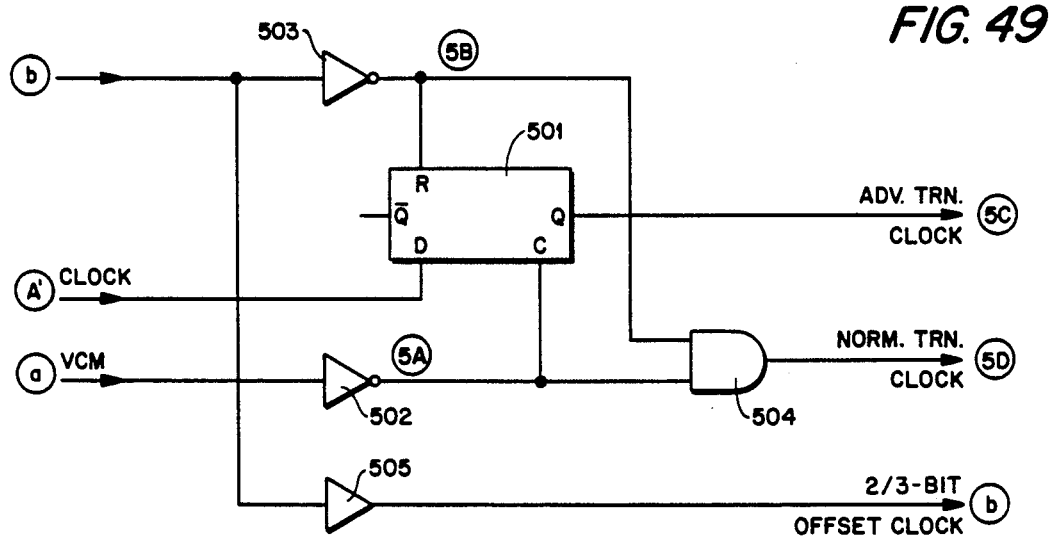
FIG. 49 diagrams system timing logic additions associated with the record system of the fifth embodiment for implementing the subject invention.
Figure 52A:
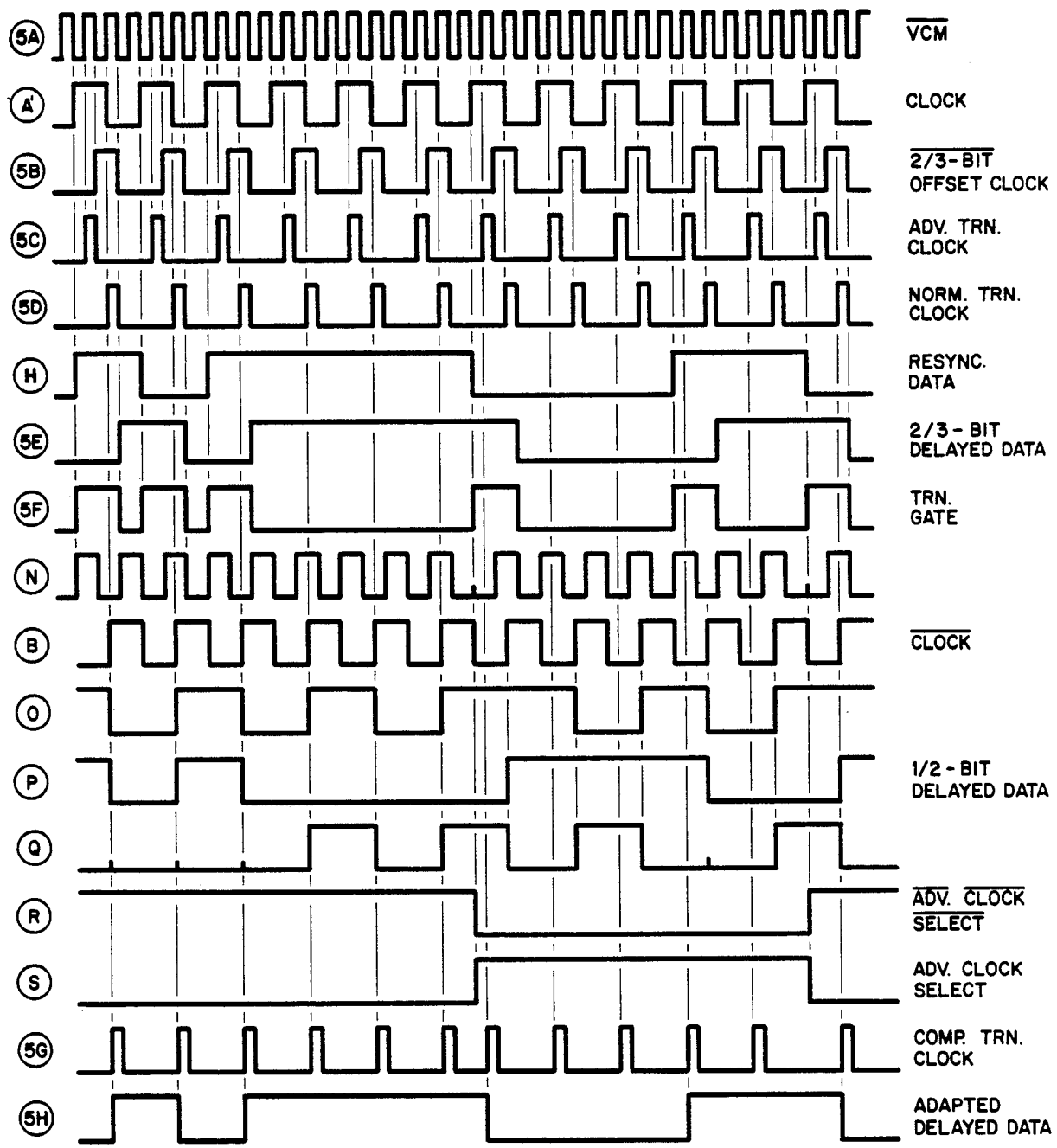
FIGS. 52A includes 5A through 5H and 52B are a fifth embodiment record system timing diagram.
Figure 52B:
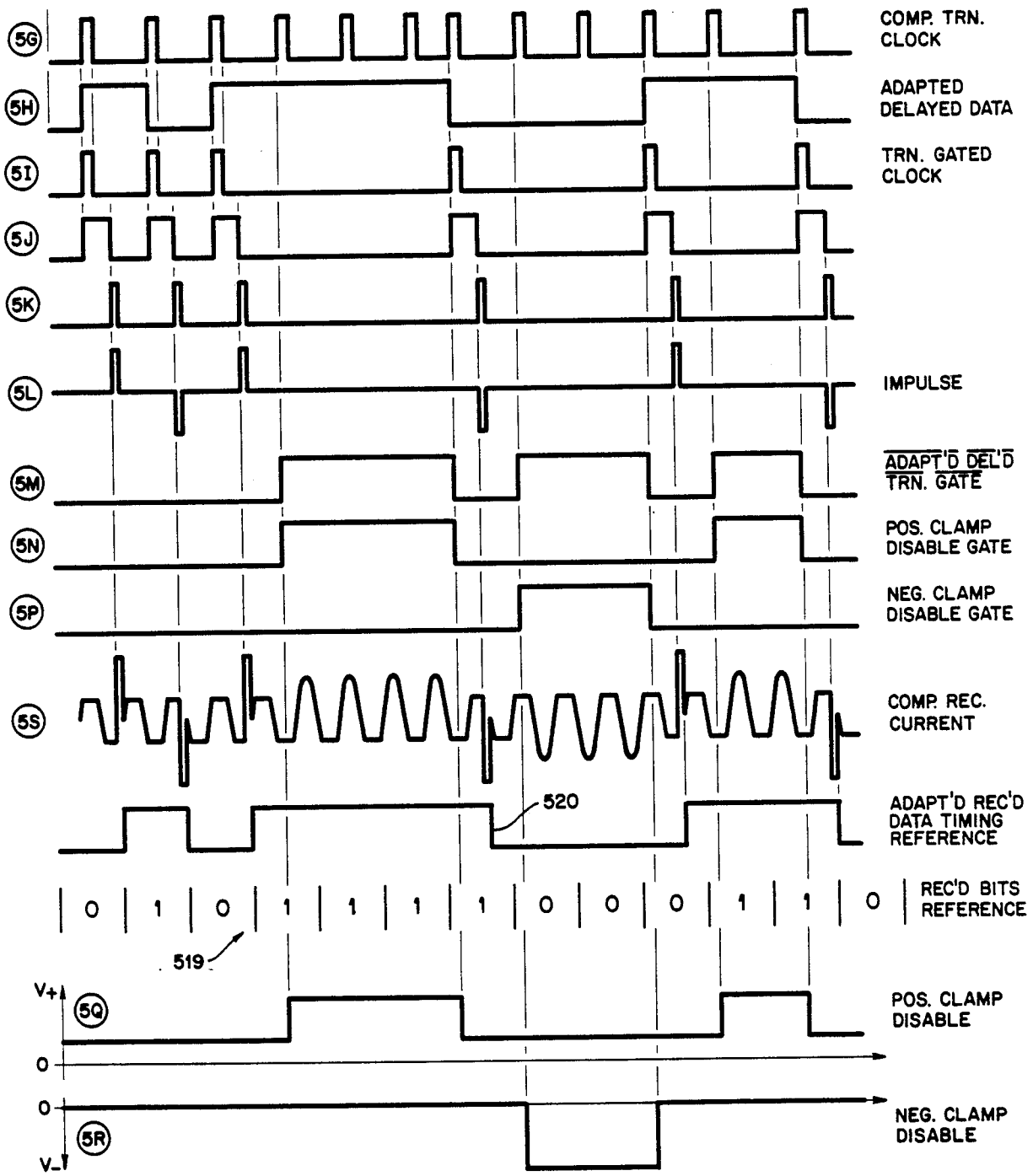

FIG. 49 shows the additions to the VCM frequency divider logic of FIG. 26 used to produce the timing signals unique to the recording system of this embodiment. Circled letter designations at signal sources in FIG. 49 refer to like designations of signal waveforms in FIG. 27; similarily, circled alpha-numeric designations of FIG. 49 refer to like designations of waveforms in FIG. 52.

Transition clock pulses advanced in timing are generated by a D flip-flop 501 during positive half-cycles of the data clock applied to its D input from the Q output of D flip-flop 121 (FIG. 26). These advanced timing pulses are clocked high by an inverted, timing-system-VCM signal from inverting buffer 502 and driven low by an inverted signal from D flip-flop 120 (FIG. 26) applied to the reset input of flip-flop 501 from inverting buffer 503.

The inverted VCM signal from buffer 502 and the inverted signal from buffer 503 are coupled to and gate 504 producing normally timed transition clock pulses. It should be noted that the positive edges of transition clock pulses defined as normally timed are coincident with positive edges of the inverted, data clock ($\overline{Q}$ output of flip-flop 121) which, in effect, served as the transition clock for the first embodiment and that positive edges of the transition clock pulses defined as advanced in timing are early by one VCM cycle (one-half a pilot cycle) with respect thereto.

Another (postive edge) clock unique to this embodiment and which is retarded in timing by two-thirds of a bit cell with respect to the data clock is provided from buffer 505 driven by the output of flip-flop 120.

Figure 50:
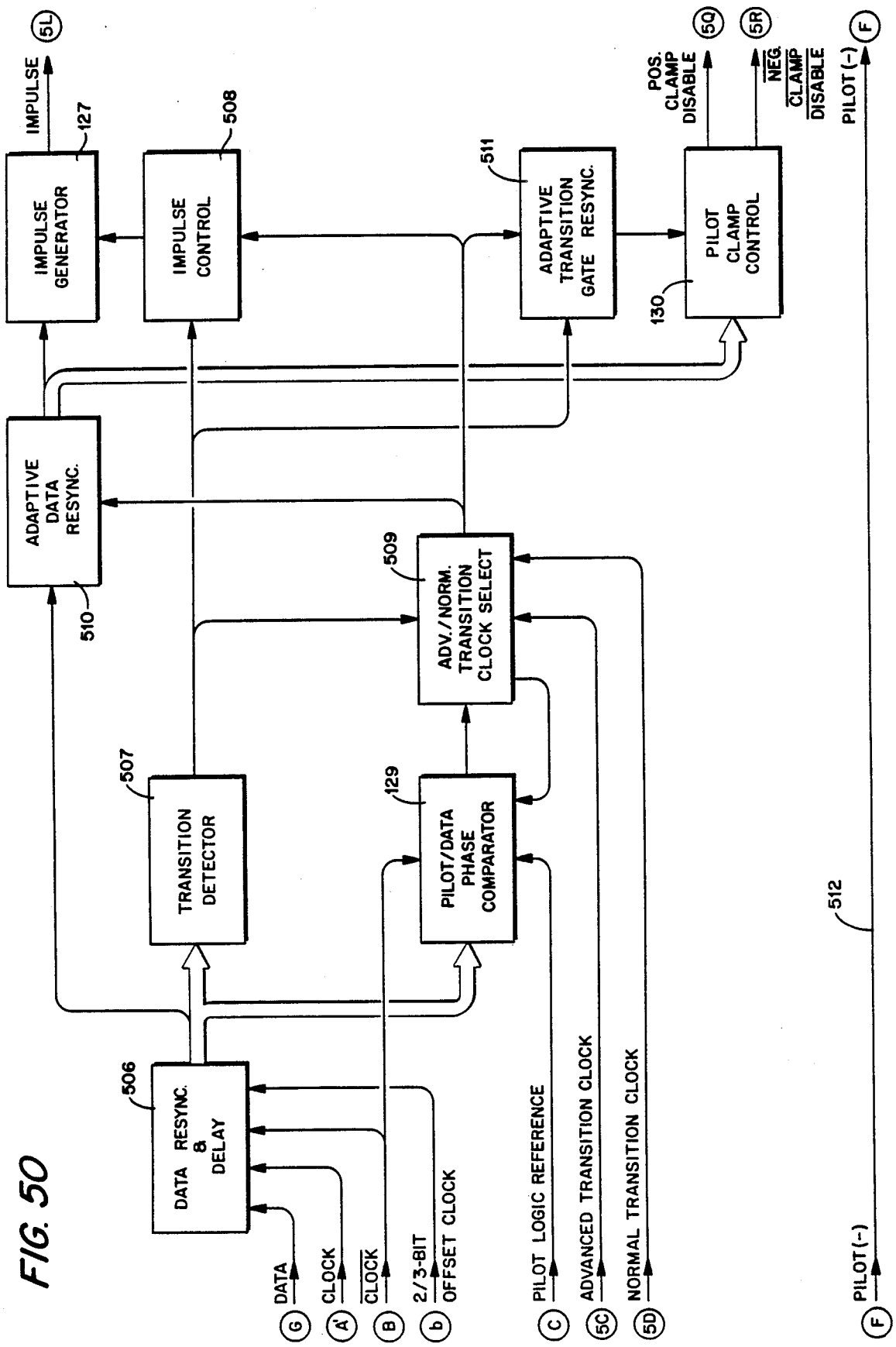
FIG. 50 is a functional block diagram of the record channel logic for the fifth embodiment.
Figure 51A:
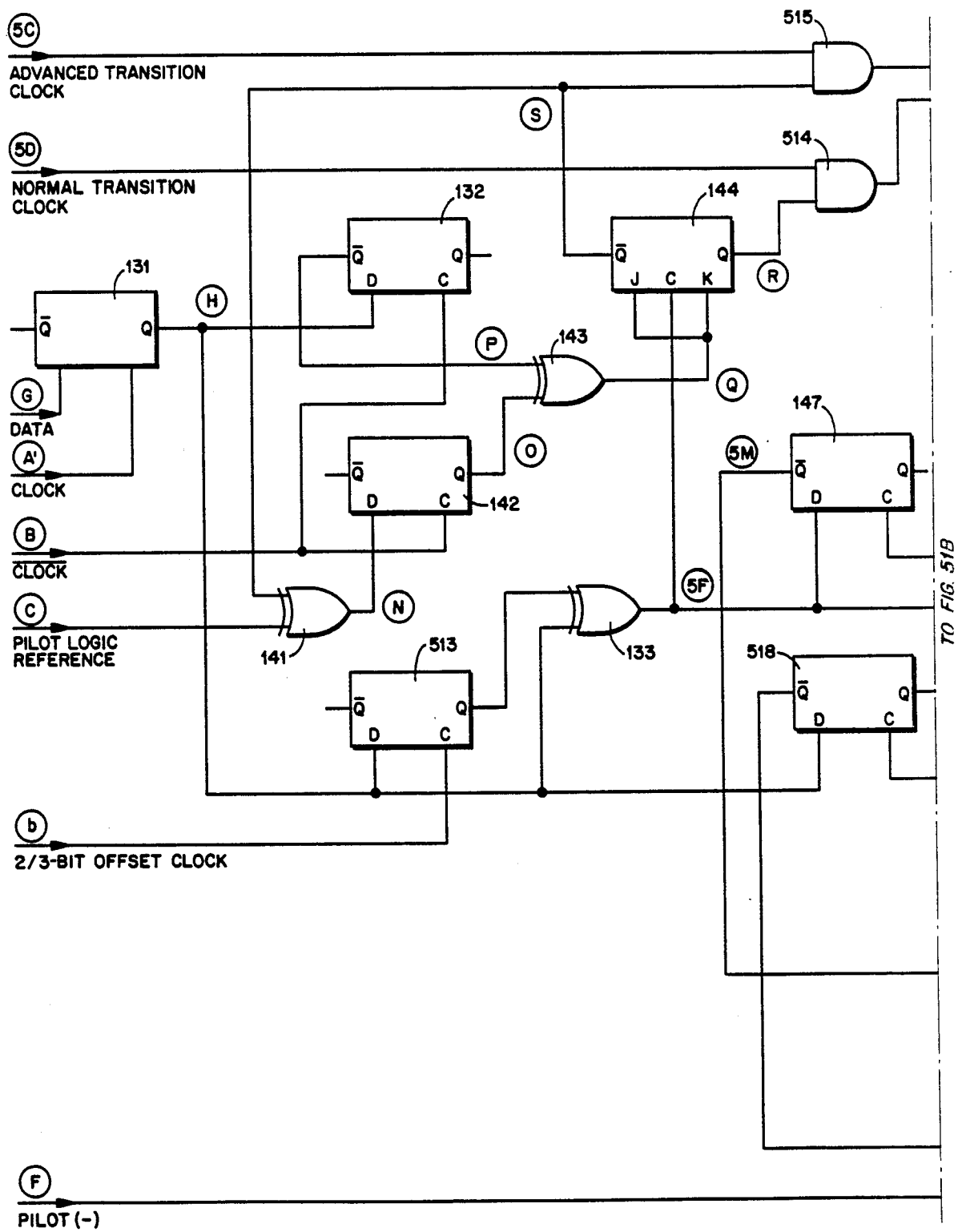
FIGS. 51A and 51B are a fifth embodiment record channel logic, logic diagram.
Figure 51B:
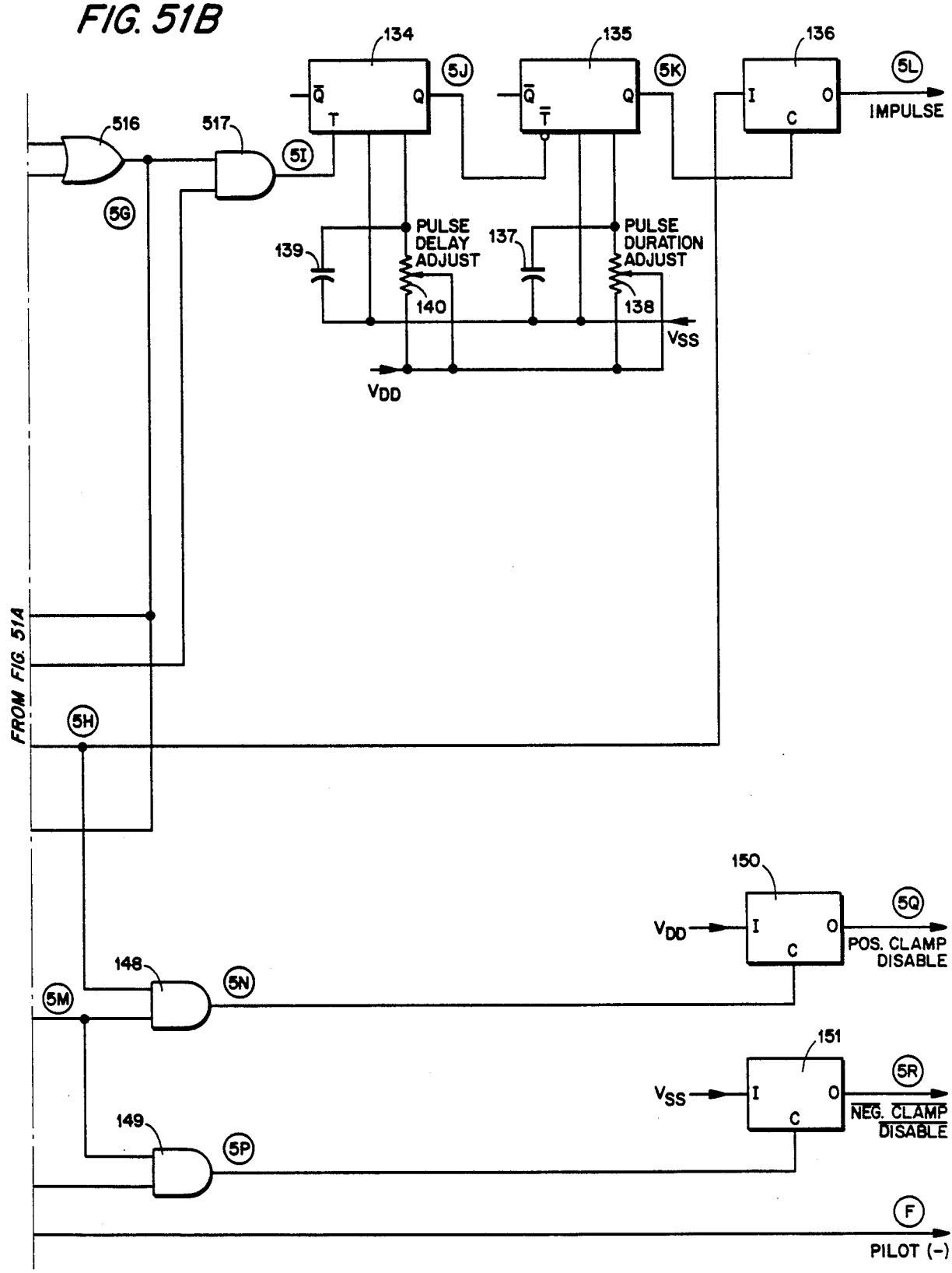

The record channel logic for the subject embodiment is depicted functionally in FIG. 50 and with more detail in the logic diagram of FIG. 51. For both FIGS. 50 and 51: circled letter designations at signal sources refer to like designations of signal waveforms in FIGS. 27 and 30; circled alpha-numeric designations at signal sources refer to like designations of signal waveforms in the timing diagram of FIG. 52; elements identified by numerical references common to corresponding elements in FIGS. 28 or 29 have functions identical to those of such corresponding elements.

The data resynchronizing and delay circuit 506 (FIG. 50) sets up fixed delay data for the record logic. Transition detector 507 develops a transition signal to gate transition clock pulses from the impulse control circuit 508 and to trigger a change of clock phase by the advanced/normal transition clock select circuit 509 when the need for such change is signaled by the pilot/data phase comparator 129. The output clock of select circuit 509 triggers adaptively timed transition impulses from impulse generator 127 through the transition gated impulse control circuit 508. The selected clock also effects adaptively resynchronized data which serves as polarity reference for both the impulse generator 127 and the pilot clamp control circuit 130 through clocking the adaptive, data resynchronizing register 510; in a similar manner, an adaptively resynchronized transition gate signal driving the clamp control circuit 130 is effected by the adaptive, transition gate resynchronizing register 511 also clocked by the output of select circuit 509. The fixed phase, pilot(−) signal from the record system timing logic is connected directly to the record channel logic output (record channel processor input) without further conditioning, as it shown by circuit connection 512.

Most of the logic operations performed by the record system of the subject embodiment are identical to operations of the first described embodiment as a comparison of the logic diagrams of FIGS. 51 and 29 will reveal.

Referring to FIG. 51, the D flip-flops 131 and 132 function like their counterparts in the logic of the first embodiment: flip-flop 131 provides clock resynchronized data for the transition detector; flip-flop 132 provides inverted data delayed one-half a clock cycle with respect thereto for the pilot/data phase comparator. The pilot/data phase comparator comprising D flip-flop 142 with exclusive-or gates 141 and 143 in the same manner for both embodiments as does the data transition, exclusive-or gate 133. However, the most delayed data input to gate 133 is synchronized to a clock delayed two-thirds of a bit cell with respect to the data clock rather than one-half of a bit cell as in the first embodiment logic. This further delayed data signal provided by a D flip-flop 513 results in a transition signal of longer duration and longer hold-time margin for subsequent logic operations. The transition signal from gate 133 and the pilot/data phase error signal from gate 143 are applied to the clock and interconnected J-K inputs, respectively, of a J-K flip-flop 144 as they are for the first embodiment, but the complementary outputs of flip-flop 144 control selection of the normal transition clock through and gate 514 or the advanced transition clock through and gate 515 rather than controlling pilot phase selection. The transition clock phase thus selected is available at the output of or gate 516 for developing all signals adaptively timed for phase coherence with the pilot.

The adaptive transition clock from or gate 516 is applied to the positive slope trigger of monostable multivibrator 134 through and gate 517 when enabled by the transition signal from gate 133. Monostable multivibrators 134 and 135 operate precisely as their first embodiment counterparts in determining impulse delay (phase) and impulse duration, respectively. Transition control pulses from multivibrator 135 are coupled to a bilateral switch 136 referenced to a data signal for impulse polarity control. Correct data polarity reference timing for the adaptively clocked, transition impulses is ensured by using D flip-flop 518 to synchronize the data reference to the adaptive clock before applying it to switch 136.

Flip-flop 518 also provides complementary data reference signals to clamp control and gates 148 and 149. D flip-flop 147 produces an inverted transition gate signal synchronized to the adaptive clock from gate 516 and therefore correctly timed for use in deriving clamp disabling signals. The output of flip-flop 147 is applied to adaptive data referenced and gates 148 and 149 producing polarity discriminated control signals for bilateral switches 150 and 151. Switch 150 develops a positive clamp disabling signal and switch 151 develops a negative clamp disabling signal in the same manner as their counterparts in the first embodiment.

The record channel processor of the subject embodiment is identical to that depicted schematically in FIG. 38 for the first preferred embodiment. A composite record current waveform 5S generated by record channel processing of specific data is shown in the record system timing diagram of FIG. 52 with the assumed bit sequence 519 and its adaptively timed, recorded data reference 520.

The reproduce system depicted in FIGS. 33 and 35 for the first preferred embodiment is applied to the subject embodiment with minor adjustments and with additional logic used to convert the adaptively timed, detected data to correctly timed, output data with clock.

One adjustment of the reproduce system is a change of VCM 219 center frequency voltage or timing components in order to raise its output frequency to three times the clock frequency (three times the first-embodiment frequency). The VCM period, thus adjusted, defines a reduced detection window as previously explained in conjunction with FIG. 23. Accordingly, the pulse width of pulse generator 216 (monostable multivibrator 264) is adjusted to one-half the VCM period and a similar, phase compatible adjustment is made of the pulse width from pulse generator 214 (monostable multivibrator 258).

Figure 53:
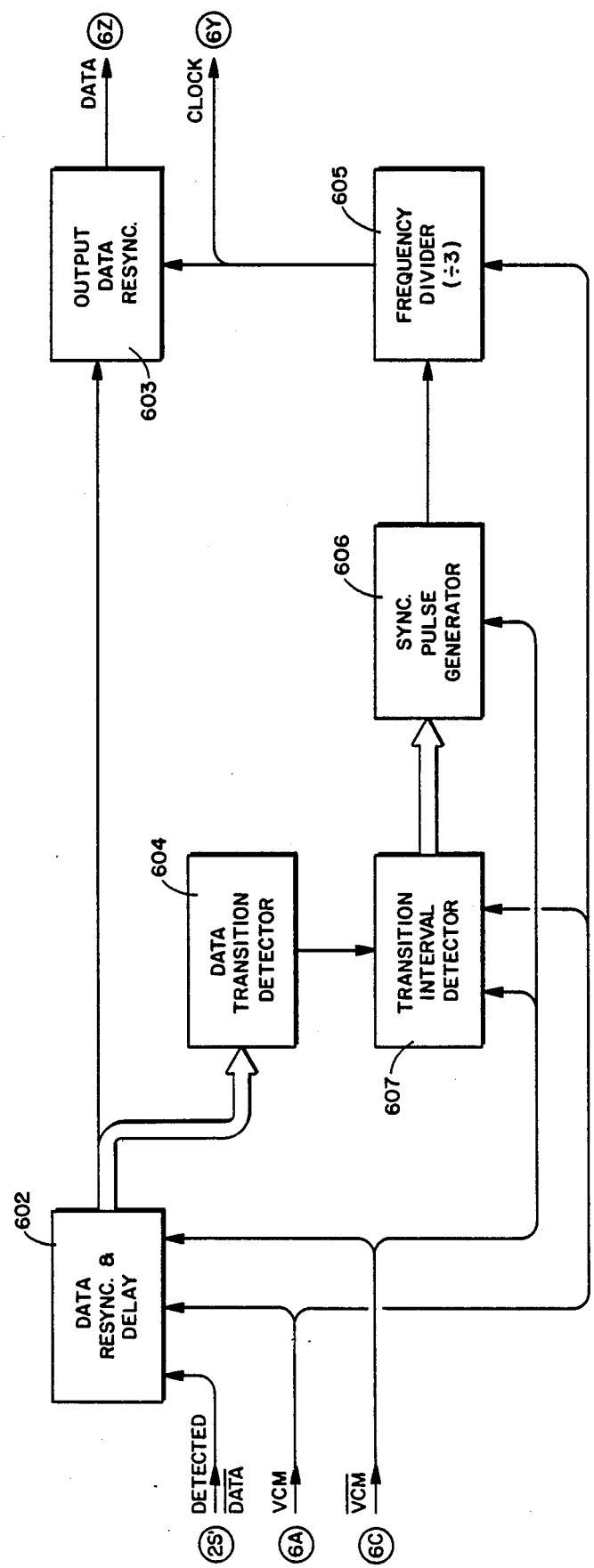
FIG. 53 diagrams functionally logic additions to the fifth embodiment reproduce system.
Figure 54A:
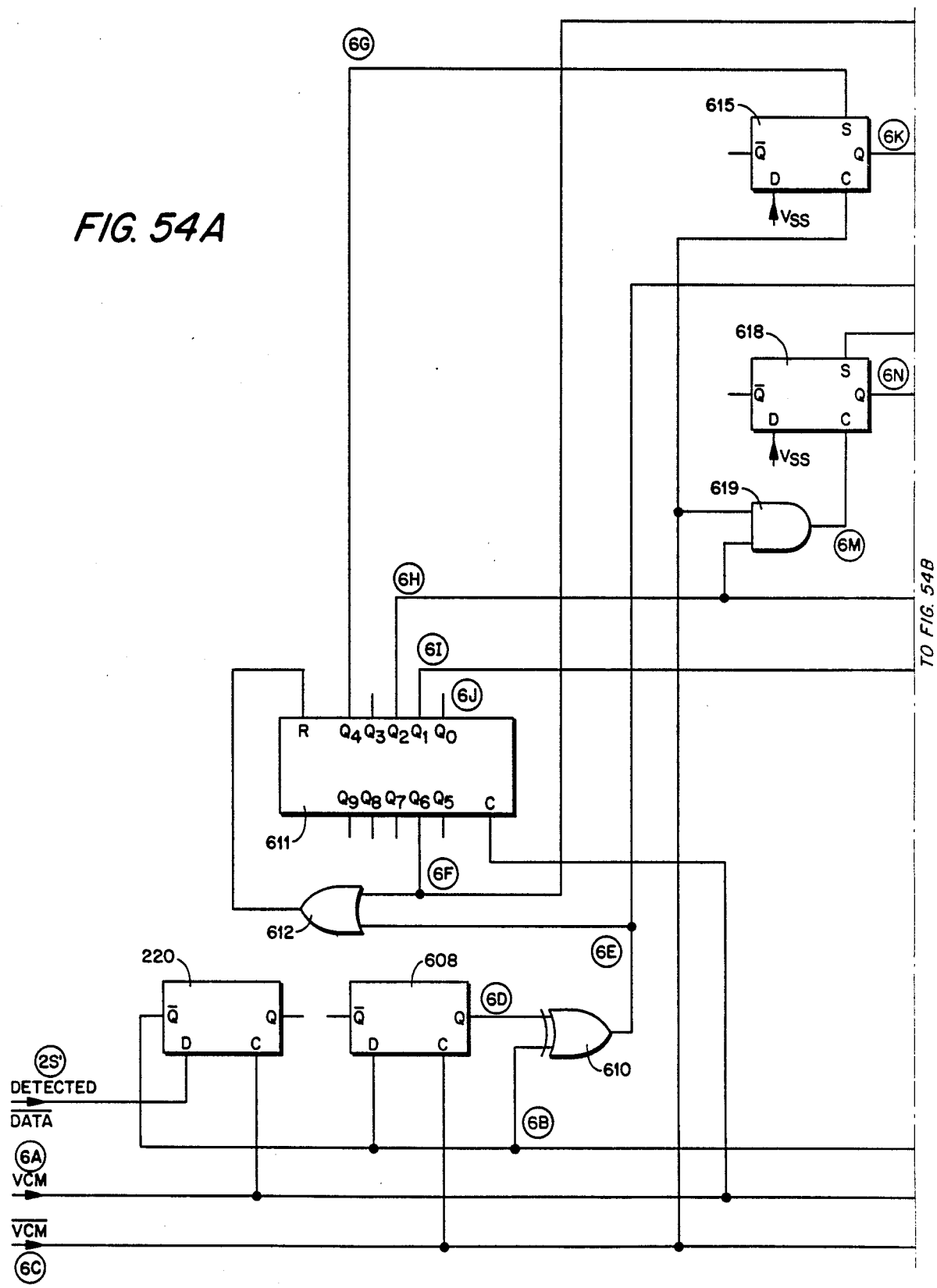
FIGS. 54A and 54B give details of fifth embodiment reproduce system logic additions.
Figure 54B:
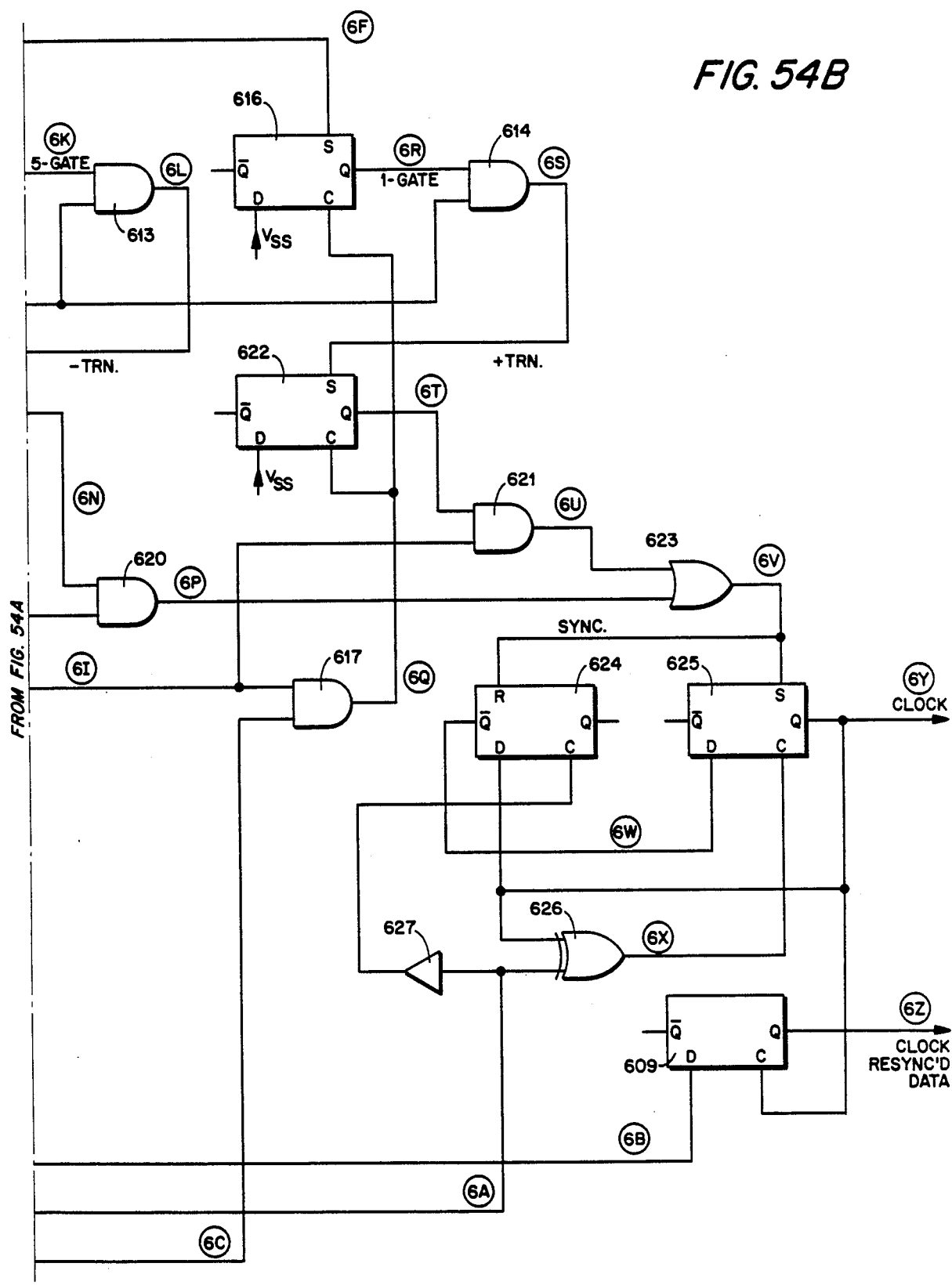
Figure 55:
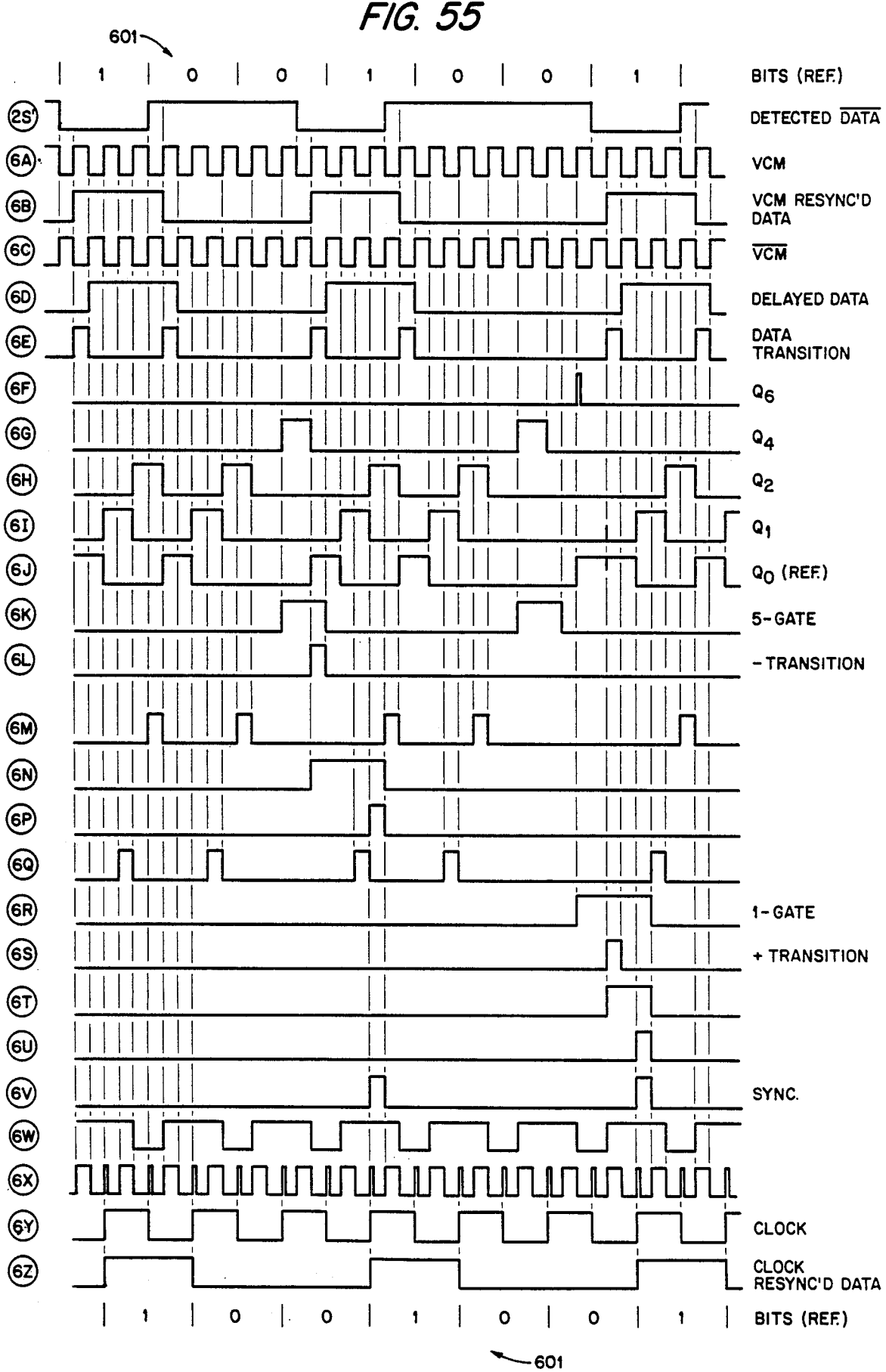
FIG. 55 provides signal timing information associated with the logic additions to the reproduce system of the fifth embodiment.

The logic additions to the reproduce system of this embodiment are depicted functionally in FIG. 53 and with greater detail in FIG. 54, for both of which, circled alpha-numeric designations at signal sources refer to like designations of signal waveforms in the timing diagram of FIG. 55. Resynchronizing register 220 is part of the reproduce logic of FIG. 35 but is duplicated in FIG. 54 for clarity. An inverted signal ($\overline{Q}$) from VCM 219 not used in the first embodiment is an input signal to the logic additions of the present embodiment. As reference, the data bit sequence 601 associated with a timing diagram for specific data is shown in time proximity to both the detected data waveform 2S' and the output data waveform 6Z of FIG. 55.

Referring to FIG. 53, the data resynchronizing and delay circuit 602 sets up correctly timed data signals for the output data resynchronizing register 603 and for the transition detector 604 providing a pulse for each detected data transition.

The data applied to the output data register 603 is resynchronized to a data clock divided down from the VCM frequency using a divide-by-three frequency divider 605. In order to obtain maximum timing margins for the output data resynchronizing logic and to obtain correct restoration of output data timing, only one of three possible phases for the data clock from divider 605 is used. Selection of the correct data clock phase is ensured by applying synchronizing pulses to divider 605 from a synchronizing pulse generator 606.

Precisely timed, synchronizing pulses from generator 606 are derived from two sets of data transition interval measurements, one set of which signifies that the data transitions terminating its specific measurements are of advanced clock phase and, the alternate set of which signifies that the data transitions terminating its alternate, specific measurements are of normal clock phase. The transition interval detector 607 driving generator 606, is controlled by transition detector 604 and is used to make the clock phase determining interval measurements in VCM period units. Once the frequency divider 605 is synchronized by any pulse from generator 606, it will remain so unless data is interrupted and the VCM loses lock; additional pulses which are applied frequently to the synchronized divider produce no effect. Frequent synchronizing pulses are ensured by the fact that they are generated by all even-bit, data transition intervals, as will be shown.

Operation of the circuits which synchronize frequency divider 605 to the correct data clock phase relies on the following factors associated with the adaptive data timing algorithm of the present embodiment:

(1) an even-bit interval between data transitions always results in that interval being adaptively changed by plus or minus one VCM period (one-half a pilot period).

(2) an odd-bit interval between data transitions never results in that interval being changed.

(3) adaptive timing of a data transition terminating an even-bit interval which changes that transition to an advanced clock phase either produces a new interval of five VCM periods—for two bits—or produces a new interval having a remainder of five VCM periods when a multiple of six VCM periods is subtracted. For example, a six-bit interval having its terminating transition adaptively clocked to the advanced phase becomes seventeen VCM periods in length; subtracting twelve VCM periods leaves a remainder of five VCM periods.

(4) adaptive timing of a data transition terminating an even-bit interval which returns that transition to a normal clock phase always produces a new interval having a remainder of one VCM period when a multiple of six VCM periods is subtracted. For example, a two-bit interval having its terminating transition adaptively clocked to normal phase becomes seven VCM periods in length; subtracting six VCM periods leaves a remainder of one VCM period.

(5) Odd-bit intervals, never changed adaptively, either have a length of three VCM periods for one bit or have a length leaving a remainder of three VCM periods when a multiple of six VCM periods is subtracted. For example, a three-bit interval is nine VCM periods in length, subtracting six VCM periods leaves a remainder of three VCM periods.

Considering the above factors, if transition intervals are measured in VCM periods using a decade counter clocked by the VCM signal and configured to reset every six cycles, thereby always subtracting multiples of six VCM periods, then the following conclusions are valid with respect to detected data transitions terminating such measured intervals:

(1) Transitions coinciding with a five-VCM-period interval count are of advanced clock phase and are described herein as, "minus transitions".

(2) Transitions coinciding with a one-VCM-period interval count are of normal clock phase and are described herein as, "plus transitions".

(3) Transitions coinciding with a three-VCM-period interval count (or any count other than one or five VCM-periods) are of indeterminate clock phase and are described herein as, "zero transitions".

The logic relationships inferred by the foregoing conclusions form the basis for operation of circuits converting detected, adaptively timed data to correctly timed output data.

As shown in the logic diagram of FIG. 54 with the timing diagram of FIG. 55, inverted, detected data is synchronized to the VCM signal and inverted by D flip-flop 220 then delayed one-half a VCM period through subsequent clocking of D flip-flop 608 by the inverted, VCM signal VCM synchronized data is coupled to D flip-flop 609 to be synchronized to a data clock. Exclusive-or gate 610 driven by the relatively delayed, data signals produces a pulse of duration equal to one-half a VCM period for each data transition. Transition pulses so derived control operation of the transition interval detector circuit which discriminates minus transitions and plus transitions.

Each transition pulse resets decade counter 611 through or gate 612 to terminate a transition interval count and to begin a new one clocked by the VCM signal. The counter is automatically reset every six VCM periods—when not preveniently reset by a transition pulse—by the $Q_6$ output of the counter applied through or gate 612.

Transitions signaled by exclusive-or gate 610 are discriminated as minus or plus by and gates 613 and 614 respectively; zero transitions produce no effect save resetting the counter. Minus transitions would all be coincident with a $Q_5$ (fifth) output pulse, but these minus transitions reset the counter preventing an output from $Q_5$ for more than an unreliable, propagation-delay period required for resetting. For this reason, a five-count gate pulse is initiated by the $Q_4$ output setting D flip-flop 615 high and then terminated by the inverted, VCM signal clocking flip-flop 615 low half way into the "fifth" count period. A "five-gate" signal is thus established for and gate 613 to discriminate minus transitions. In a similar manner, a "one-gate" signal is established for and gate 614 to discriminate plus transitions. Each one-gate pulse is initiated by the $Q_6$ output of the counter setting D flip-flop 616 high. Each one-gate pulse is then terminated by the inverted, VCM signal clocking flip-flop 616 low half way into the next VCM period during which the $Q_1$ output is high; selection of the inverted-VCM-signal clocking edge coinciding with the next $Q_1$ output pulse is accomplished by and gate 617.

Minus and plus transitions, being of known clock phase, are used to initiate logic sequences resulting in synchronizing signals assuring recovery of a correctly phased, data clock. Correct timing of synchronizing signals and, in consequence, selection of the correct data clock phase occurs when each minus transition causes initiation of a synchronizing pulse two VCM periods later and when each plus transition causes initiation of a synchronizing pulse one VCM period later. Such delay timing of synchronizing signals is controlled by counter 611.

The minus transition signal from and gate 613 initiates a gate antecedent to generation of a synchronizing pulse by setting D flip-flop 618. The output of flip-flop 618 then remains high until it is clocked low by an inverted-VCM-signal clocking edge through and gate 619 when gated by the next $Q_2$ output pulse from the counter. This antecedent gate signal and the $Q_2$ pulse are coupled to and gate 620, the output of which provides a synchronizing pulse remaining high for the first half of the $Q_2$ pulse duration. Thus, a synchronizing pulse is obtained two VCM periods following each minus transition. In the same way, a synchronizing pulse is obtained from and gate 621 when driven by the output of D flip-flop 622 and the $Q_1$ output of the counter one VCM period following each detected plus transition. The pulses from and gate 621 are combined with pulses from and gate 620 by or gate 623, the output of which is used to synchronize the divide-by-three frequency divider.

The frequency divider generates the data clock from the divided, VCM signal. This divider comprises D flip-flops 624 and 625, exclusive-or gate 626 and buffer 627; it operates as the previously explained divide-by-three circuit depicted in FIG. 26 with one exception: the synchronizing pulses from or gate 623 are coupled to the reset input of flip-flop 624 and the set input of flip-flop 625 to prevent continued operation of the divider at any output clock phase other than the one desired.

The correctly phased data clock available at the Q output of flip-flop 625 is employed to resynchronize the data signal coupled to flip-flop 609; thereby, the timing of the output data is restored to that of the original, host system data.

The utility of applying pilot enhanced, impulse recording with some systems can lie totally in achieving a linear, equalized recording; pilot or sustaining clock frequencies might not be separately recoverable for other uses. Such would be the case for a system in which sustaining impulses were recorded at spatial intervals exactly equal to its magnetically effective reproduce gap length; the sustaining signal frequency would then be the same as the first null frequency of the reproduce head response characteristic. However, when it is impossible or impractical with a given head-to-magnetic-medium interface to recover a pilot having its frequency beyond the data pass-band, it is still possible to record a useful pilot inside the data band for clock assurance, tracking serves or other purposes. In-band pilots are recorded employing the techniques represented by the sixth preferred embodiment of the subject invention.

In the sixth preferred embodiment which is a modification of the third embodiment of FIGS. 38, 40, 41 and 43, an in-band pilot signal is recorded by means of sustaining impulse amplitude modulation during intervals between data transitions. When a recording containing an in-band pilot is reproduced, that pilot can be discriminated by a gated recovery system which is active only during predetermined intervals between data transitions and squelched during data transition detection. The sustaining clock and the transition clock of this embodiment are the same in frequency but relatively adjustable in phase, the pilot frequency is one-half the clock frequency.

The modifications to the third embodiment recording system in developing the subject embodiment include the addition of sustaining impulse current modulation means to the record channel processor and the elimination of pilot phase select circuits, presupposed in a foregoing description of the third embodiment, from the record channel logic. The dynamic accommodation of sustaining clock phase is made unnecessary by virtue of its frequency being the same as that of the transition clock. The record system timing logic which was also presupposed in the third embodiment description is defined for the subject embodiment by the partial schematic diagram of FIG. 56 and the timing diagram of FIG. 57 for reasons of clarity and of serving as an example of means known in the art for adjusting the phase (delay) of one clock (digital signal) to another. The need for such adjustment of clock phase or, at least, the need for its predetermination is common to all embodiments of the subject invention. Circled alpha-numeric designations at signal sources in FIGS. 56, 58 and 59 refer to like designations of signal waveforms in FIGS. 57 or 60.

Figure 56:
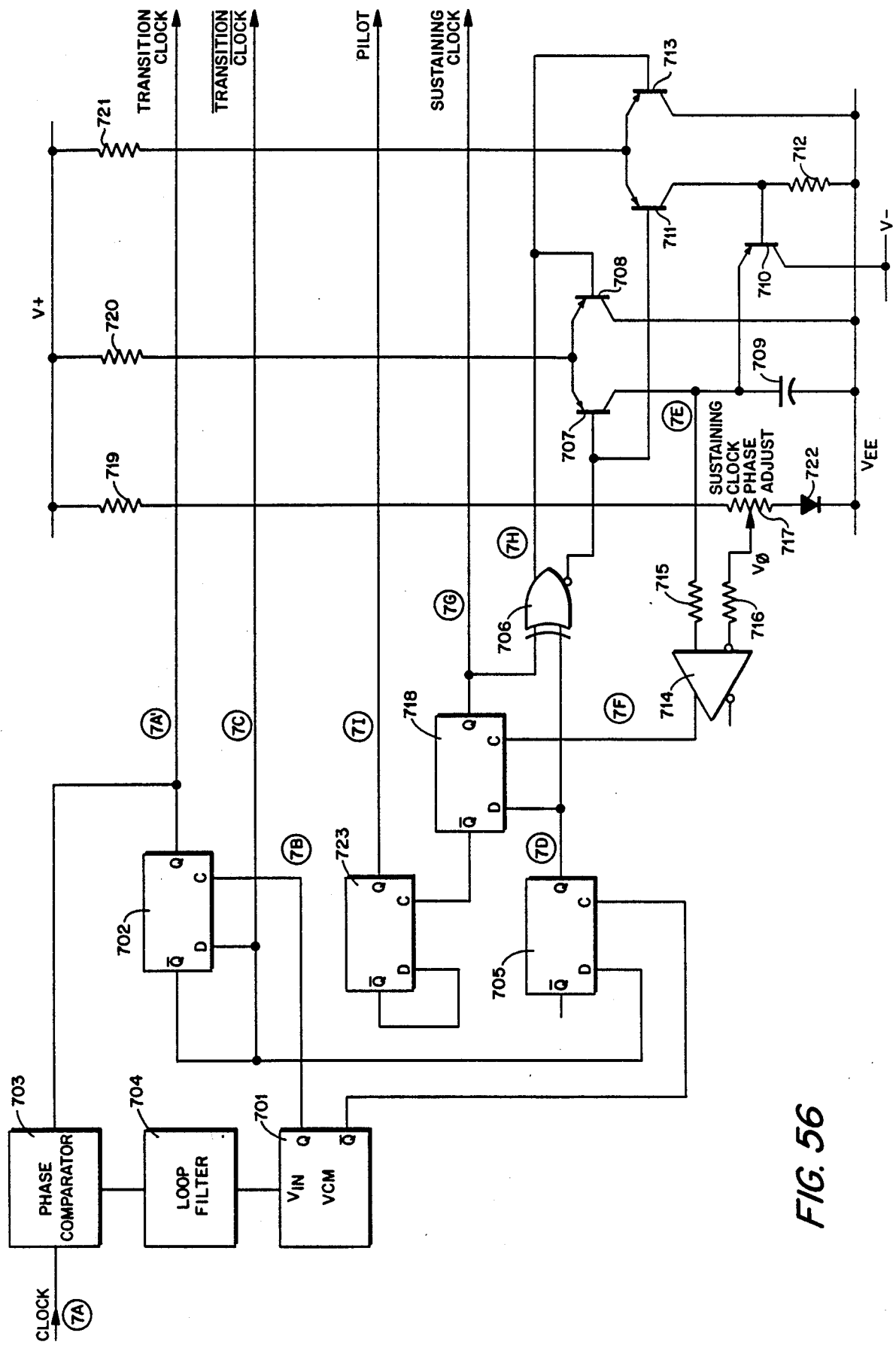
FIGS. 56 and 57 including 7A through 7I are respectively the logic diagram and the signal timing diagram of the record system timing logic for the sixth embodiment for implementing the subject invention.
Figure 57:
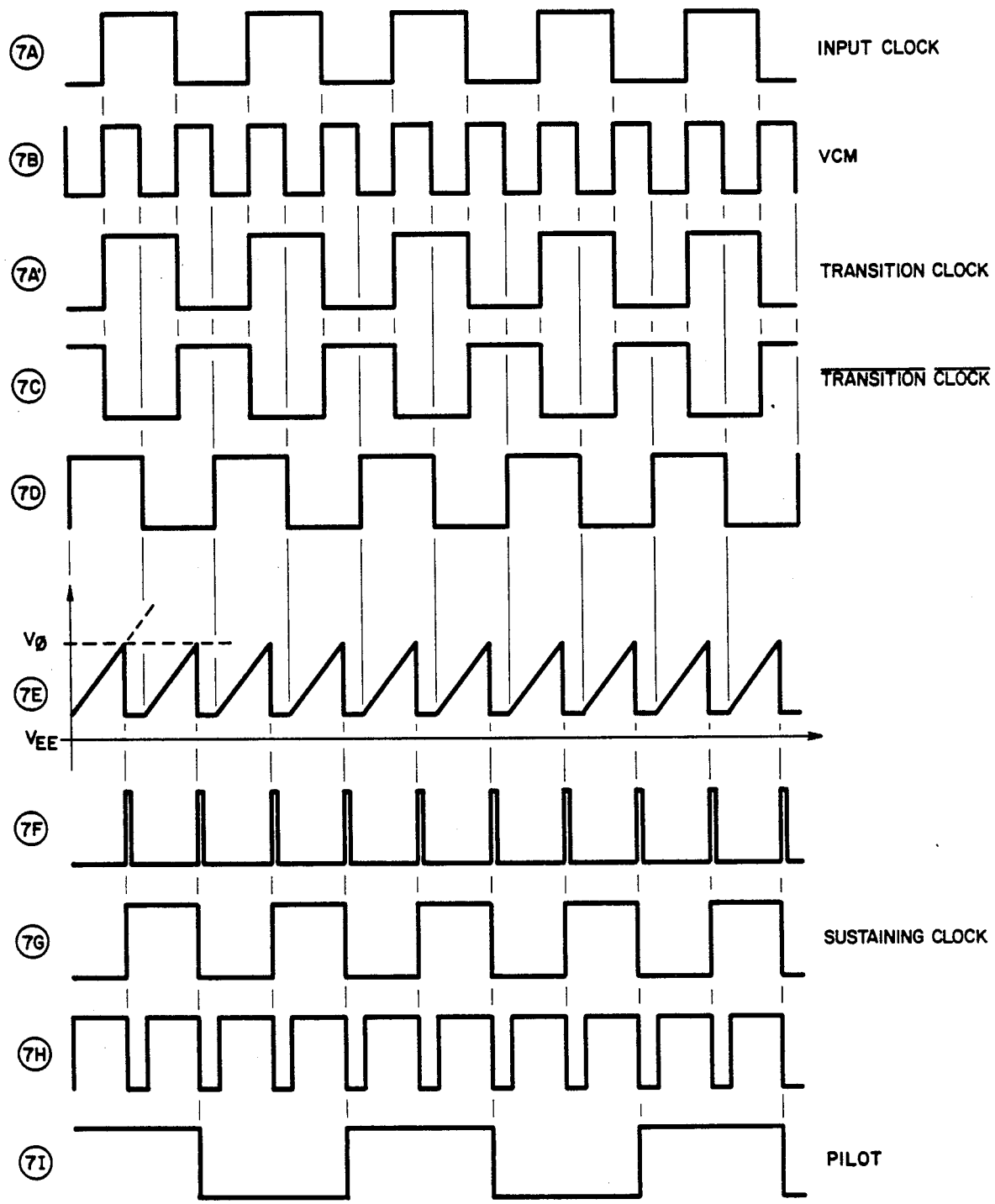

The timing logic VCM 701 depicted in FIG. 56 operates at twice the clock frequency; its Q output is coupled to D flip-flop 702 for frequency division by two thereby producing the transition clock and inverted transition clock. The transition clock is compared in phase to the host clock by phase comparator 703 which controls the VCM through loop filter 704 in achieving phase lock. D flip-flop 705 develop a quadrature clock which is phase leading relative to the transition clock and which is used as reference input for an adjustable phase, sustaining clock generator. The range of phase adjustment for the sustaining clock output is approximately plus or minus ninety degrees with respect to the transition clock.

Each edge of the reference clock from flip-flop 705 switches the non-inverting output of exclusive-or gate 706 high and the inverting output low. In this state, the complementary output of gate 706 switches a current switch comprising transistor 707 and 708 to initiate a timing ramp signal from charging capacitor 709; simultaneously, transistor 710 controlling the discharge of the capacitor is reverse biased by the action of another current switch comprising transistor 711 with collector load resistor 712 and transistor 713. When the timing ramp voltage, applied to the non-inverting input of voltage comparator 714 through coupling resistor 715, reaches a clock phase analogous reference voltage established at the inverting input to the comparator by coupling resistor 716 from potentiometer 717, the comparator switches high clocking a change of output state from D flip-flop 718. The output of flip-flop 718 then serves as sustaining clock with its phase adjustable by potentiometer 717. The sustaining clock change of state signals exclusive-or gate 706 to switch low, thereby interrupting capacitor charging current from transistor 707 and collector current from transistor 711 causing rapid discharge of the capacitor through transistor 710. This charge and discharge sequence of capacitor 709 is repeated each time the output of flip-flop 705 changes state.

Resistor 719 limits the phase reference voltage range of potentiometer 717. Resistors 720 and 721 are current source resistors for the current switches. Diode 722 compensates base-emitter voltage changes with temperature of transistor 710. The $\bar{Q}$ output of D flip-flop 718 is divided in frequency by two to produce the pilot signal through operation of D flip-flop 723.

Figure 58:
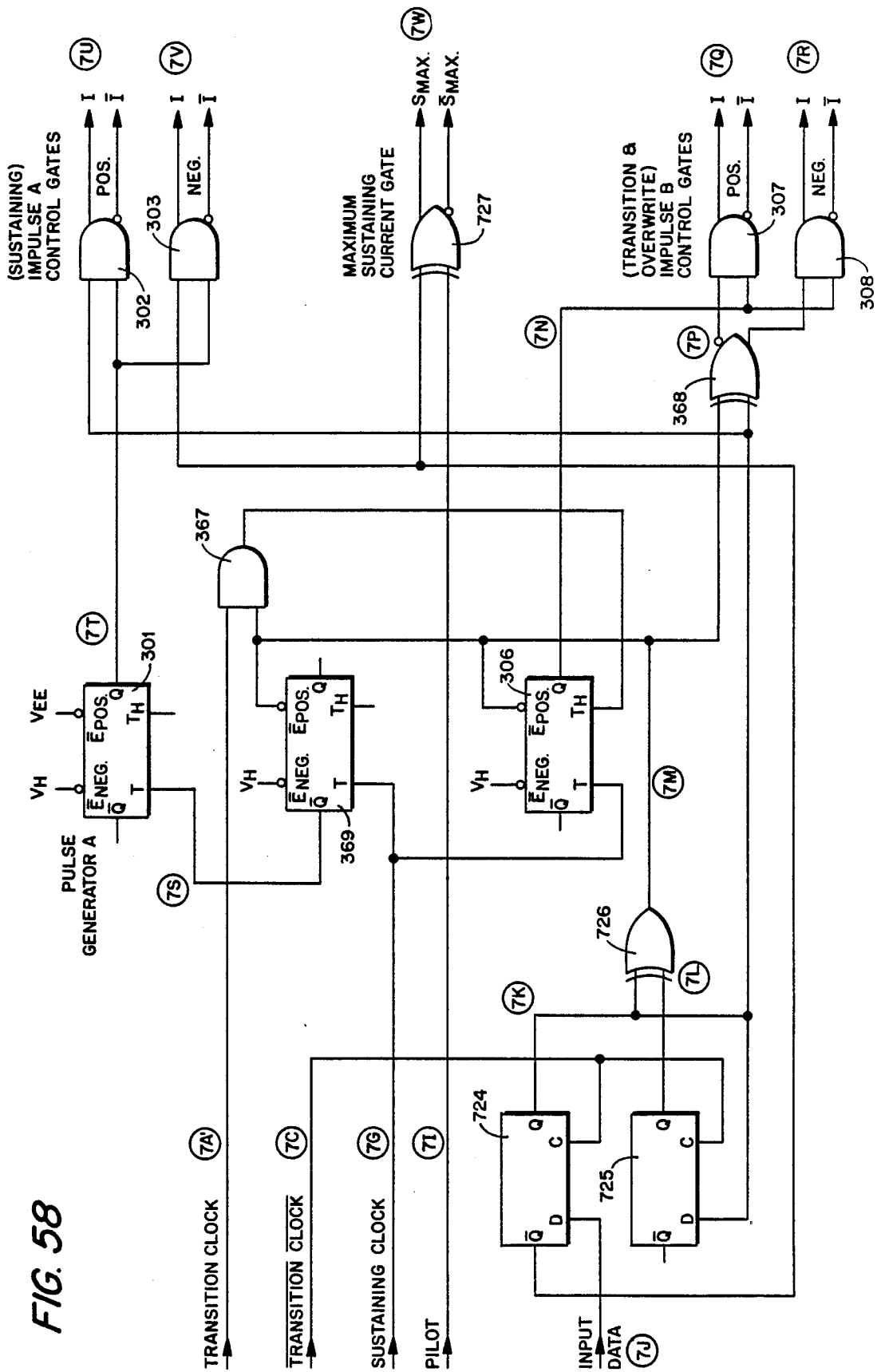
FIG. 58 is a sixth embodiment record channel logic diagram.

The complete signal flow for the record channel logic of the subject embodiment is depicted in FIG. 58. The host data signal is applied to D flip-flop 724 to be synchronized to the inverted transition clock. The complementary outputs of the flip-flop, thus synchronzied, are correctly timed as data references for the logic. D flip-flop 725 delays data one bit for derivation of the logic's transition gate signal by exclusive-or gate 726 from the two, relatively delayed data inputs.

The in-band pilot signal from the timing logic is coupled to exclusive-or gate 727 which provides a complementary signal controlling modulation of sustaining impulse current by the record channel processor. The pilot output of exclusive-or gate 727 is also selectively inverted or not inverted according to the instant state of an inverted data reference from flip-flop 724. Selective inversion of the pilot signal with data maintains a modulating pilot signal of constant phase regardless of the polarity of sustaining impulses being modulated.

Operations of the record channel logic of this embodiment remaining to be explained are identical to operations of the third embodiment previously explained in conjunction with FIG. 43 except that the transition gate signal (from exclusive-or gate 726) in the subject embodiment controls sustaining clock trigger inputs of monostable multivibrators soley rather than in conjunction with a phase select signal as in the third embodiment; only positive slope triggering is effective when gated; negative slope triggering is always disabled. Reference numbers for elements common to both embodiments are common to both FIGS. 43 and 58.

Figure 59:
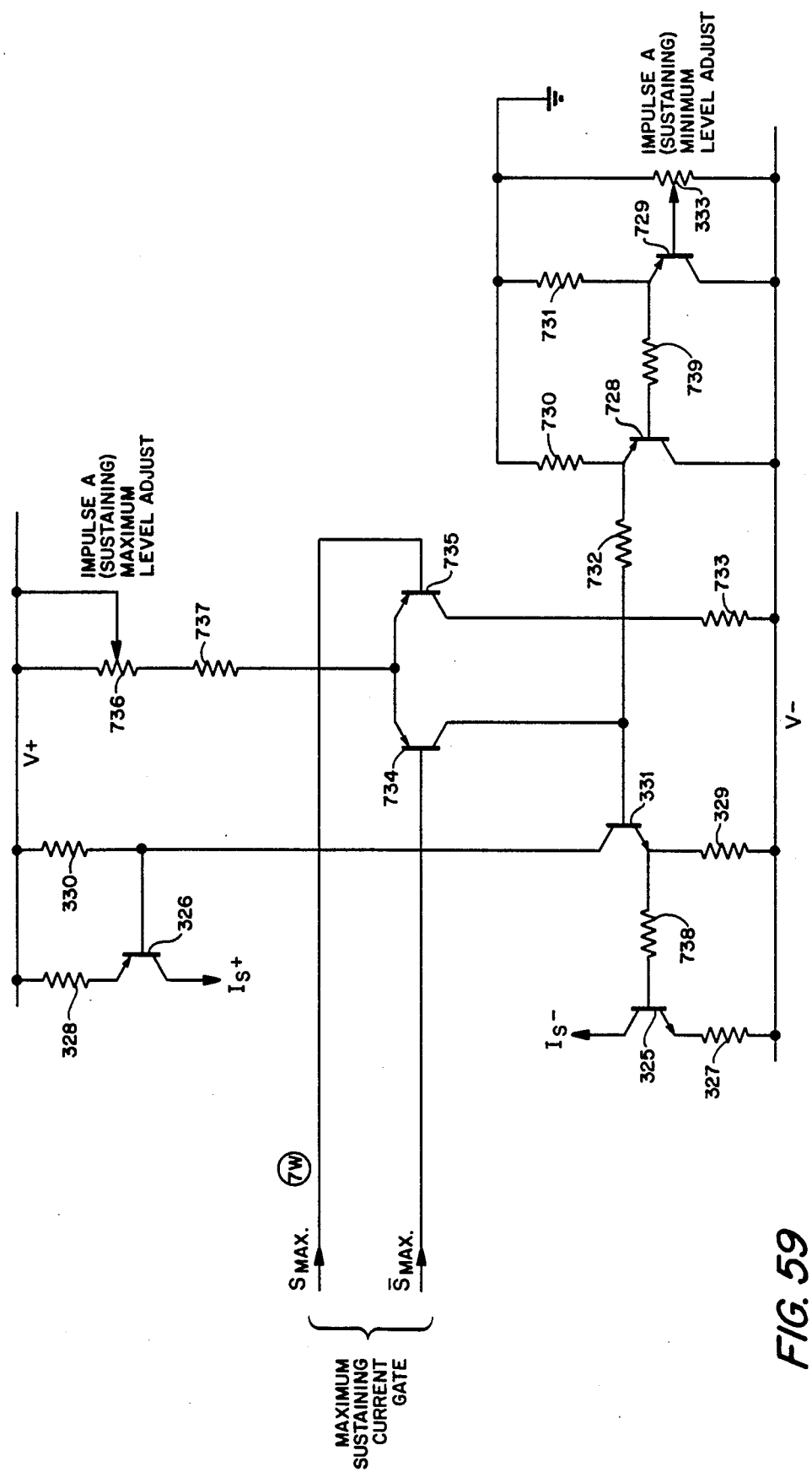
FIG. 59 schematically diagrams a record channel processor modification associated with the sixth embodiment.

FIG. 59 shows modifications for this embodiment of the sustaining impulse complementary current source used with the record channel processor of the third embodiment depicted in FIG. 38. The modifications of FIG. 59 facilitate modulation of sustaining impulse amplitude to effect pilot recording as required for the subject embodiment; no other changes in the circuit of FIG. 38 are required for this embodiment. Elements common to FIG. 59 and FIG. 38 have identical reference numbers in each figure for convenient identification.

As shown in FIG. 59, two transistors 728 and 729 in darlington configuration constitute a low impedance source of the reference voltage for the sustaining impulse (impulse A) complementary current source. The reference voltage is derived from potentiometer 333 effecting control of minimum (normal) output current. The base-emitter diodes of the darlington pair also compensate base-emitter voltage changes with temperature of current source transistors 325 and 326 with their driver (polarity splitter) transistor 331. The darlington stage includes emitter load resistors 730 and 731; the output of this stage is coupled to the driver transistor 331 through resistor 732 which also serves as one collector load for a differential current switch comprised of the additional collector load resistor 733, transistors 734 and 735, and current source network components, potentiometer 736 and resistor 737.

When transistor 734 of the current switch is off, the normal reference voltage is applied to the base of transistor 331. When transistor 734 is switched on, its collector current causes a voltage drop across resistor 732 to be added to the normal reference voltage from transistor 728; this incremental change in voltage produces a corresponding, incremental change in current from the complementary source. Current switch transistors are controlled by the output of exclusive-or gate 727 (FIG. 58) in the record channel logic. The in-band pilot signal switches this gate to produce incremental increases of sustaining impulse current with every other sustaining impulse. The amount of current increase is controlled through potentiometer 736. Timing of the modulating pilot signal is such that a change from a low to a high source current, or vice versa, is set-up in advance of each sustaining impulse approximately at the mid-interval between sustaining impulses.

Resistors 738 and 739 of relatively low value effect emitter-to-base coupling of stages while improving their stability.

Figure 60:
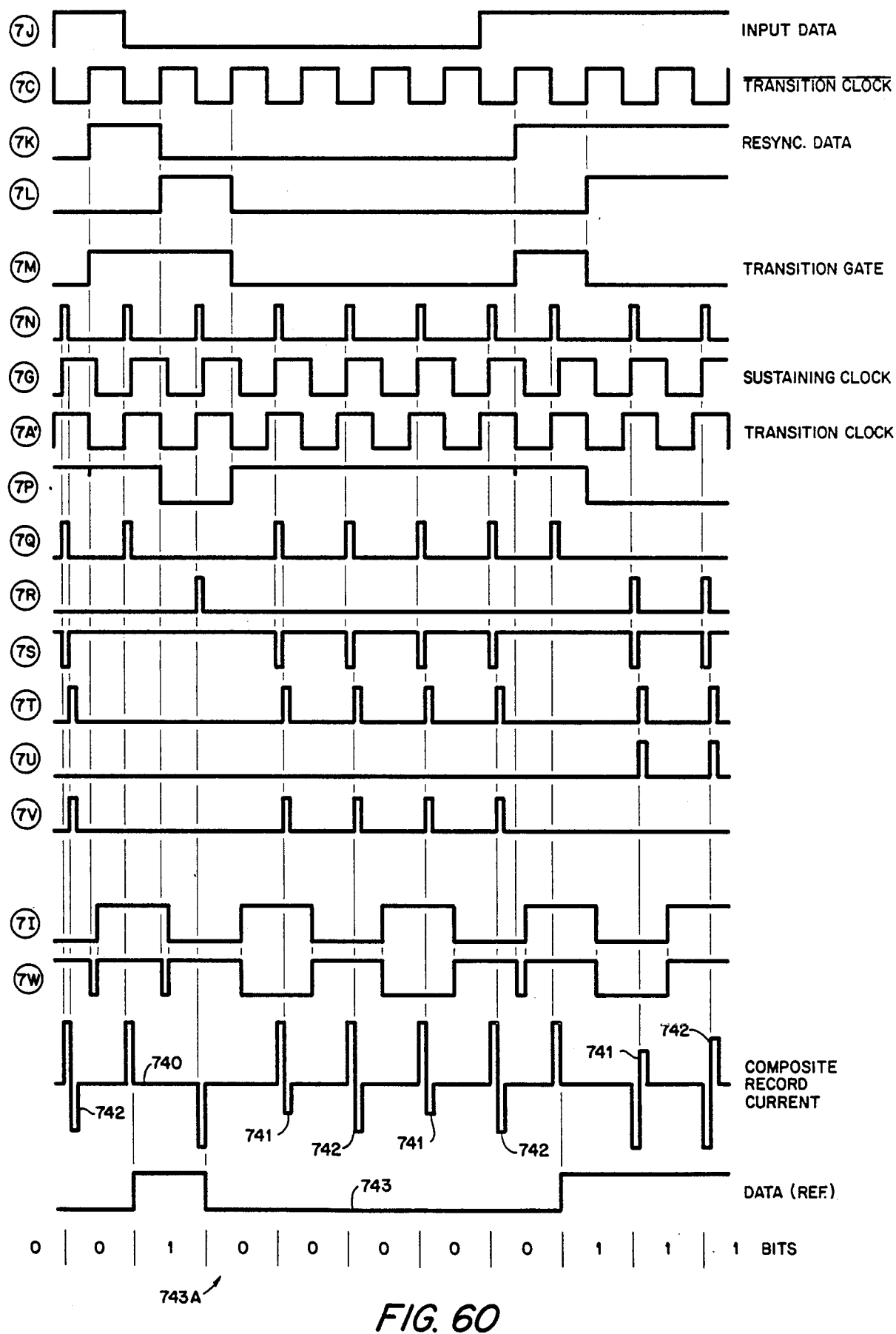
FIG. 60 is a record system signal timing diagram for the sixth embodiment.

Sustaining impulse amplitude modulation recording of an in-band pilot is depicted by waveform 740 in FIG. 60; alternate low current sustaining impulses 741 and high current sustaining impulses 742 are shown. A recorded data reference waveform 743 with its NRZ-Level, bit sequence 743A is also shown in FIG. 60.

Figure 61B:
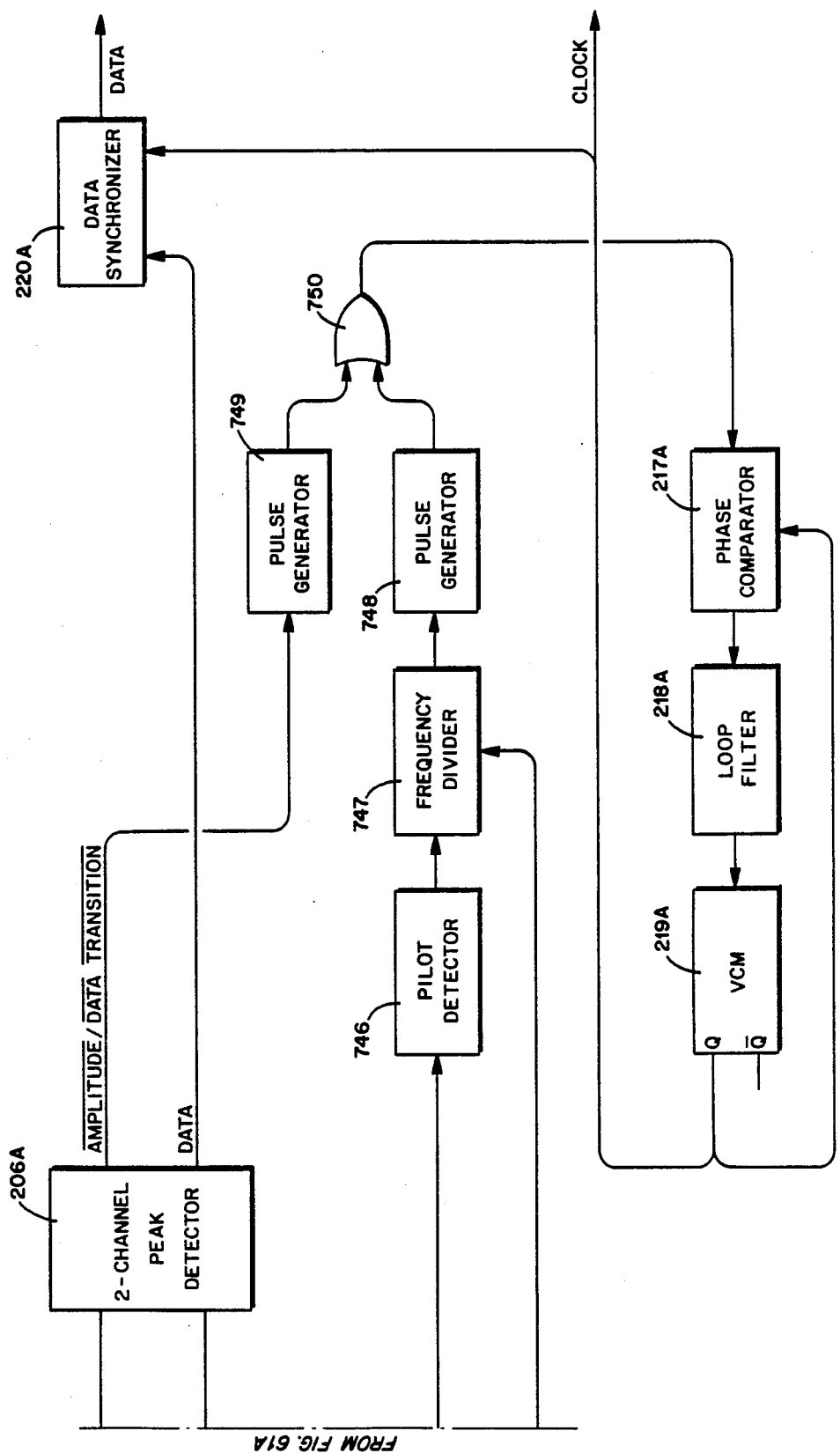

A reproduce system compatible with in-band pilot recordings of the subject sixth preferred embodiment is shown functionally in FIG. 61. This reproduce system is identical to the one depicted in FIG. 40 for use with the third and other embodiments except for its added functions recovering the in-band pilot and employing it in clock reconstruction. As previously explained, pilot aided clock recovery eliminates any need for data runlength limiting. The functional elements identical in FIGS. 61 and 40 are identified with the same reference number in both figures.

Elements added to facilitate pilot recovery for this embodiment must function without interference from data. The fact that the data detector will function without interference from a pilot has already been established; relatively high—easily recovered—pilot amplitudes are accommodated by dynamic biasing of the detector. Furthermore, the in-band pilot is only a burst pilot recorded during intervals between data transitions (sustaining intervals). Non-interference by data during in-band pilot detection is accomplished by gating (enabling) the pilot recovery electronics only during times when data transitions are not being detected or anticipated, that is, when reproduce signals are near the baseline within a window defined by complementary, threshold voltages above and below that baseline. Moreover, time delays assure that a reproduce signal must remain within the baseline window for a qualifying period before pilot derived signals are enabled for use by the clock PLL. Should an intervening data peak in the reproduce signal preclude release of a pilot derived reference signal to the clock PLL before its qualifying period has expired, the imminent data transition will provide the PLL reference.

The occurrence of a reproduce signal within a predetermined baseline window is signaled by the baseline window threshold detector 744 shown in FIG. 61. This detector may include two voltage comparators referenced to complementary threshold voltages which comparators are simultaneously switched low only when the reproduce signal level is within the limits established by the threshold voltages. An or gate detecting the simultaneous low state of the comparators may also be included in the detector.

The output of detector 744 is used to enable gated pilot amplifier and filter 745 which may include a pilot filter similar to that of FIG. 34 with a switching diode bridge and an amplifier circuit to interrupt the reproduce signal in response to a disabling signal from detector 744. Switching bridges are known in the art and often employed with sample and hold circuits. Operation of these switching diode bridges is similar to that of amplifier 153 (FIG. 31) with its diode bridge and current source transistors 158 and 162 but, the current sources should be switchable on and off as by differential current switches to effect interruption of signal transmission through the diode bridge.

The gated amplifier disabling signal level from detector 744 instantaneously interrupts the reproduce signal when it rises from the baseline window toward a data transition peak; use of the delayed reproduce signal from delay 207A increases anticipatory—to data—disabling time over that which would result from use of the direct reproduce signal from amplifier 203A. However when the reproduce signal returns to a level within the baseline window, the enabling of gated amplifier and filter 745 should be delayed to ensure that the reproduce signal will remain in the baseline window for a qualifying period and is not merely "passing through". The delayed effect of an enabling signal can be accomplished by RC delay mean included in the diode bridge current control switches. One serendipitous aspect of baseline window threshold detection with appropriate delays to qualify periods between data transitions for pilot detection is its total compatibility with reproduce waveforms from pilot enhanced impulse recordings, as can be seen in FIG. 20. The enhanced (equalized) reproduce waveform exhibits long periods of virtually flat (horizontal) signal at baseline.

The filtered pilot signal from amplifier and filter 745, when gated, is applied to a pilot detector 746 consisting of a limiter-amplifier, a ground (zero) referenced voltage comparator and an exclusive-or gate frequency doubler as exemplified by exclusive-or gate 254 with resistor 255 and capacitor 256 delay network in FIG. 35. The output of the pilot detector is a pulse for each zero crossing of the pilot signal. Pulses from the detector 746 are coupled to a frequency divider 747 providing pulses of predetermined time spacing during relatively long intervals without data transitions. The division factor of divider 747 determines its delay time before releasing the first pulse of a sequence and its pulse to pulse time spacing; for example, a division factor of six for the divider will cause it to generate one pulse every six data bits. The frequency divider is held reset to a zero count state by baseline detector 744 when a data transition is imminent or being detected.

Divider 747 pulses trigger a pulse of adjustable duration from pulse generator (monostable multivibrator) 748. A similar pulse of precisely one-half a clock (VCM) period is triggered from pulse generator 749 by detected data transitions. The trialing edges of data triggered delay pulses form generator 749 are coupled as phase reference to phase lock the clock PLL by or gate 750. The pilot derived pulses from generator 748, also coupled to the clock PLL by or gate 750, are adjusted in duration for correct phasing of their trialing edges with respect to the trailing edges of data derived pulses and a phase-locked clock, as was explained previously in the context of describing the adjustment of generator 214 of FIG. 33 for another embodiment.

The PLL of FIG. 61 includes the same elements as the PLL of FIG. 40 but the correct timing of synchronizing clock edges from the PLL with respect to detected data for this embodiment requires that the Q (clock) output of the VCM be used as phase reference for the phase comparator rather than the $\overline{Q}$ output as is the case for the system of FIG. 40. This difference in phase comparator-to-VCM connection is related to the use of delayed data and pilot derived reference pulses for the PLL of this embodiment. The phase comparator 217 of FIG. 33 also has the clock directly applied rather than its complement for the same reason.

Other elements of the functional block diagram (FIG. 61) of the reproduce system for this embodiment remaining to be explained have been previously explained in conjunction with FIGS. 40 and 41 for another embodiment.

Use of an in-band pilot for clock recovery to eliminate data run-length limiting in the subject embodiment is essentially the same as use of the out-of-band pilot of the first preferred embodiment for the same purpose. The reproduce circuit techniques employed in the subject embodiment are so similar to those explained in detail for the first embodiment and are so known by those skilled in the art that they need not be further described.

Having thus described the present invention, it is understood that various changes, modifications and embodiments will become apparent to those skilled in the art. Such changes, modifications and embodiments as are embraced by the spirit and scope of the appended claims are contemplated as coming within the purview of the present invention.

What is claimed is:

1. In a method of magnetic recording of data by means of a magnetic recording head having a recording gap and a magnetic recording medium having a recording surface, wherein a relative traverse is effected between said head and said medium across said gap, said head providing a determined length of effective recording field along the line of said traverse, comprising applying to said recording head a sequence of electrical data impulses of short time duration and at spaced time intervals in a predetermined phase relation to a clock signal for effecting magnetic recording thereof in said medium as recorded increments, the time duration of each of said data impulses being a small fraction of the time period for said traverse across gap, the improvement comprising: generating a pilot signal and applying said pilot signal to said recording head, said pilot signal comprising a sequence of regularly recurring pilot impulses having a time duration for each pilot impulse of a fraction of the time period for said traverse across said gap, and a time period between successive pilot impulses of approximately said time period of traverse over said length of effective recording field, said pilot impulses being made to be substantially phase coherent with said data impulses and being constructively additive thereto, and being of lesser amplitude than said data impulses, whereby said pilot signal enhances the recording of said data impulses and provides a substantially equalized recorded continuum between data impulses when the spaced time interval between successive data impulses is greater than the time period of traverse over said length of effective recording field.

2. In a method of magnetic recording by means of a magnetic recording head having a recording gap and a magnetic recording medium having a recording surface, wherein a relative traverse is effected between said head and said medium across said gap, said head providing a determined length of effective recording field along the line of said traverse, comprising applying to said recording head a sequence of electrical impulses of short time duration and at spaced time intervals for effecting magnetic recording thereof in said medium as recorded increments, the time duration of each of said impulses being a fraction of the time period for said traverse across said gap, and the length of each of said time intervals between impulses being approximately equal to the time period of traverse over said length of effective recording field to provide a recorded continuum, the improvement comprising: (1) recording a first set of said impulses, each having a time duration of a small fraction of the time period for said traverse across said gap, wherein the time between at least some of the successive first set impulses is greater than said time interval; and (2) recording a second set of said impulses between successive impulses of said some of said first set of impulses, each of said second set of impulses being of the same polarity sense but of lesser amplitude than its immediately preceding first set impulse, said lesser amplitude being selected to obtain substantially recording equalization over the recorded continuum between such successive first set impulses.

3. In a method of magnetic recording by means of a magnetic recording head having a recording gap and a magnetic recording medium having a recording surface, wherein a relative traverse is effected between said head and said medium across said gap, said head providing a determined length of effective recording field along the line of said traverse, comprising applying to said recording head a sequence of electrical impulses of short time duration and at spaced time intervals for effecting magnetic recording thereof in said medium as recorded increments, the time duration of each of said impulses being a fraction of the time period for said traverse across said gap, and the length of each of said time intervals between impulses being approximately equal to the time period of traverse over said length of effective recording field to provide a recorded continuum, the improvement comprising: (1) recording a first set of said impulses, each having a time duration of a small fraction of the time period for said traverse across said gap, wherein successive impulses of said first set are of opposite polarity sense, and the time between at least some of the successive impulses of said first set is greater than one of said time intervals; and (2) recording a second set of said impulses between successive impulses of said some of said first set of impulses, each of said second set of impulses being of the same polarity sense but of lesser amplitude than its immediately preceding first set impulse, said lesser amplitude being selected to obtain substantially recording equalization over the recorded continuum between such successive first set impulses.

4. In a method of magnetic recording as set forth in claim 1, said pilot signal being derived from said clock signal.

5. In a method asset forth in claim 1, said pilot signal having a frequency of 1.5 times the frequency of the clock signal.

6. In a method of magnetic recording by means of a magnetic recording head having a recording gap and a magnetic recording medium having a recording surface, wherein a relative traverse is effected between said head and said medium across said gap, said head providing a determined length of effective recording field along the line of said traverse, comprising applying to said recording head a sequence of electrical impulses of short time duration and at spaced time intervals for effecting magnetic recording thereof in said medium as recorded increments, the time duration of each of said impulses being a fraction of the time period for said traverse across said gap, and the length of each of said time intervals between impulses being approximately equal to the time period of traverse over said length of effective recording field to provide a recorded continuum, the improvement comprising: (1) recording a first set of said impulses, each having a time duration of a small fraction of the time period for said traverse across said gap, wherein successive impulses of said first set are of opposite polarity sense, and the time between at least some of the successive impulses of said first set is greater than one of said time intervals; and (2) recording a second set of said impulses between successive impulses of said some of said first set of impulses adapted to provide substantially recording equalization over the recorded continuum between such successive first set impulses.

7. In a method of magnetic recording as set forth in claim 6, said second set of impulses being a pilot signal.

8. In a method of magnetic recording as set forth in claim 7, said pilot signal being made to be substantially phase coherent with said first set of impulses.

9. In a method of magnetic recording as set forth in claim 6, each of said second set of impulses being of the same polarity sense as its immediately preceding first set impulse.

10. In a method of magnetic recording as set forth in claim 6, said second set of impulses being comprised of impulse units, each impulse unit having a leading overwrite portion of sufficient amplitude to saturate the recording medium and a following sustaining portion of opposite polarity sense from said overwrite portion to provide said substantial recording equalization.

11. In a method of magnetic recording as set forth in claim 10, each said overwrite portion being of opposite polarity sense from its immediately preceding first set impulse, and each said sustaining portion being of the same polarity sense but of lesser amplitude than its immediately preceding first set impulse.

12. In a method of magnetic recording as set forth in claim 6, said second set of impulses being comprised of impulse units, each impulse unit having a leading overwrite portion of sufficient amplitude to saturate the recording medium and a following portion of opposite polarity sense from said overwrite portion and delayed relative thereto by a time substantially equal to or less than one half said time intervals between impulses.

13. In a method of magnetic recording as set forth in claim 12, said overwrite portion being of the same polarity sense as its immediately preceding first set impulse, and said following portion being of lesser amplitude than said overwrite portion.

14. In a method of magnetic recording as set forth in claim 12, said overwrite portion and said following portion being substantially equal in amplitude.

15. In a method of magnetic recording by means of a magnetic recording head having a recording gap and a magnetic recording medium having a recording surface, wherein a relative traverse is effected between said head and said medium across said gap, said head providing a determined length of effective recording field along the line of said traverse, comprising applying to said recording head a sequence of electrical impulses of short time duration and at spaced time intervals for effecting magnetic recording thereof in said medium as recorded increments, the time duration of each of said impulses being a fraction of the time period for said traverse across said gap, and the length of each of said time intervals between impulses being approximately equal to the time period of traverse over said length of effective recording field to provide a recorded continuum, the improvement comprising: (1) recording a first set of said impulses, each having a time duration of a small fraction of the time period for said traverse across said gap, wherein successive impulses of said first set are of opposite polarity sense, and the time between at least some of the successive impulses of said first set is greater than one of said time intervals; and (2) recording a second set of impulses, each of said second set of impulses having a net recorded polarity sense that is the same as the recorded polarity sense of its immediately preceding first set impulse.

16. In a method of magnetic recording as set forth in claim 15, said second set of impulses being a pilot signal.

17. In a method of magnetic recording as set forth in claim 16, said pilot signal being made to be substantially phase coherent with said first set of impulses.

18. In a method of magnetic recording as set forth in claim 15, said second set of impulses having a net recorded amplitude that is less than the recorded amplitude of its immediately preceding first set impulse.

19. In a method of magnetic recording as set forth in claim 18, said second set of impulses being a pilot signal.

20. In a method of magnetic recording as set forth in claim 19, said pilot signal being made to be substantially phase coherent with said first set of impulses.

21. In a method of magnetic recording of binary data by means of a magnetic recording head having a recording gap and a magnetic recording medium having a recording surface, wherein a relative traverse is effected between said head and said medium across said gap, said head providing a predetermined length of effective recording field along the line of said traverse, comprising applying to said recording head a set of electrical data impulses of short time duration and at spaced time intervals in predetermined time relation to a clock signal for effecting magnetic recording thereof in said medium as a sequence of contiguous or overlapping recorded increments, the time duration of each of said data impulses being a small fraction of the time period for said traverse across said gap, the improvement comprising: generating a first subset of impulses occurring at intervals determined by transition intervals of said binary data and having sense corresponding to the sense of said binary data; generating a second subset of regularly recurring impulses, wherein impulses are of sense determined by the sense of said binary data, are of predetermined amplitude with respect to the impulse amplitude of said first subset of impulses and having predetermined phase relation to said first subset of impulses, and, wherein member impulses which occur within a predetermined time of concurrence with member impulses of said first subset of impulses are missing; and applying the whole set of impulses generated to said recording head to effect, in said recording medium, a recording which is essentially continuous and equalized in both phase and amplitude.

22. A method as set forth in claim 21, in which each member of said second subset of regularly recurring impulses is a pair of impulse elements, the impulse elements of said pairs being of mutually opposing sense, the amplitude of at least one impulse element of said pairs being sufficient to effect overwriting of previously recorded data in said recording medium, and the relative amplitude and relative time separation of the elements of each pair being predetermined to effect a substantially equalized recording.

23. A method as set forth in claim 21, in which the frequency of recurrence of said second subset of regularly recurring impulses is reproducible as a pilot signal and in which the impulses of said second subset of regularly recurring impulses are systematically adapted in timing to relative phase coherence, thereby causing the pilot signal, when reproduced, to be phase coherent with reproduced transitions of said binary data and constructively additive thereto.

24. A method as set forth in claim 22, in which the frequency of recurrence of said second subset of regularly recurring impulses is reproducible as a pilot signal and in which the impulses of said first subset of impulses and the impulses of said second subset of regularly recurring impulses are systematically adapted in timing to relative phase coherence, thereby causing the pilot signal, when reproduced, to be phase coherent with reproduced transitions of said binary data and constructively additive thereto.

25. A method as set forth in claim 21, in which at least some impulses are amplitude modulated by a signal having a frequency which is lower than the frequency of occurrence of the impulses and in which the modulating signal is reproducible and detectable as a pilot.

26. A method as set forth in claim 22, in which at least some impulses are amplitude modulated by a signal having a frequency which is lower than the frequency of occurrence of the impulses an in which the modulating signal is reproducible and detectable as a pilot.

27. A method as set forth in claim 23, further improved by detecting the reproduced pilot signal and applying it as a timing reference for recovery of a reproduce clock signal synchronous with reproduce binary data.

28. A method as set forth in claim 24, further improved by detecting the reproduced pilot signal and applying it as a timing reference for recovery of a reproduce clock signal synchronous with reproduce binary data.

29. A method as set forth in claim 25, further improved by detecting the reproduced pilot signal and applying it as a timing reference for recovery of a reproduce clock signal synchronous with reproduce binary data.

30. A method as set forth in claim 26, further improved by detecting the reproduced pilot signal and applying it as a timing reference for recovery of a reproduce clock signal synchronous with reproduce binary data.

31. A method as set forth in claim 23, further characterized by impulses of said first subset of impulses being adaptively retimed to phase coherence with said second subset of regularly recurring impulses, thereby causing some binary data transitions to be offset in time, which method is further improved by reproducing said some binary data transitions, as offset, then systematically restoring their timing to correlate with that of original binary data.

32. A method as set forth in claim 24, further characterized by impulses of said first subset of impulses being adaptively retimed to phase coherence with said second subset of regularly recurring impulses, thereby causing some binary data transitions to be offset in time, which method is further improved by reproducing said some binary data transitions, as offset, then systematically restoring their timing to correlate with that of original binary data.

* * * * *